United States Patent
Lee

(10) Patent No.: US 9,710,119 B2
(45) Date of Patent: *Jul. 18, 2017

(54) TOUCH DETECTION DEVICE, TOUCH DETECTION METHOD AND TOUCH SCREEN PANEL, USING DRIVING BACK PHENOMENON, AND DISPLAY DEVICE WITH BUILT-IN TOUCH SCREEN PANEL

(71) Applicant: G2TOUCH Co., LTD., Seongnam (KR)

(72) Inventor: Sung Ho Lee, Hwaseong-si (KR)

(73) Assignee: G2TOUCH CO., LTD., Seongnam (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/801,008

(22) Filed: Jul. 16, 2015

(65) Prior Publication Data

US 2015/0338961 A1 Nov. 26, 2015

Related U.S. Application Data

(63) Continuation of application No. 14/347,892, filed as application No. PCT/KR2012/007940 on Sep. 28, 2012.

(30) Foreign Application Priority Data

Sep. 29, 2011 (KR) .......... 10-2011-0098749

(51) Int. Cl.
 G06F 3/044 (2006.01)
 G09G 3/36 (2006.01)
 (Continued)

(52) U.S. Cl.
 CPC .......... *G06F 3/044* (2013.01); *G06F 3/03545* (2013.01); *G06F 3/0416* (2013.01);
 (Continued)

(58) Field of Classification Search
 CPC ................ G06F 3/03547; G06F 3/044; G06F 2203/04111; G06F 2203/04112
 (Continued)

(56) References Cited

U.S. PATENT DOCUMENTS

2006/0007166 A1 1/2006 Lin et al.
2006/0146038 A1 7/2006 Park et al.
 (Continued)

FOREIGN PATENT DOCUMENTS

KR  10-2010-0021112 A   2/2010
KR     10-1008441 B1     1/2011
 (Continued)

OTHER PUBLICATIONS

Office Action for U.S. Appl. No. 14/800,991, dated Jan. 18, 2017.
 (Continued)

*Primary Examiner* — Stephen Sherman

(57) ABSTRACT

Provided is a touch detection device, touch detection method, and touch screen panel, which detects a touch signal by detecting a driving back phenomenon occurring in a touch pad by a driving voltage applied to a driving capacitor, and a display device with a built-in touch screen panel. The touch detection device that is added on top of a display device and detects occurrence of a touch capacitance (Ct) by an approach of a bodily finger (25) or a touch input instrument such as a conductor similar to the bodily finger, the touch detection device comprising: a touch pad (10) that forms the touch capacitance (Ct) between the touch input instrument and the touch pad; a driving capacitor (Cdrv) whose one side is connected to the touch pad (10) and to the other side of which a driving voltage for detection of a touch input is applied; a common voltage detector that detects a common voltage generated from the display device; a driving voltage generator that generates the driving voltage in
 (Continued)

synchronization with the common voltage; and a touch detector that is connected to the touch pad (10), and that detects a touch signal by using a driving back phenomenon when the touch capacitance (Ct) is added to the driving capacitor (Cdrv) according to occurrence or non-occurrence of a touch in the touch input instrument. A touch signal is detected while avoiding a point in time of a change of a common voltage state, and a driving voltage is applied through a driving capacitor connected to a touch detector, to thus detect whether or not a driving back phenomenon occurs in the touch detector and to thereby acquire a touch signal. Accordingly, an influence due to parasitic capacitance generated by noise, coupling phenomenon or other factors is minimized, to thus acquire a touch signal stably.

15 Claims, 37 Drawing Sheets

(51) Int. Cl.
  *G06F 3/0354*    (2013.01)
  *G06F 3/041*    (2006.01)
(52) U.S. Cl.
  CPC ......... *G09G 3/3655* (2013.01); *G09G 3/3696* (2013.01); *G06F 2203/04104* (2013.01); *G09G 2310/08* (2013.01)
(58) Field of Classification Search
  USPC ............................... 345/173, 174; 178/18.06
  See application file for complete search history.

(56) References Cited

U.S. PATENT DOCUMENTS

| | | | |
|---|---|---|---|
| 2006/0158202 | A1 | 7/2006 | Umeda et al. |
| 2006/0239517 | A1 | 10/2006 | Creasey et al. |
| 2006/0262099 | A1 | 11/2006 | Destura et al. |
| 2007/0062739 | A1* | 3/2007 | Philipp ................... G06F 3/044 178/18.06 |
| 2008/0192018 | A1* | 8/2008 | Park ..................... G06F 3/0412 345/173 |
| 2010/0108409 | A1 | 5/2010 | Tanaka et al. |
| 2010/0182273 | A1* | 7/2010 | Noguchi ............. G02F 1/13338 345/174 |
| 2010/0321621 | A1 | 12/2010 | Kikuchi et al. |
| 2011/0085122 | A1* | 4/2011 | Fu ....................... G02F 1/13338 349/149 |
| 2011/0096019 | A1 | 4/2011 | Tsai et al. |
| 2011/0115733 | A1* | 5/2011 | Shih ..................... G06F 3/0412 345/173 |

FOREIGN PATENT DOCUMENTS

| | | |
|---|---|---|
| KR | 10-2011-0061637 A | 6/2011 |
| KR | 10-2011-0073894 A | 6/2011 |
| KR | 10-2011-0080254 A | 7/2011 |

OTHER PUBLICATIONS

Office Action from U.S. Patent Office for U.S. Appl. No. 14/801,039, dated Apr. 12, 2017.

* cited by examiner

[ FIG. 1 ]
(PRIOR ART)
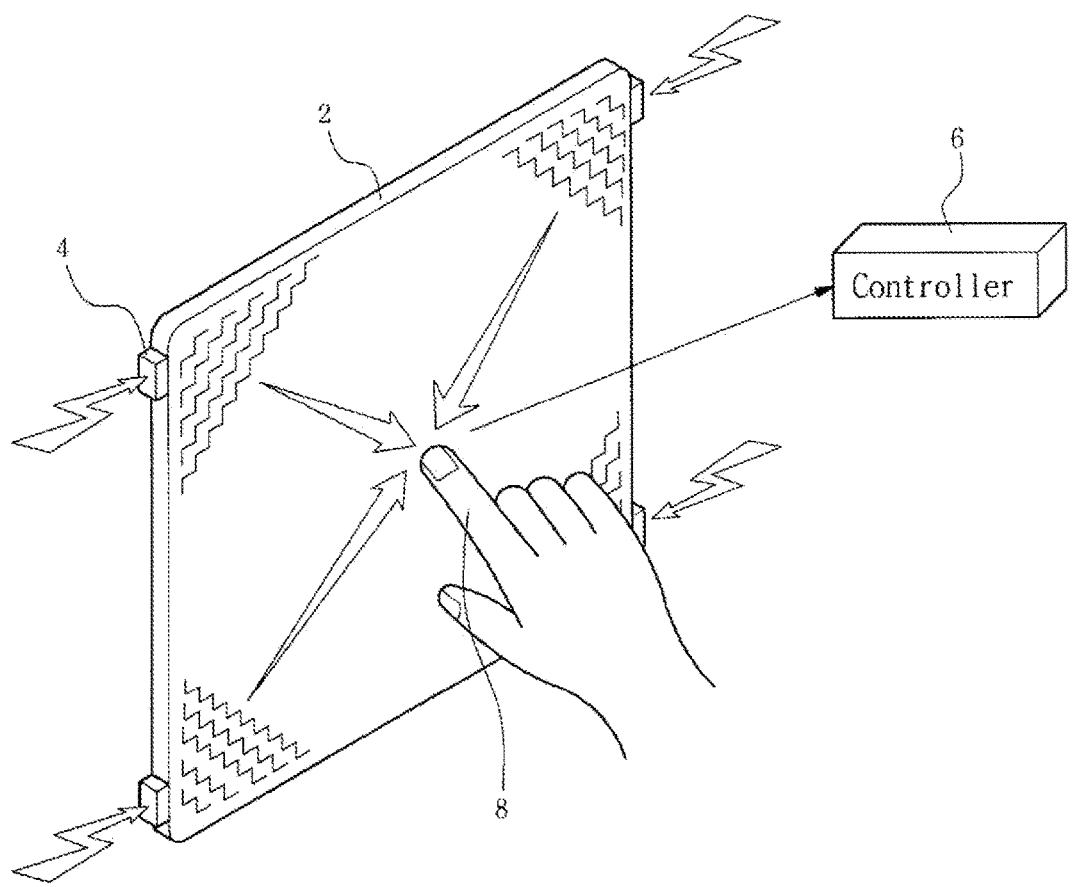

[ FIG. 2 ]
(PRIOR ART)
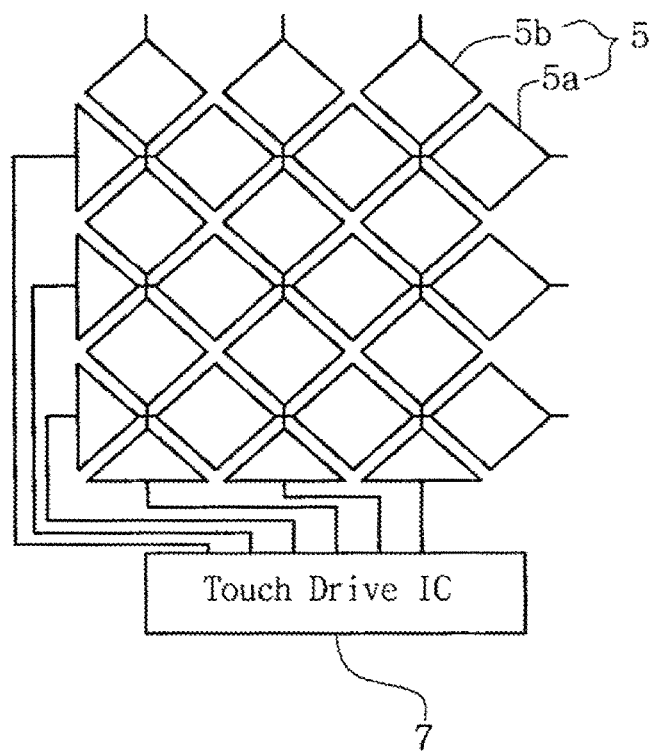
[ FIG. 3 ]
(PRIOR ART)
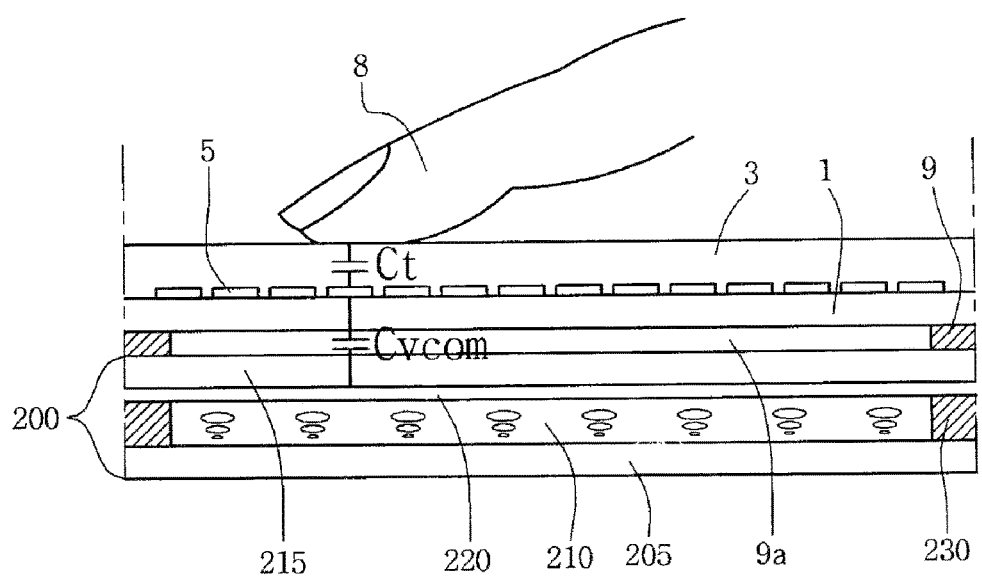

[ FIG. 4 ]
(PRIOR ART)
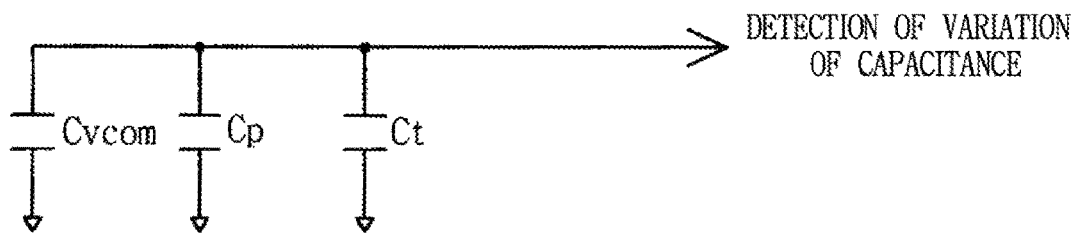
[ FIG. 5 ]
(PRIOR ART)
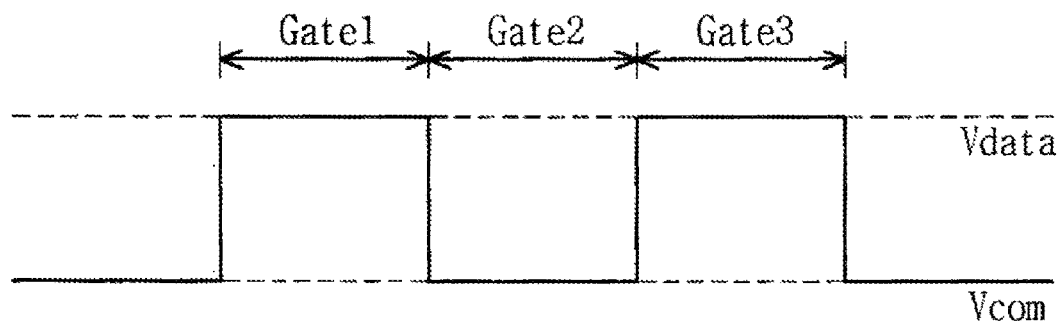
[ FIG. 6 ]
(PRIOR ART)
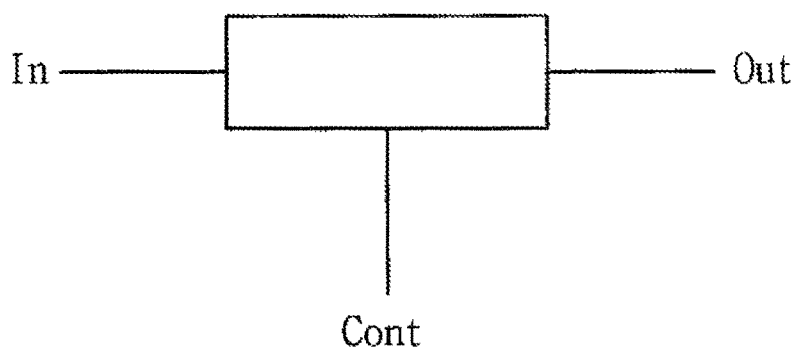

[ FIG. 7 ]
(PRIOR ART)
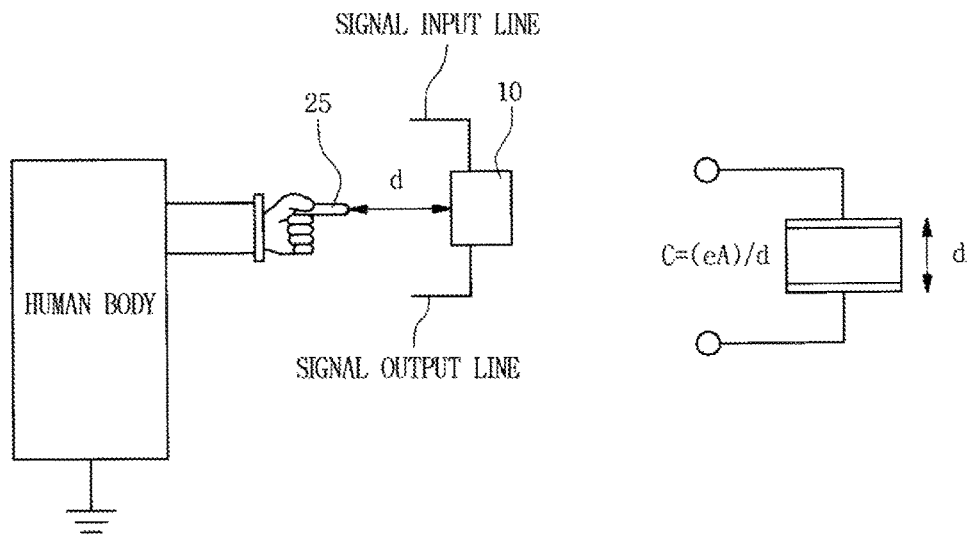
[ FIG. 8 ]
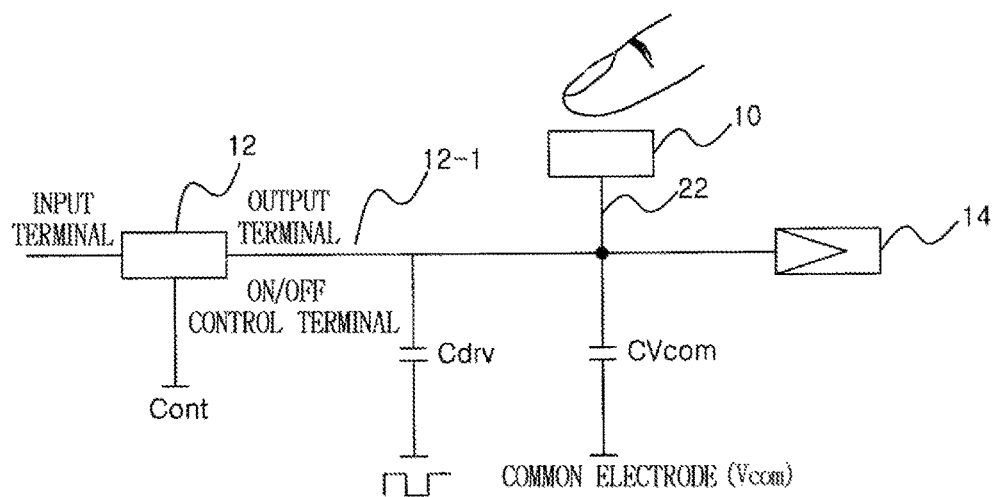

[ FIG. 9A ]
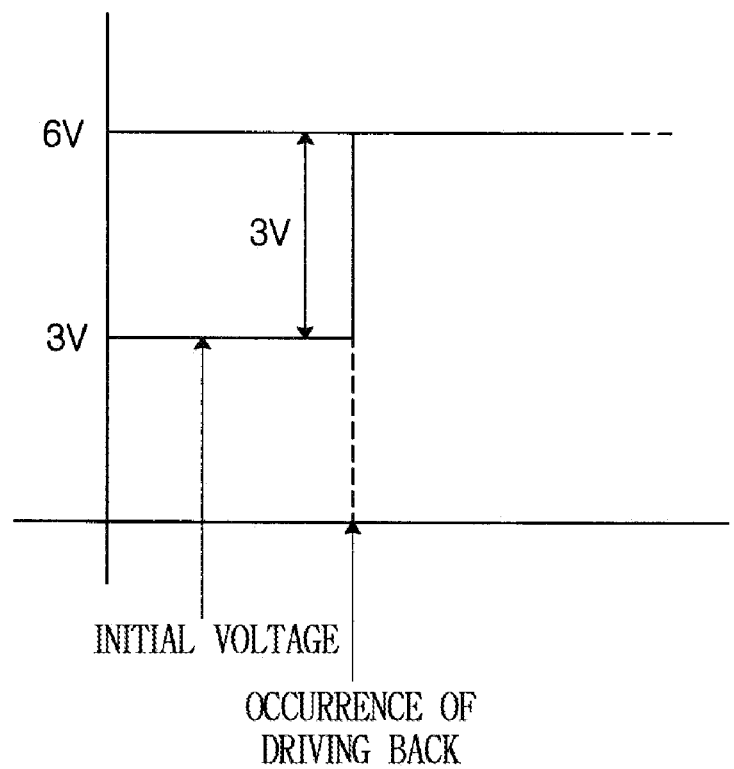
[ FIG. 9B ]
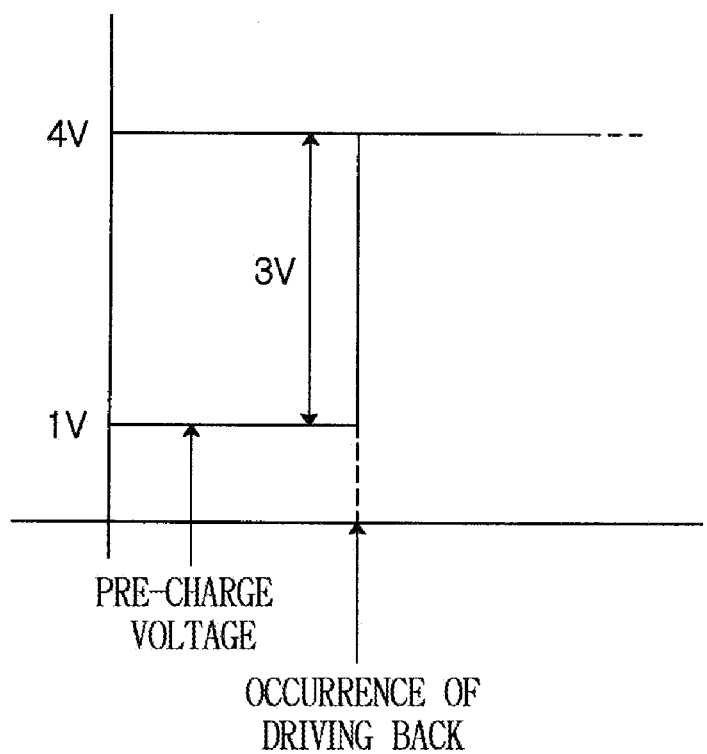

[ FIG. 10 ]
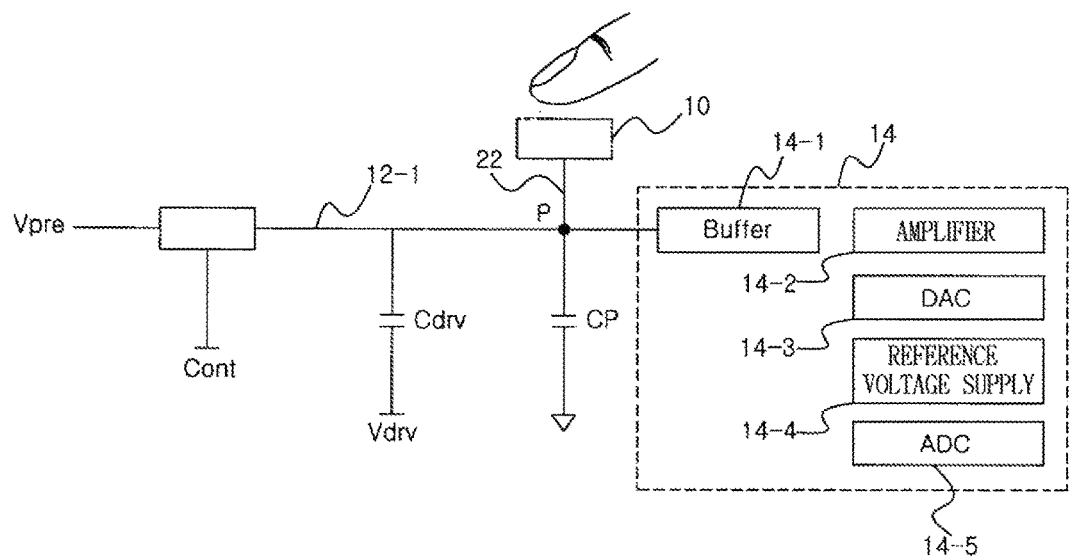
[ FIG. 11 ]
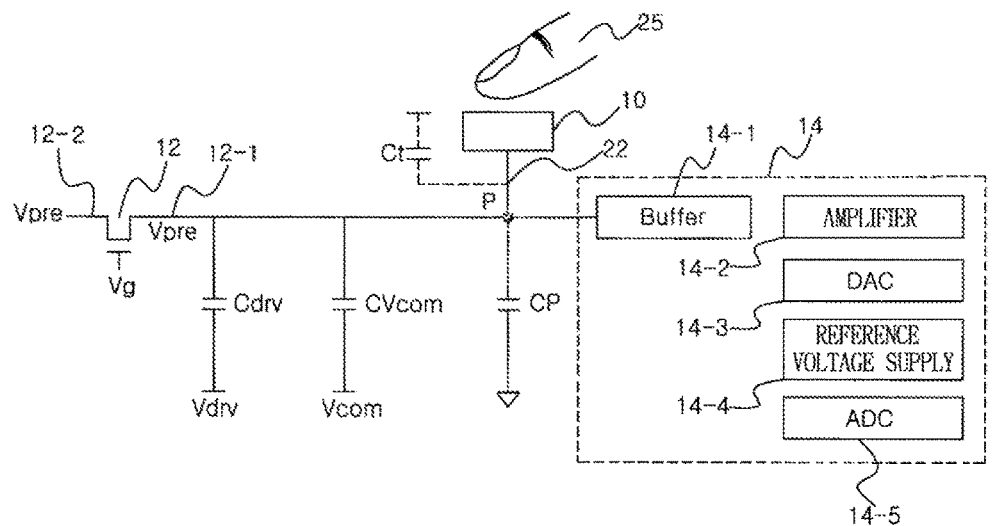

[ FIG. 12 ]
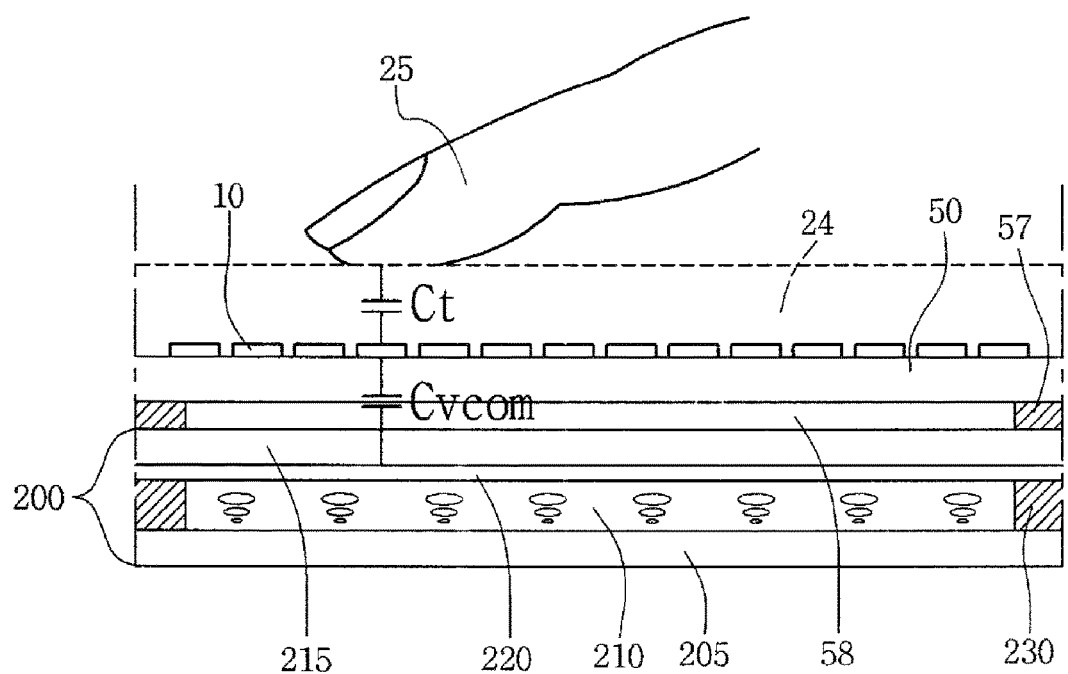
[ FIG. 13 ]
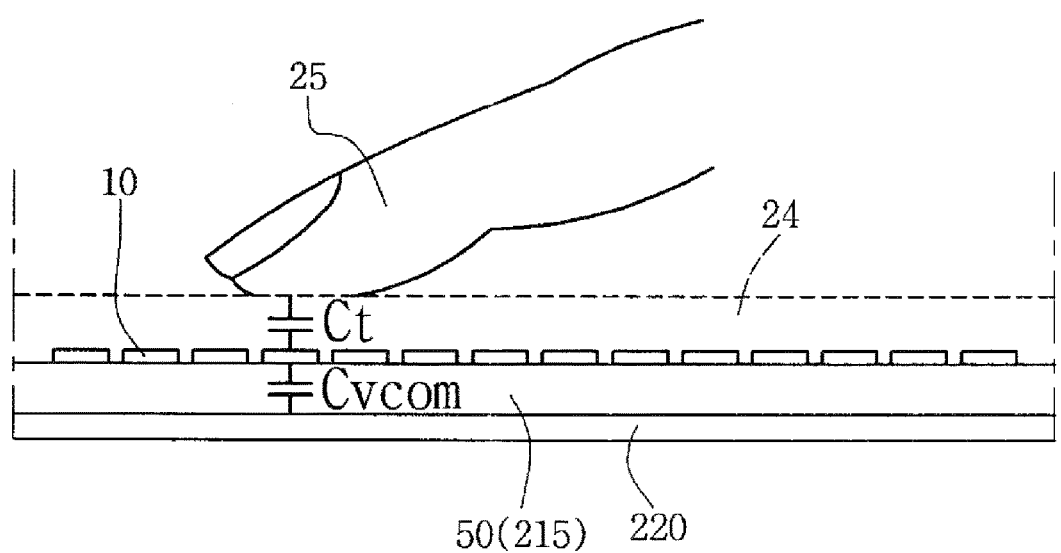

[ FIG. 14A ]
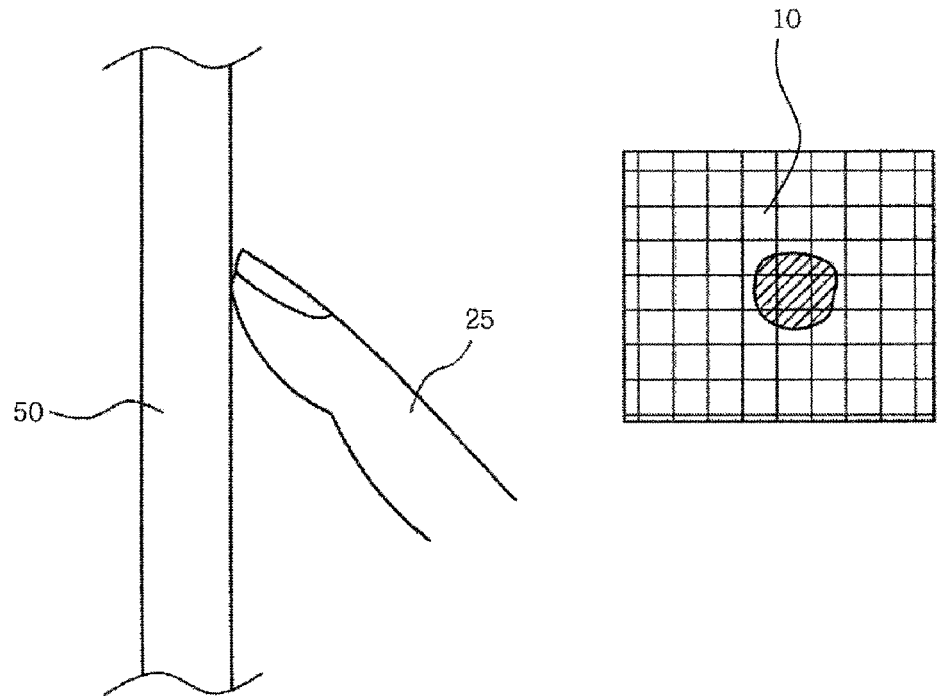
[ FIG. 14B ]
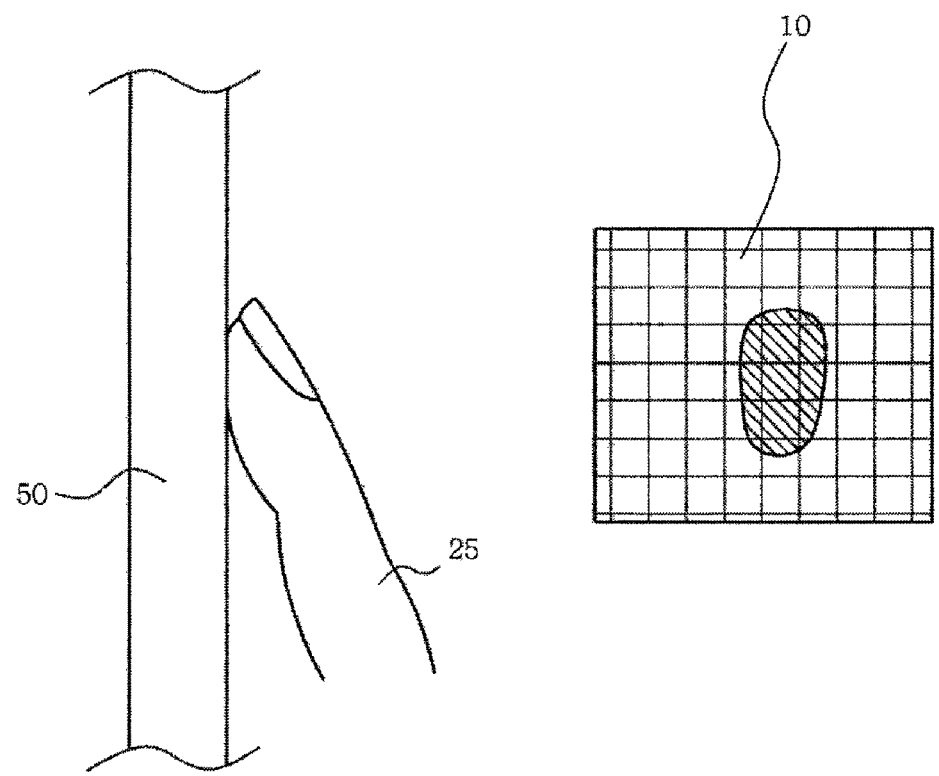

[ FIG. 15A ]
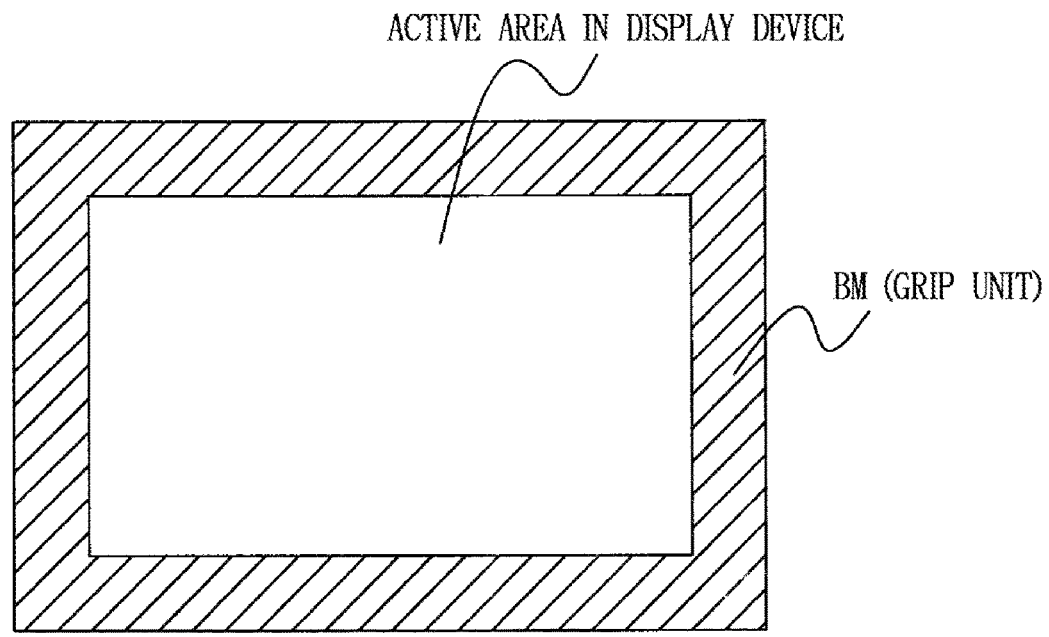
[ FIG. 15B ]
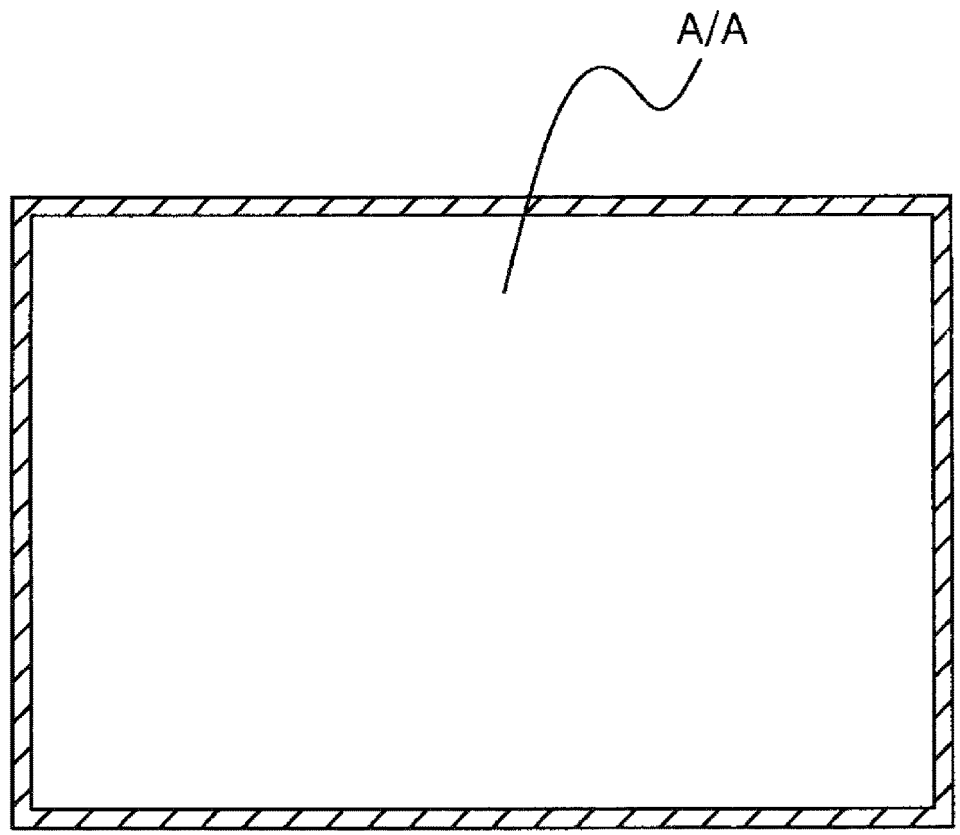

[ FIG. 15C ]
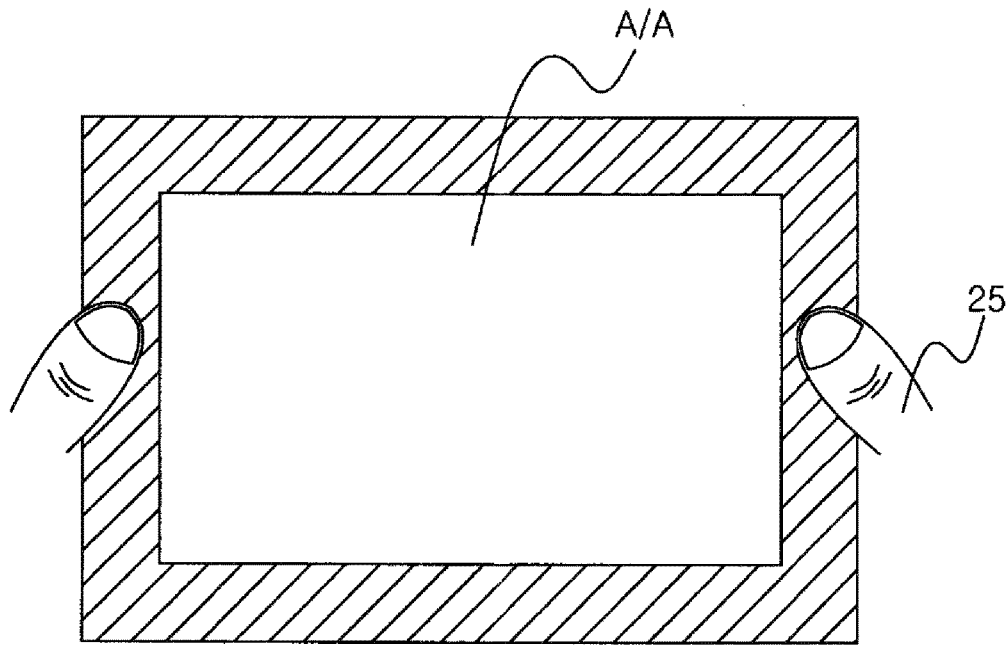
[ FIG. 16 ]
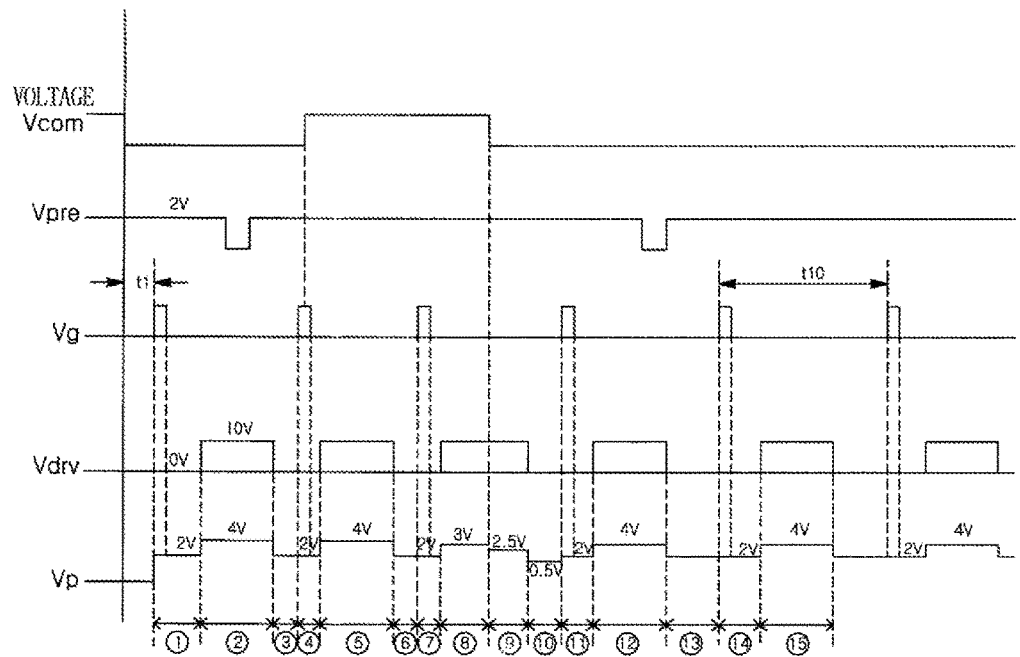

[ FIG. 17 ]
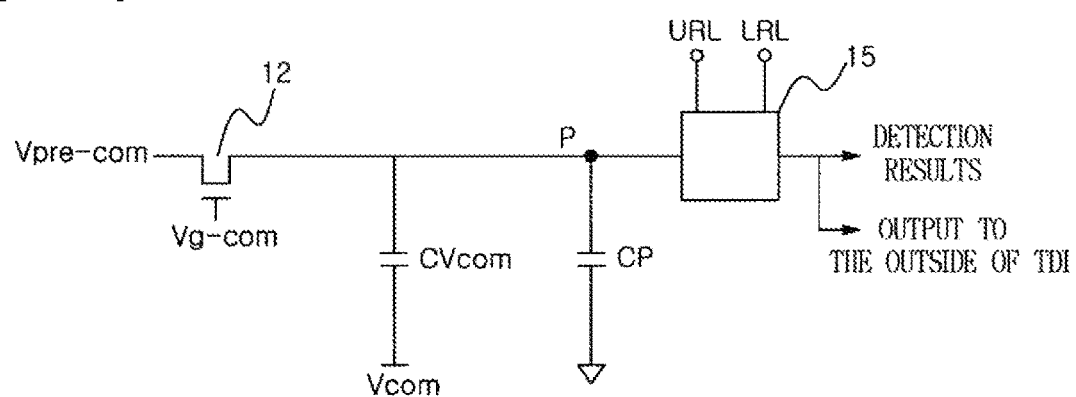

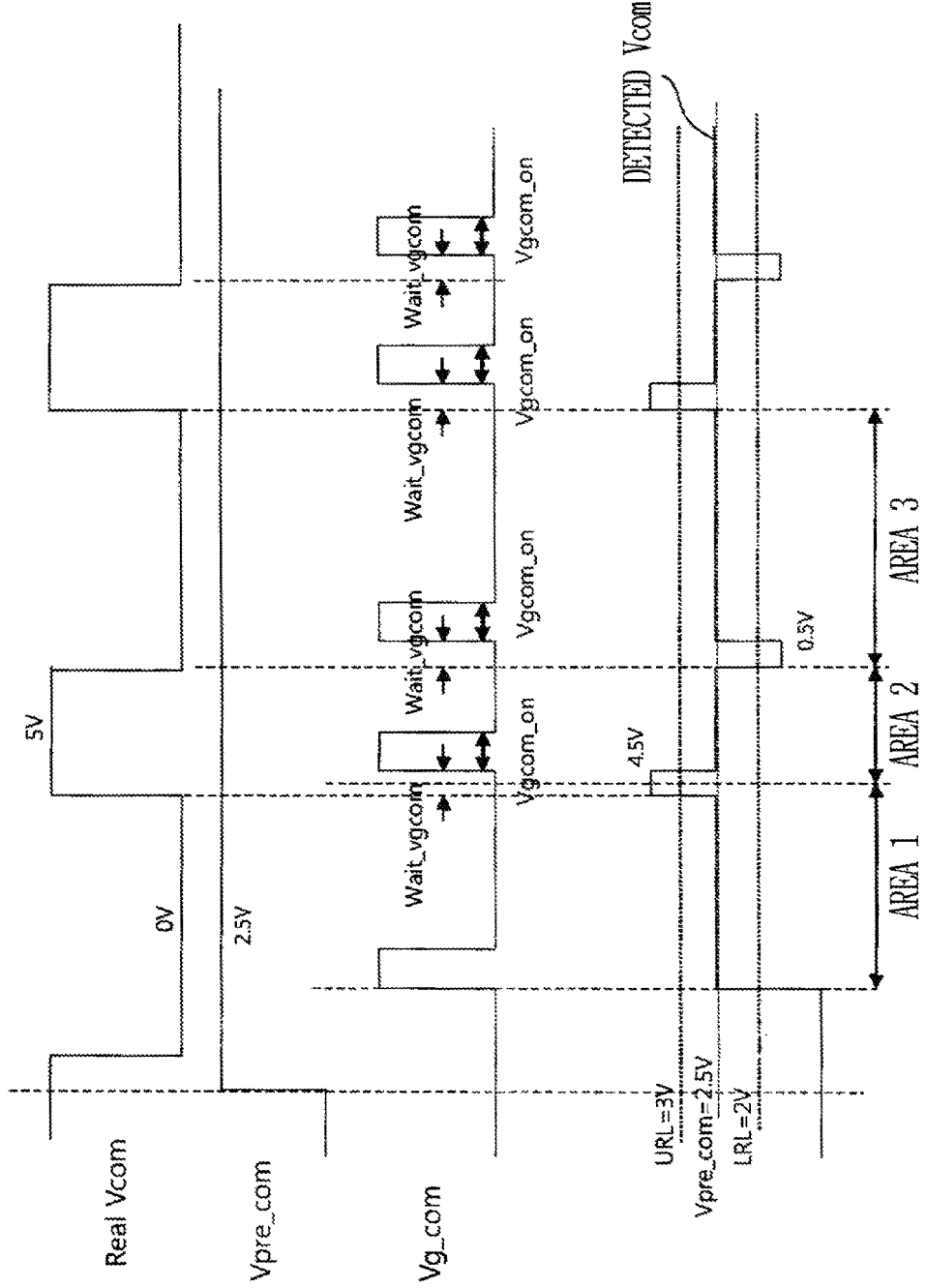
[FIG. 18]

[ FIG. 19 ]
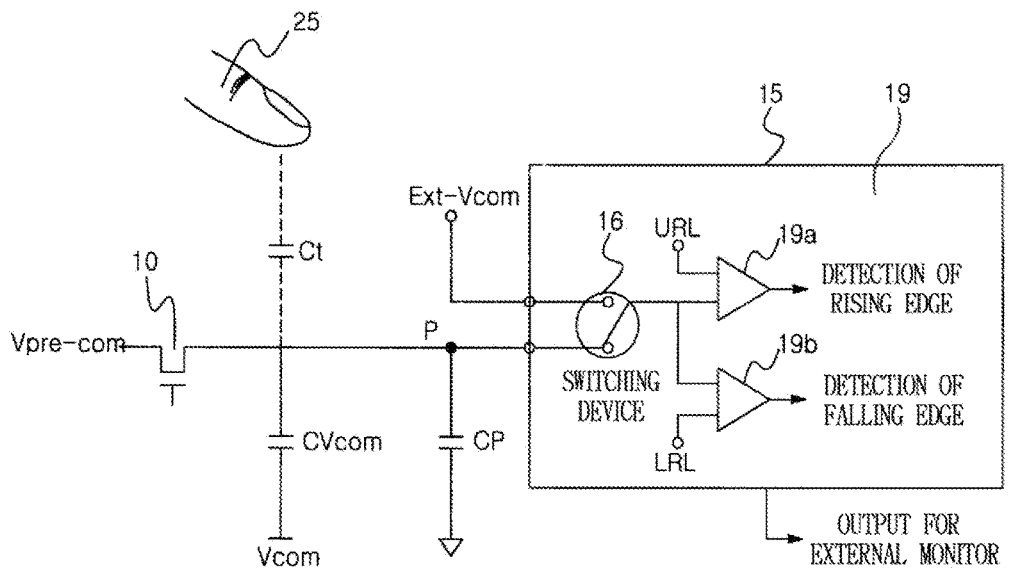
[ FIG. 20 ]
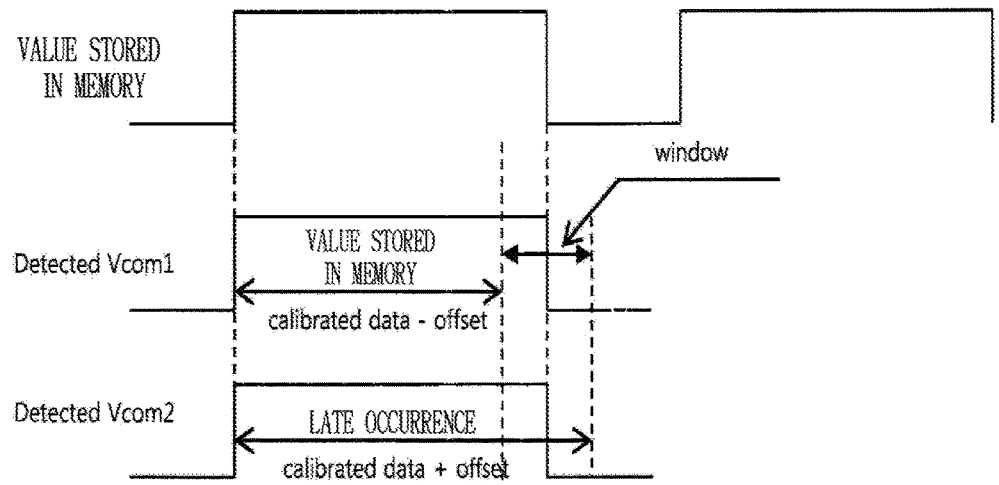

[ FIG. 21 ]
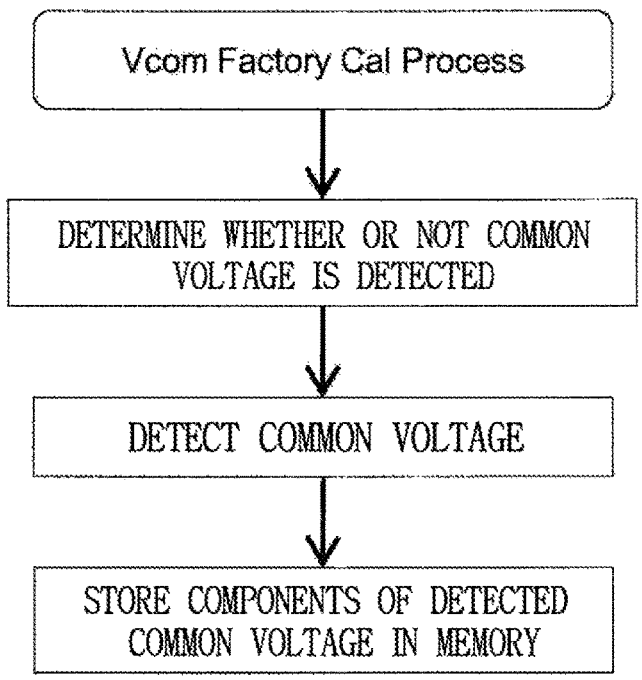
[ FIG. 22 ]
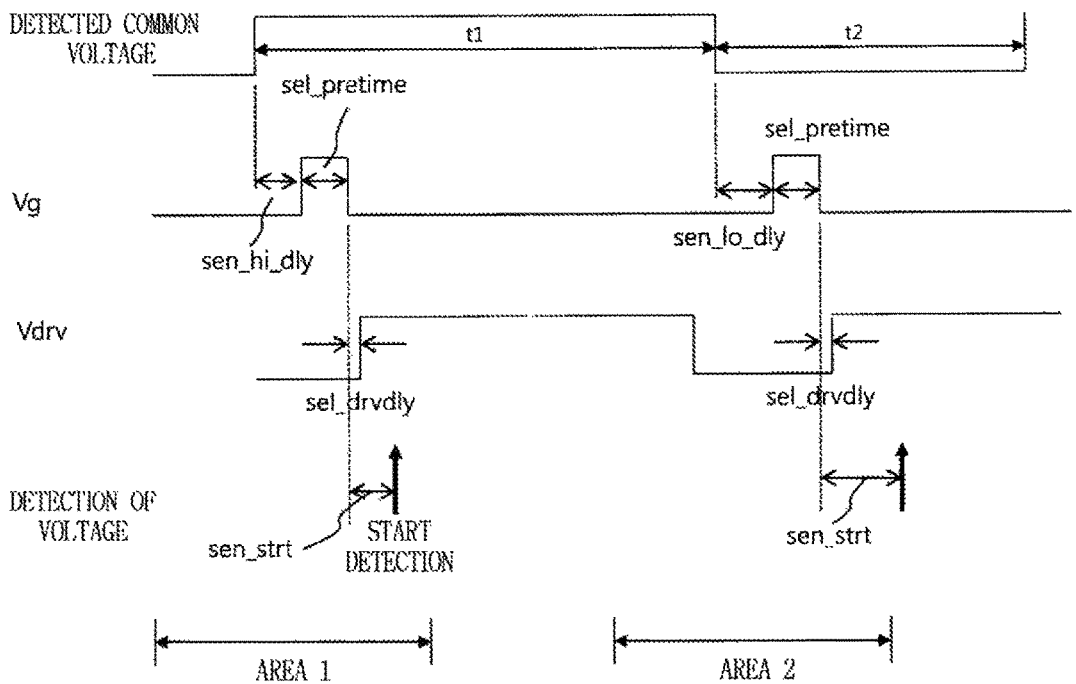

[ FIG. 23 ]
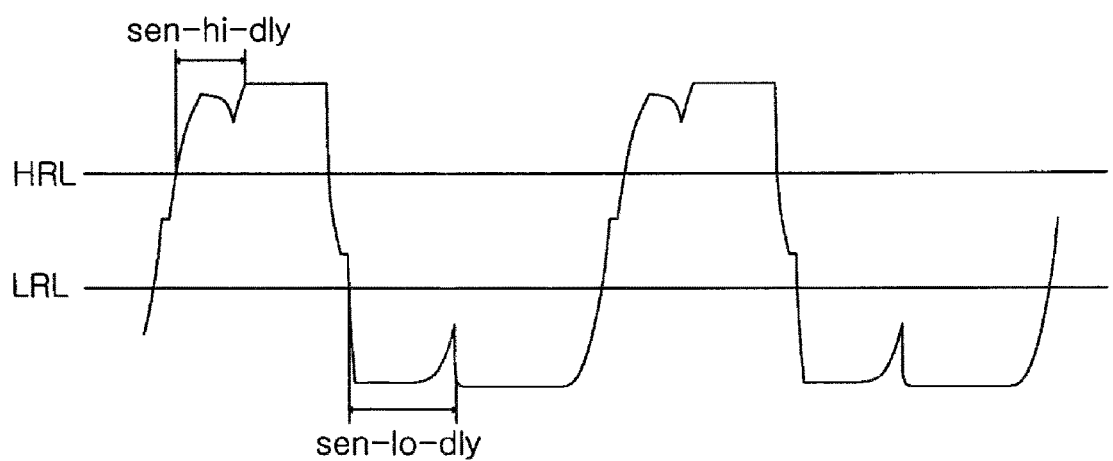
[ FIG. 24 ]
| address | 07h | 06h | 05h | 04h | 03h | 02h | 01h | 00h |
|---|---|---|---|---|---|---|---|---|
| Voltage | 16V | 14V | 12V | 10V | 8V | 6V | 4V | 2V |

[FIG. 25]
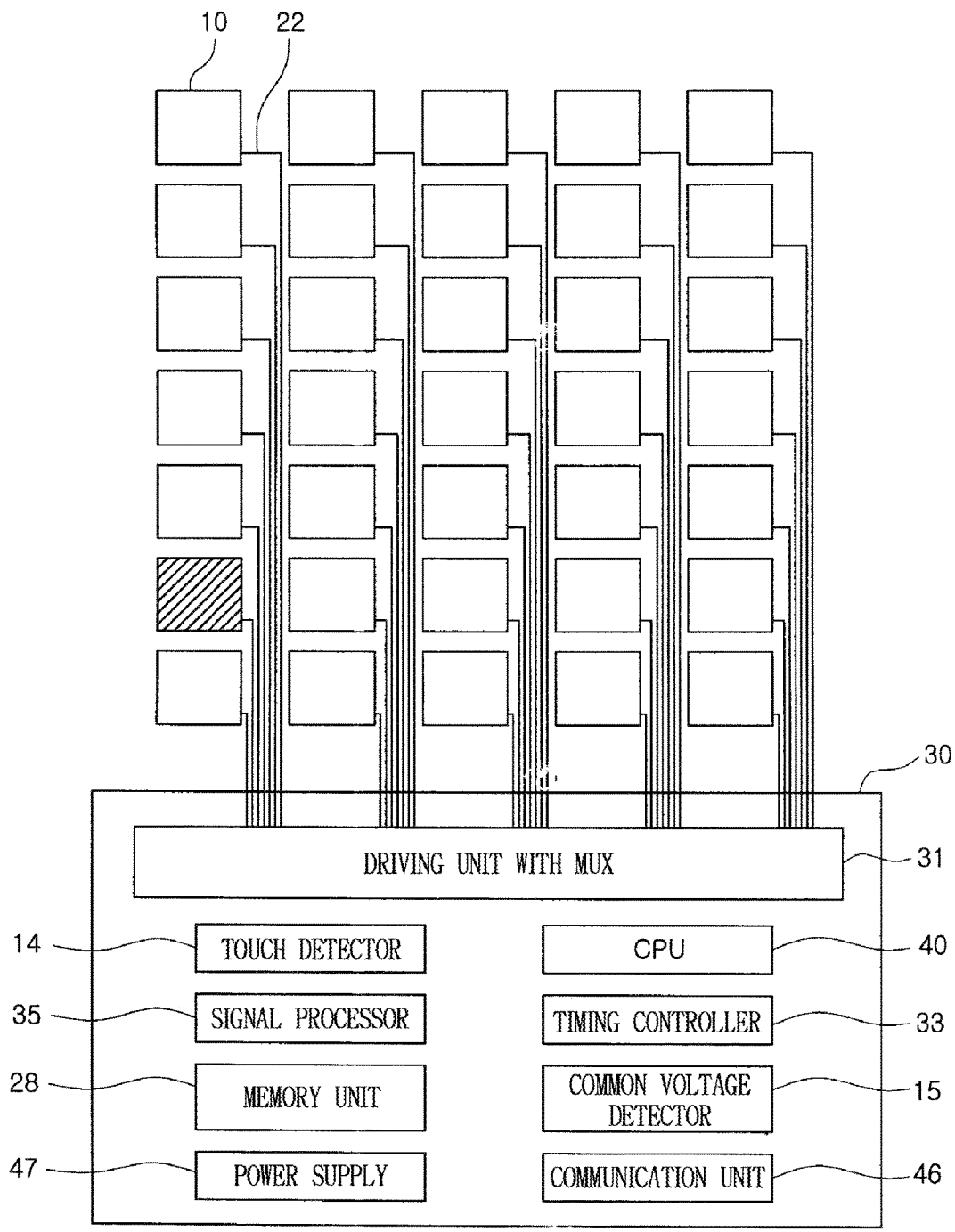

[ FIG. 26A ]
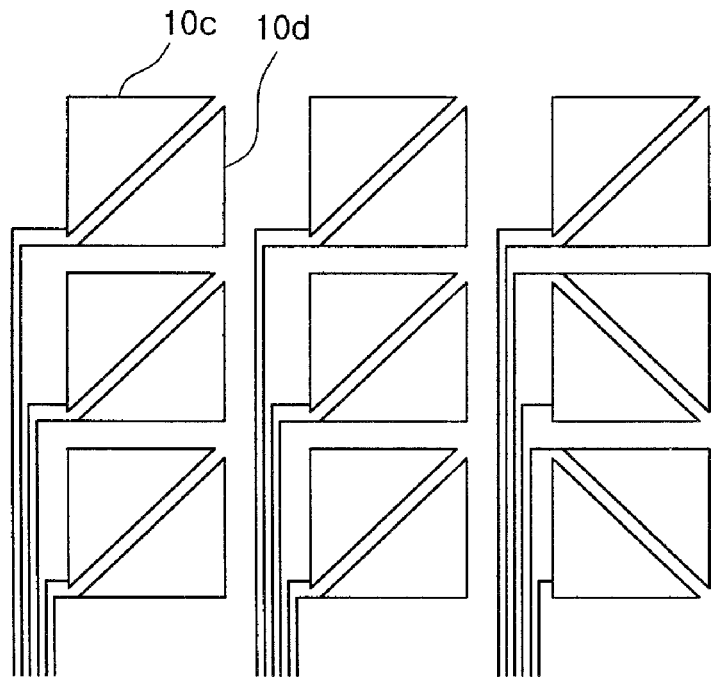
[ FIG. 26B ]
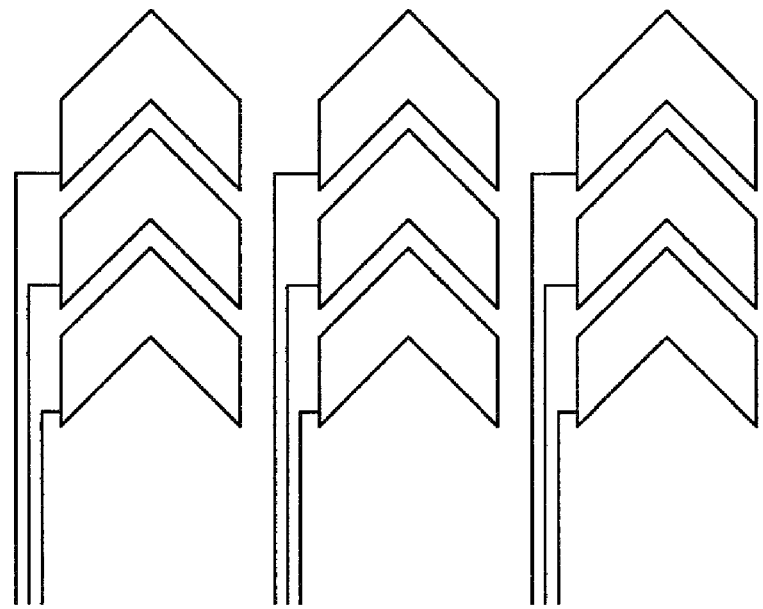

[ FIG. 26C ]
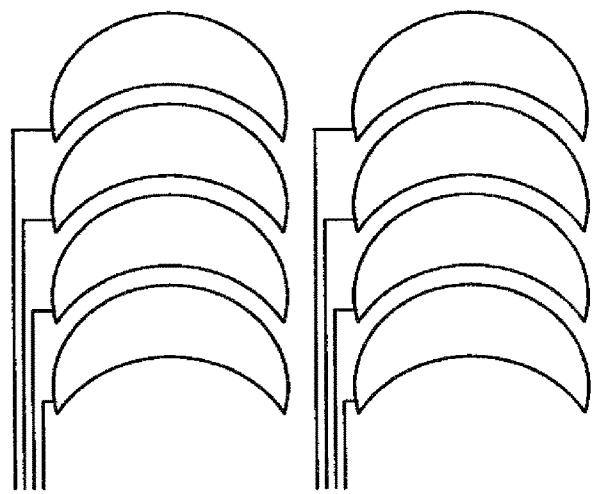
[ FIG. 27 ]
(PRIOR ART)
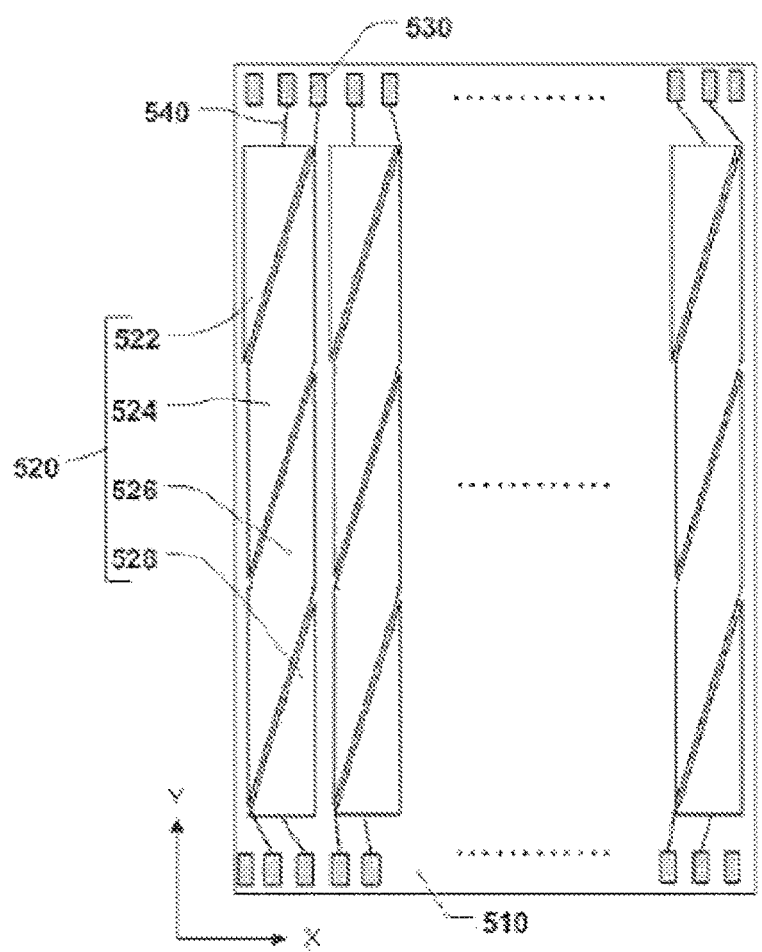

[ FIG. 28 ]
(PRIOR ART)
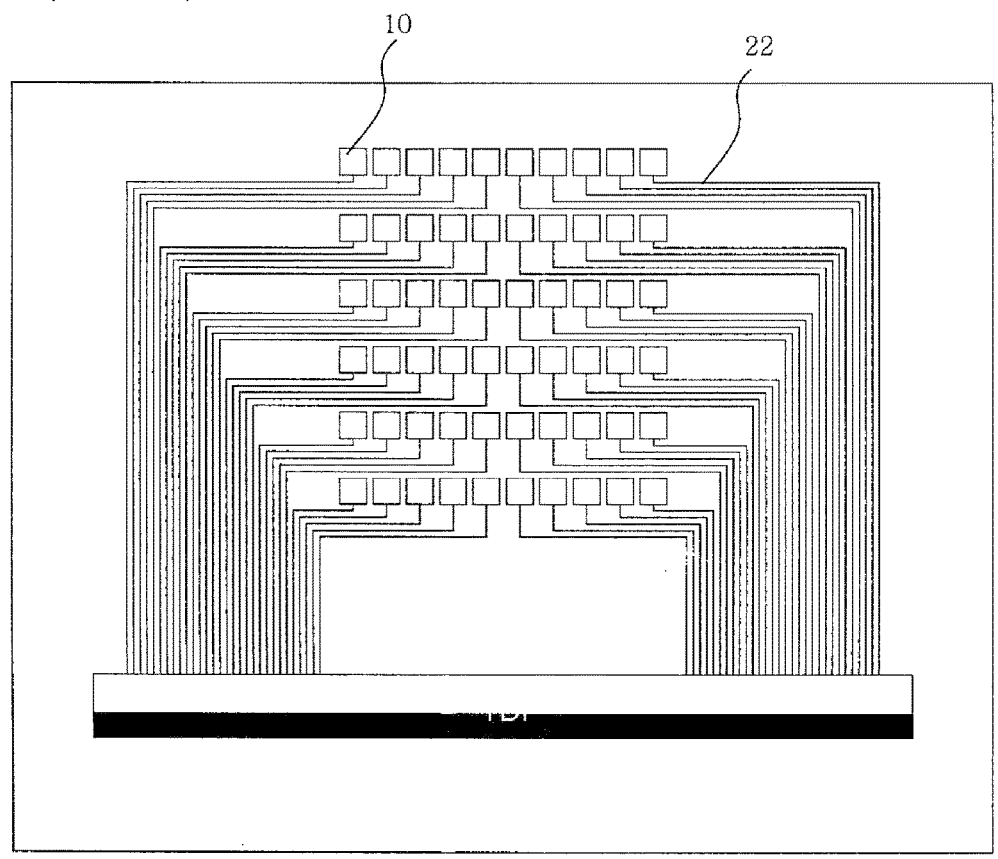
[ FIG. 29 ]
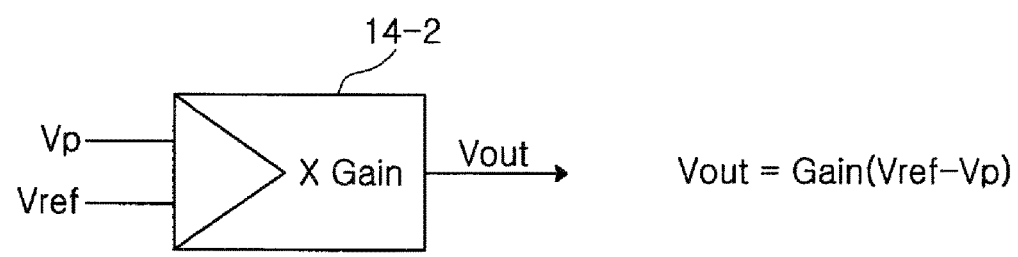
Vout = Gain(Vref−Vp)

[ FIG. 30 ]
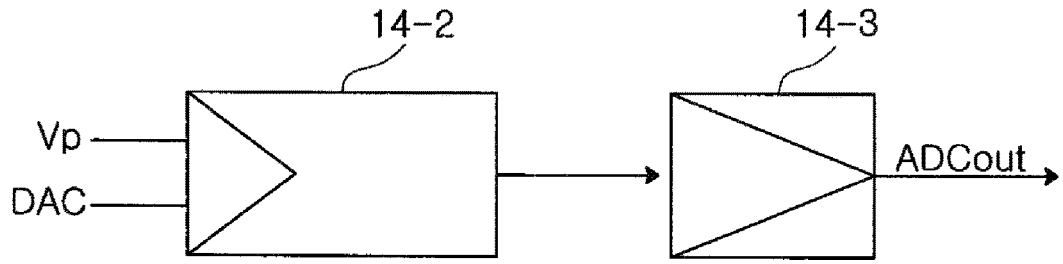
[ FIG. 31 ]
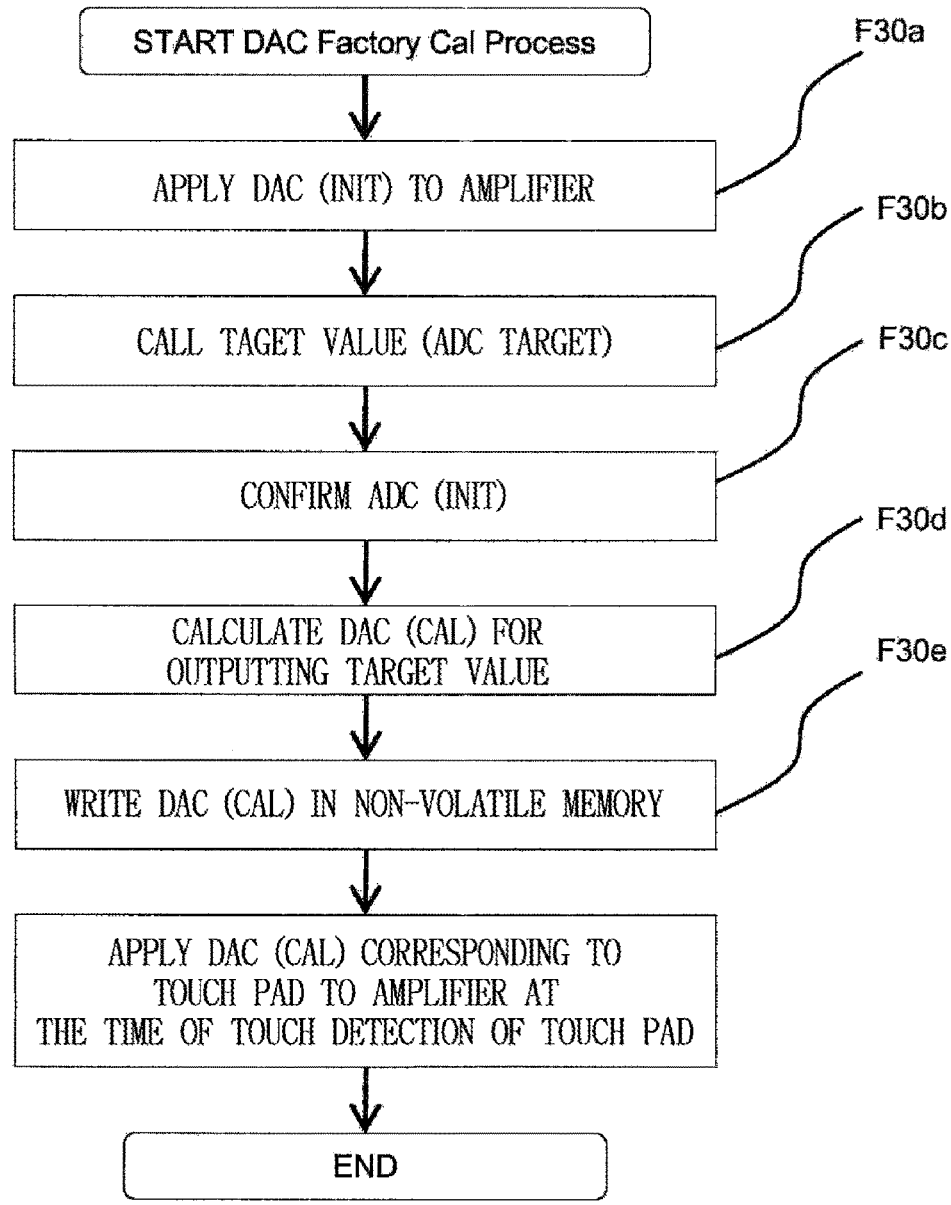

[ FIG. 32 ]
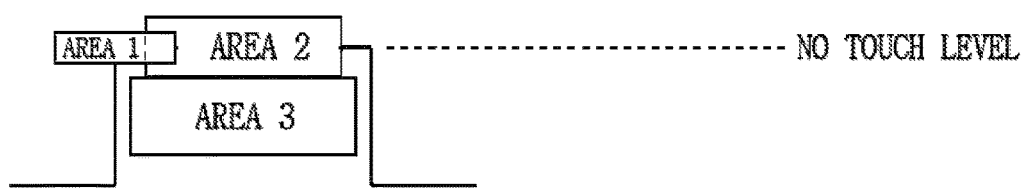
[ FIG. 33 ]
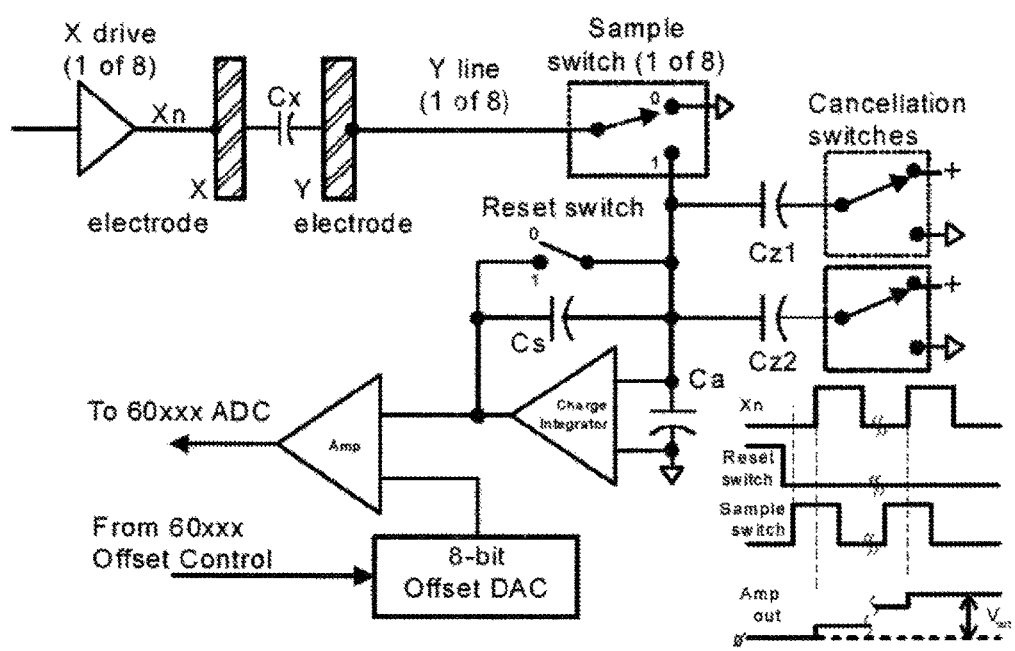

[ FIG. 34 ]
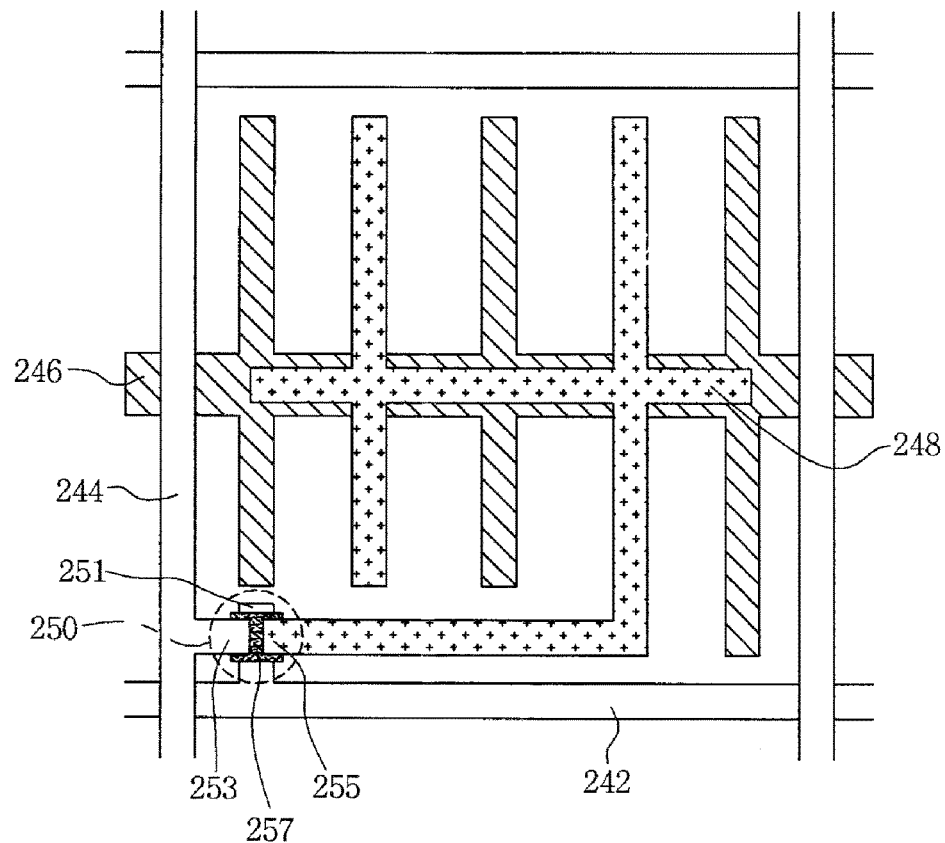
[ FIG. 35 ]
(PRIOR ART)
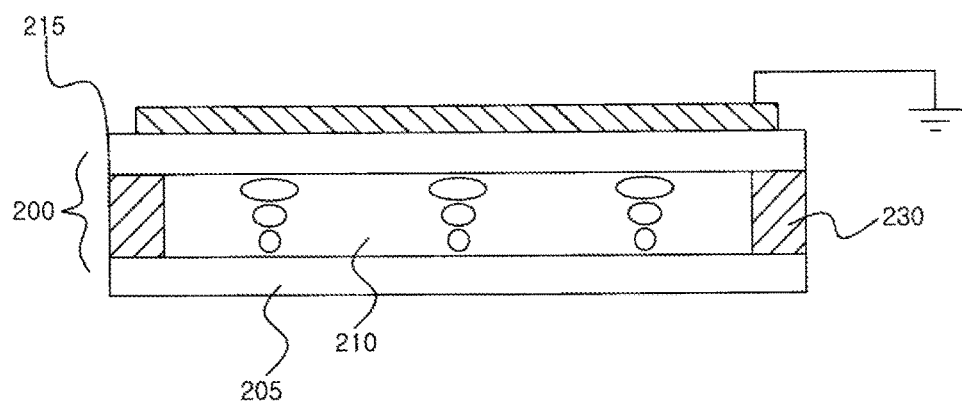

[ FIG. 36 ]
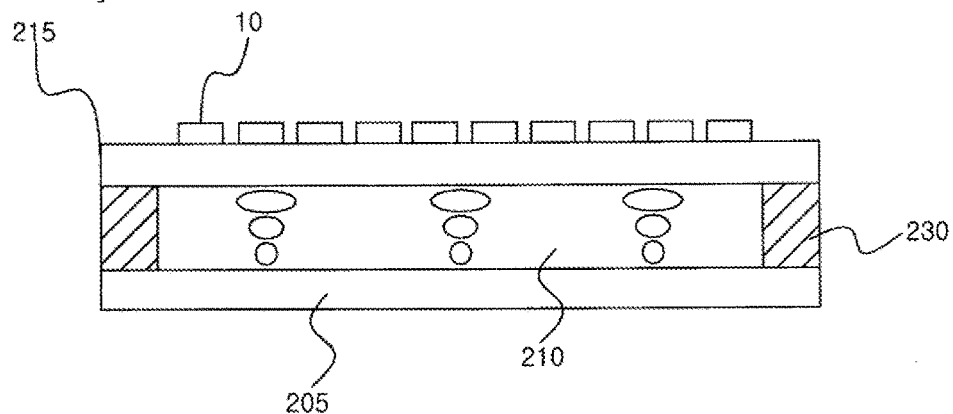
[ FIG. 37 ]
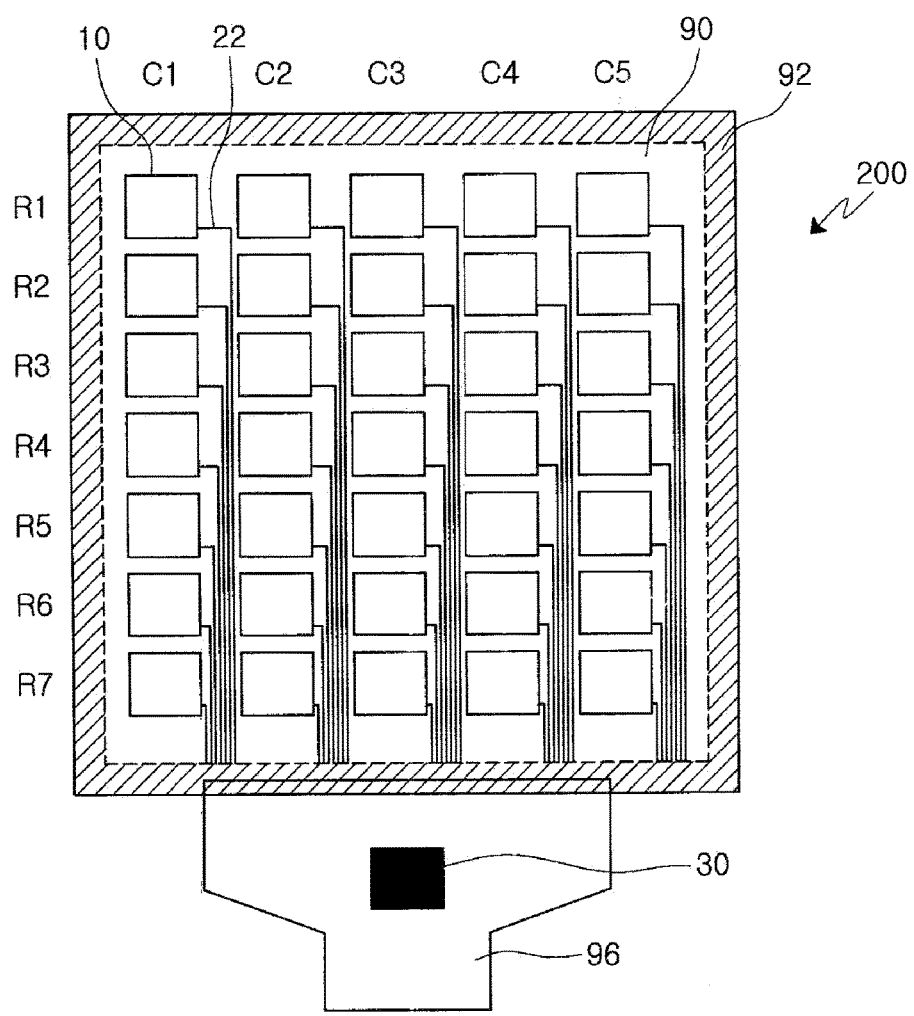

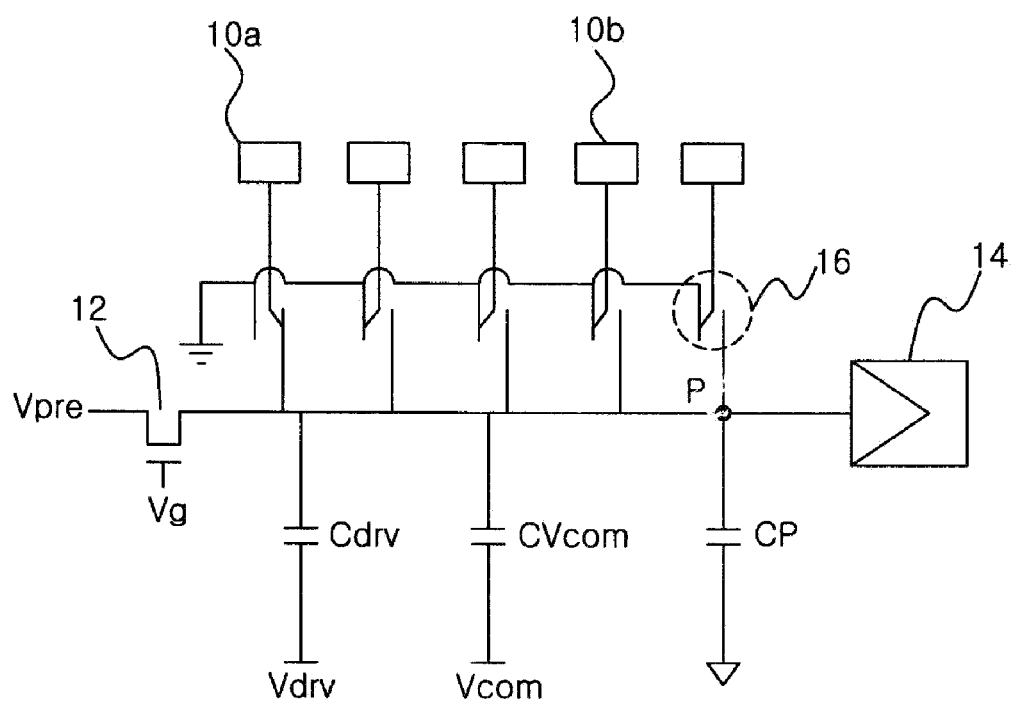
[ FIG. 38 ]

[FIG. 39]
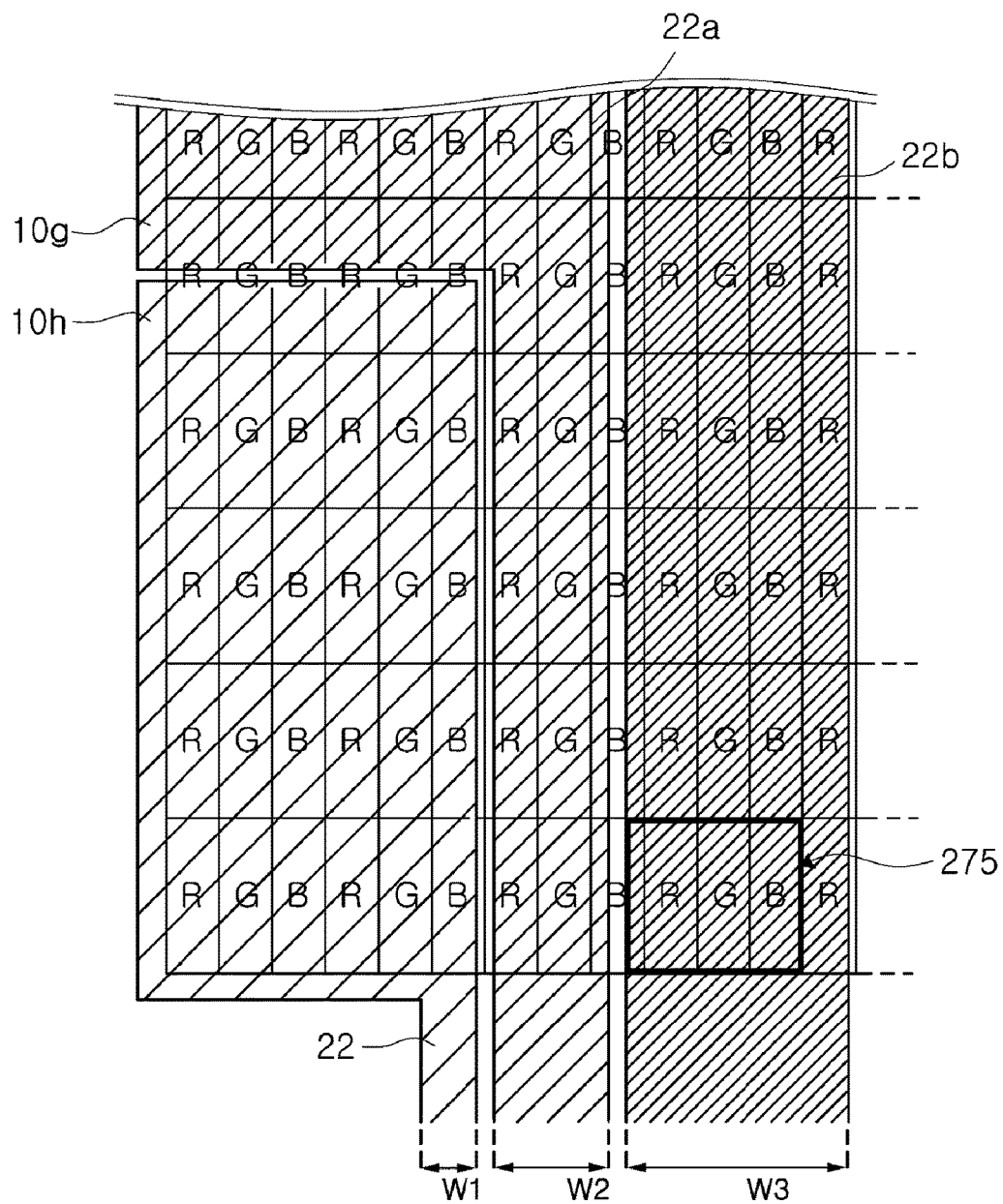

[ FIG. 40A ]
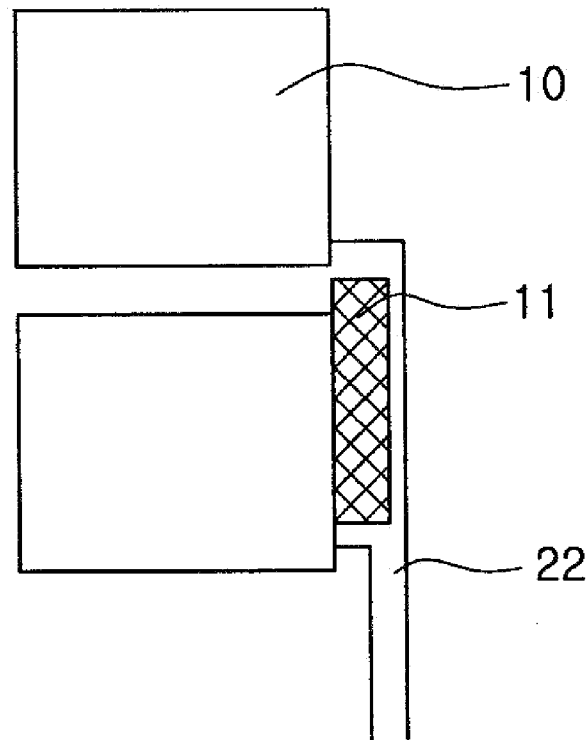
[ FIG. 40B ]
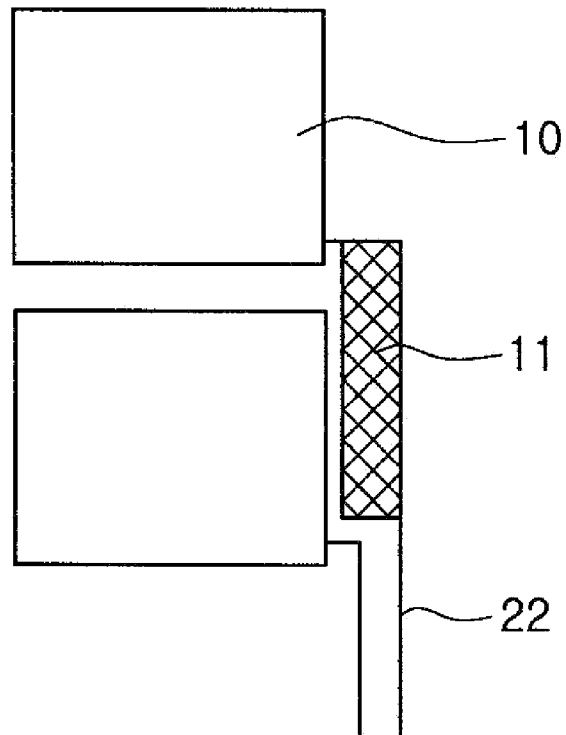

[ FIG. 40C ]
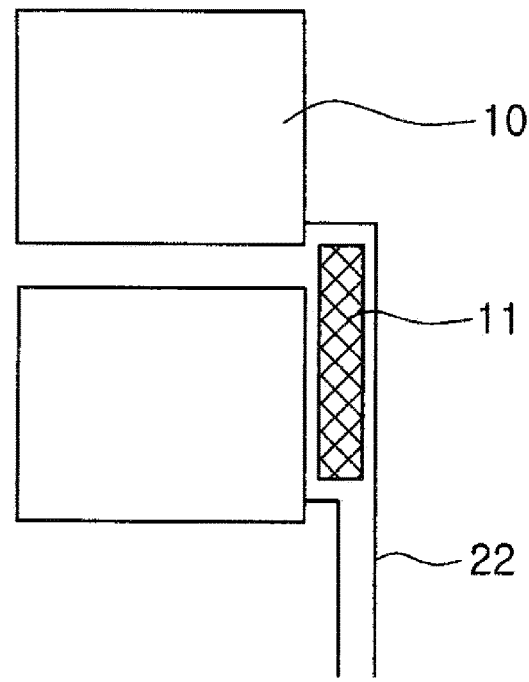
[ FIG. 41 ]
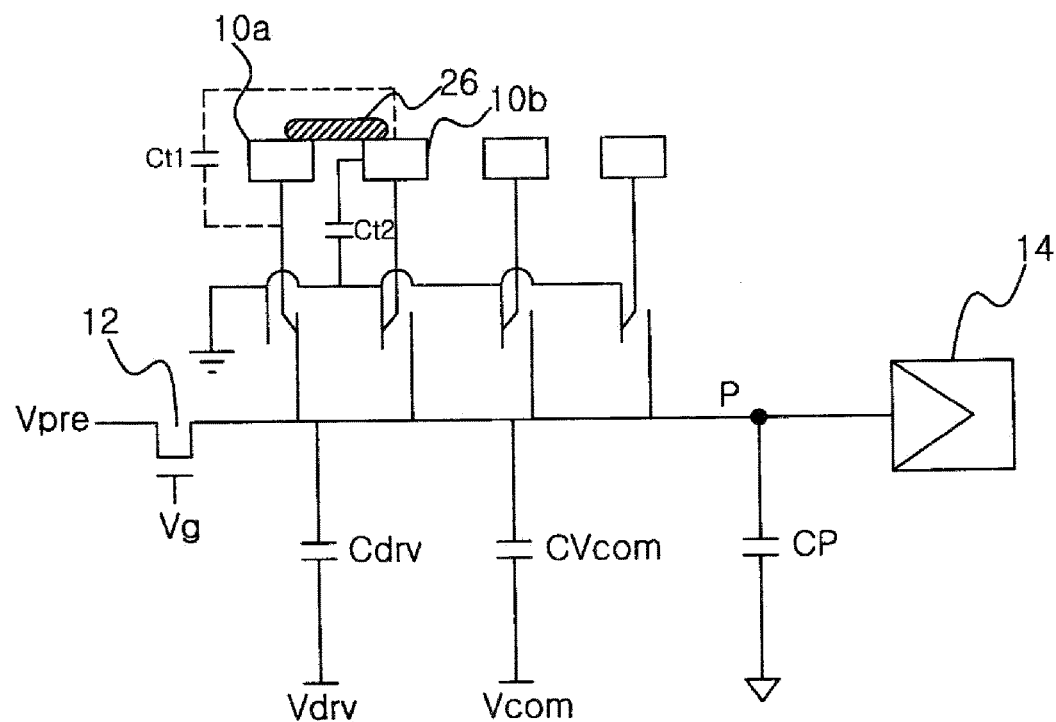

[ FIG. 42 ]
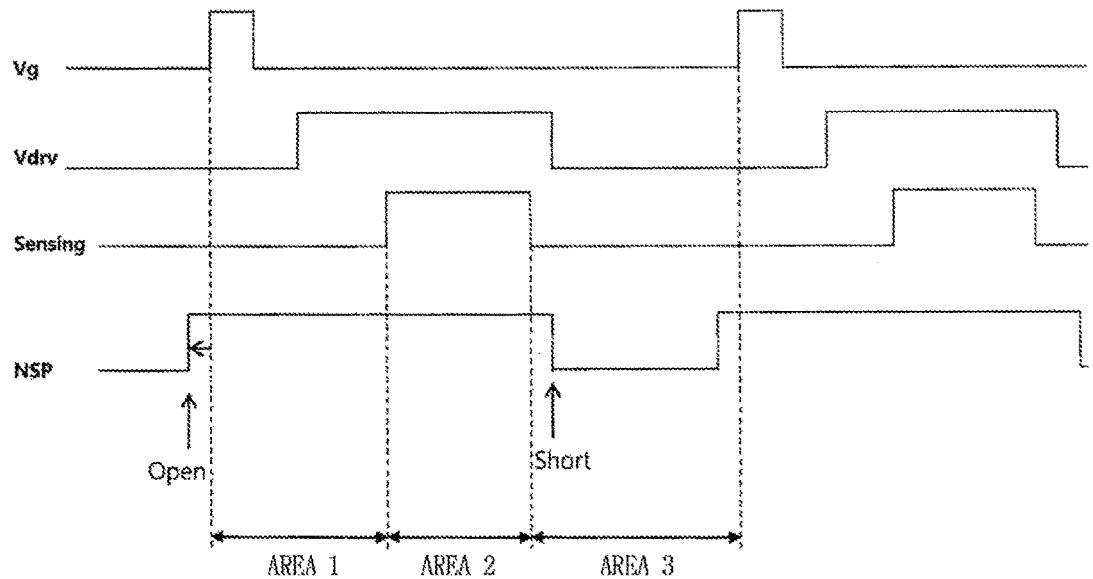
[ FIG. 43 ]
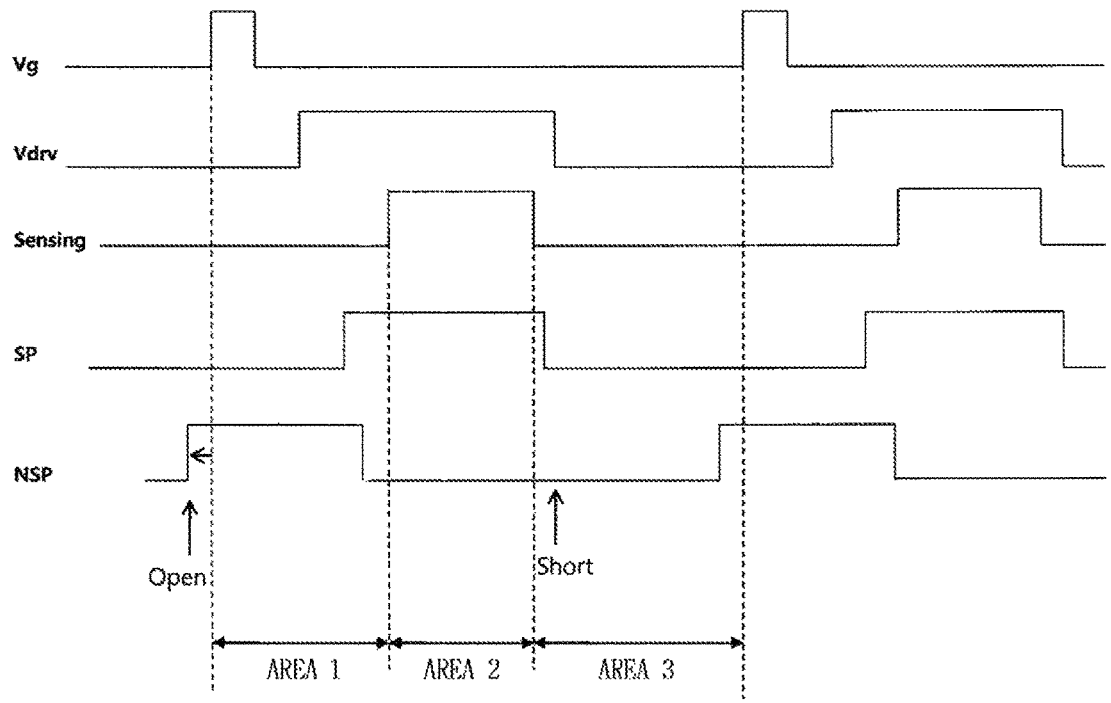

[ FIG. 44A ]
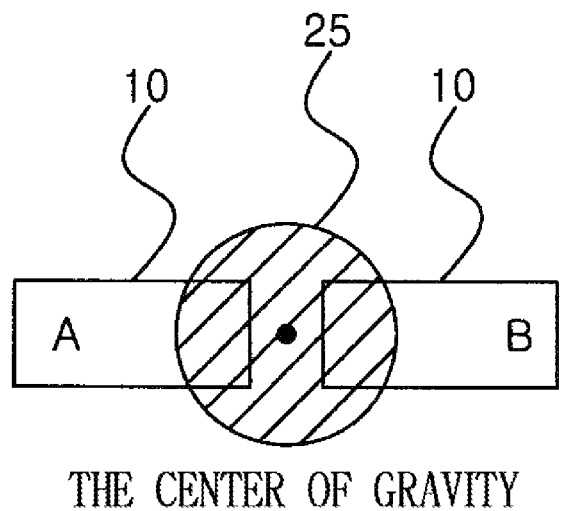
THE CENTER OF GRAVITY
[ FIG. 44B ]
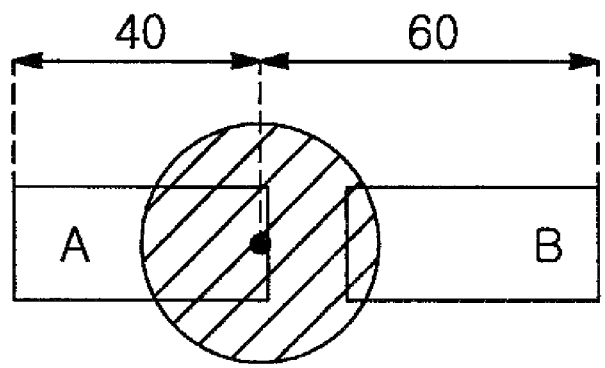

[ FIG. 45 ]

[ FIG. 46 ]
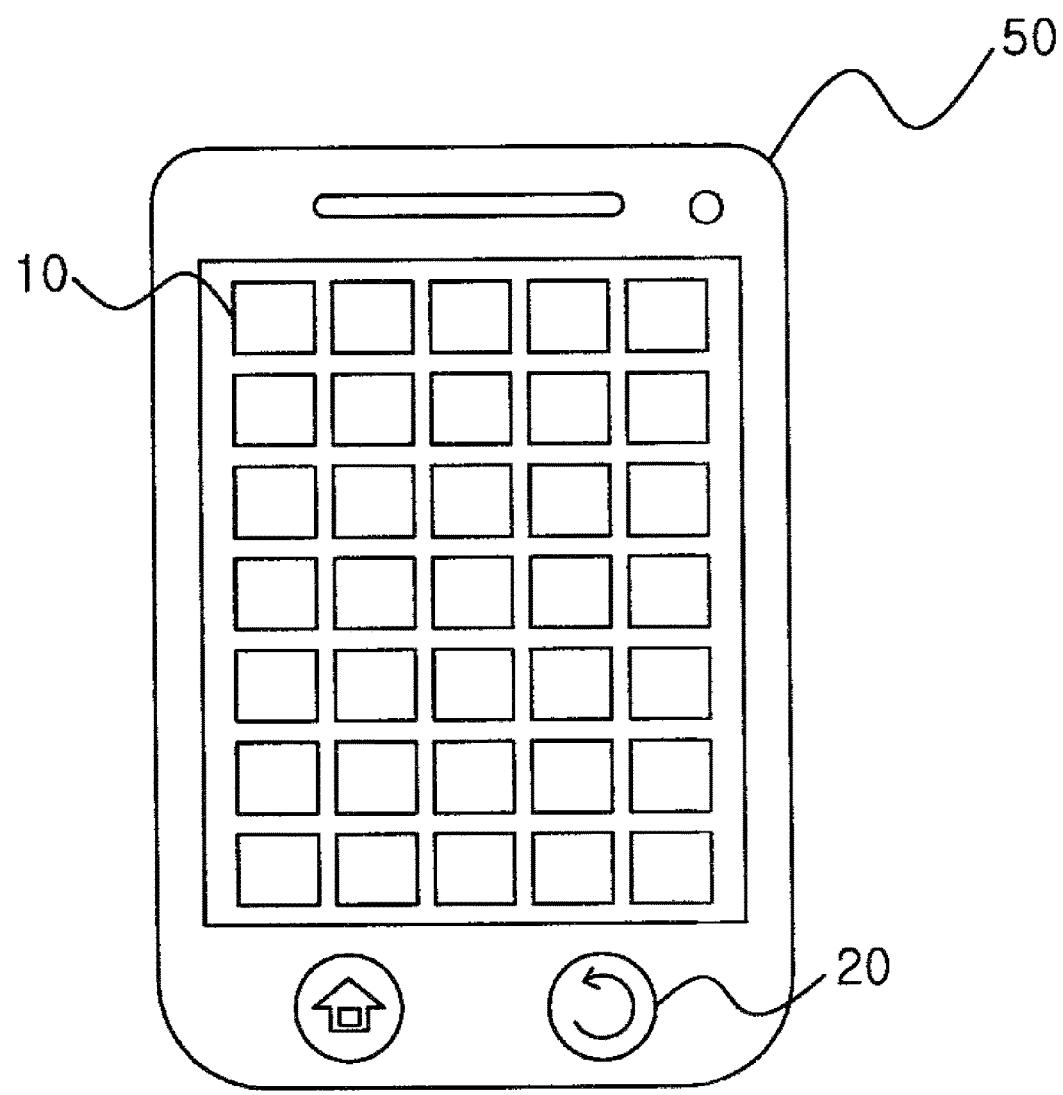

[ FIG. 47 ]
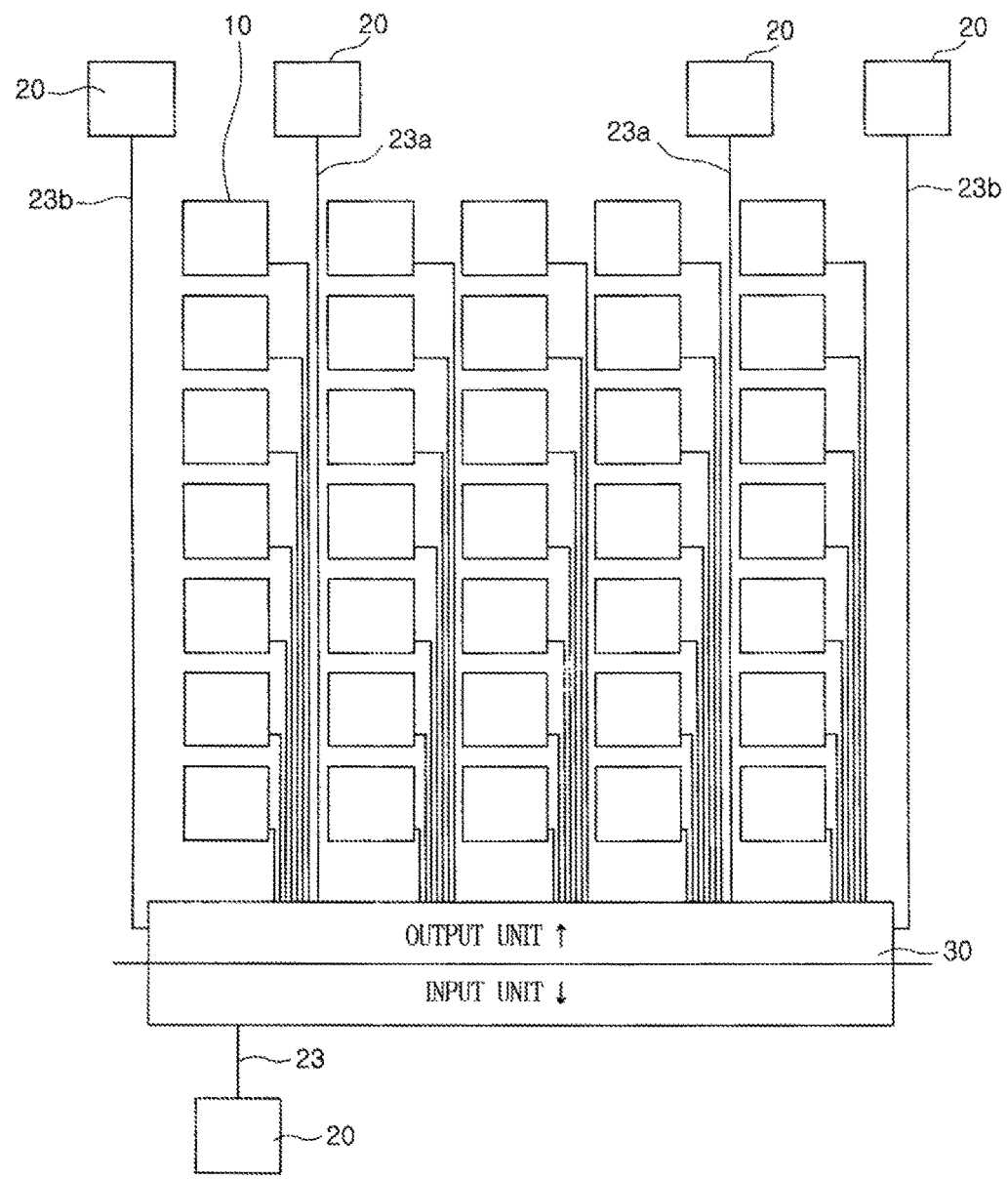

[ FIG. 48 ]
| Register Value | ADC (Code) | Register Value | ADC (Code) |
|---|---|---|---|
| 00h | 50 | 08h | 450 |
| 01h | 100 | 09h | 500 |
| 02h | 150 | 0Ah | 550 |
| 03h | 200 | 0Bh | 600 |
| 04h | 250 | 0Ch | 650 |
| 05h | 300 | 0Dh | 700 |
| 06h | 350 | 0Eh | 750 |
| 07h | 400 | 0Fh | 800 |
[ FIG. 49 ]
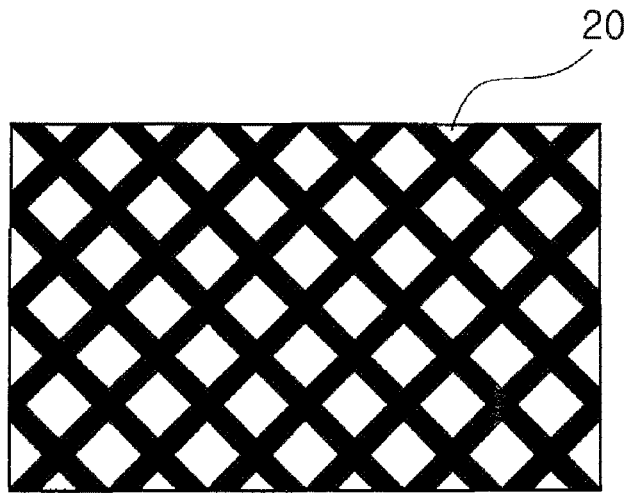

[ FIG. 50 ]
(PRIOR ART)
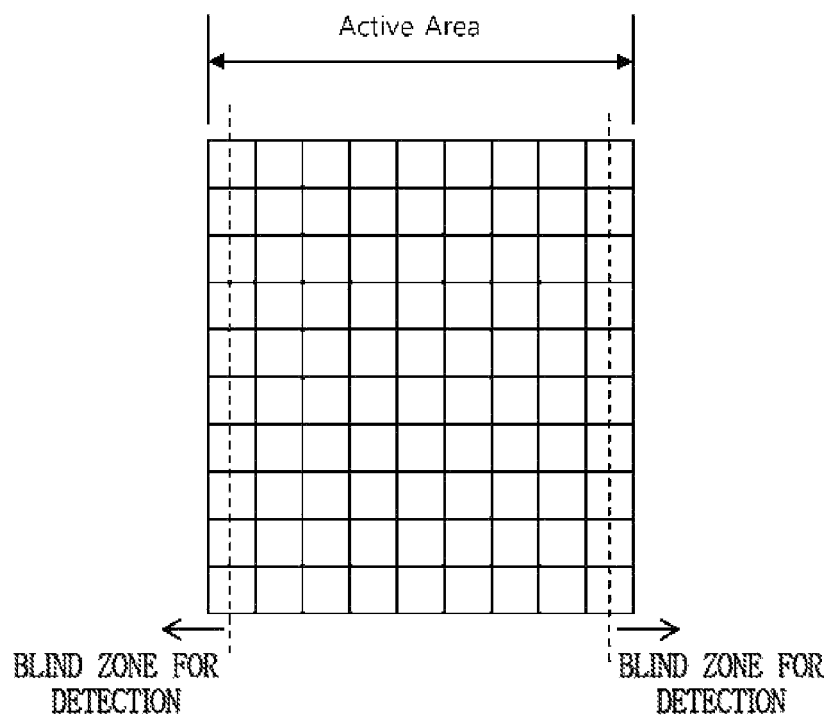
[ FIG. 51 ]
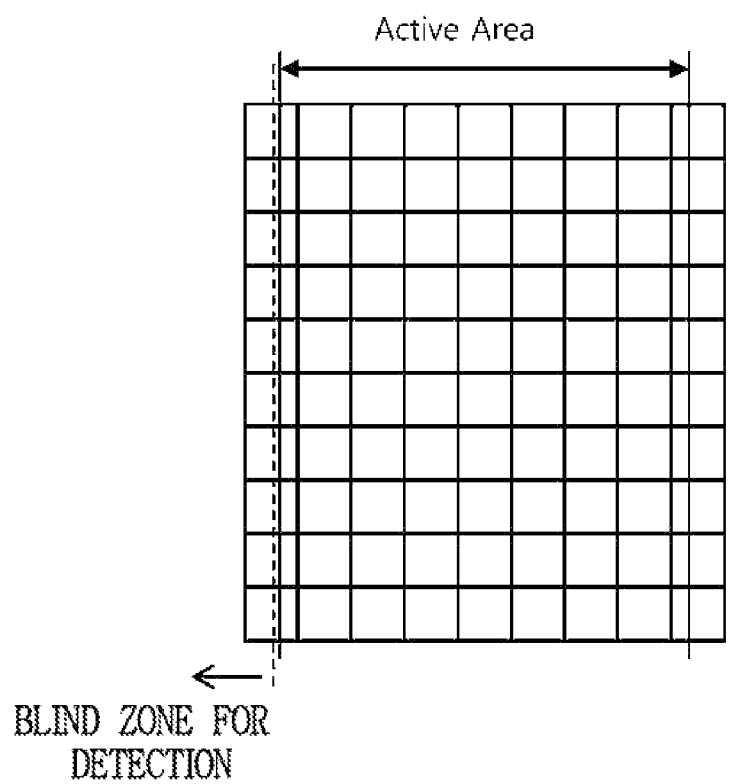

[ FIG. 52 ]
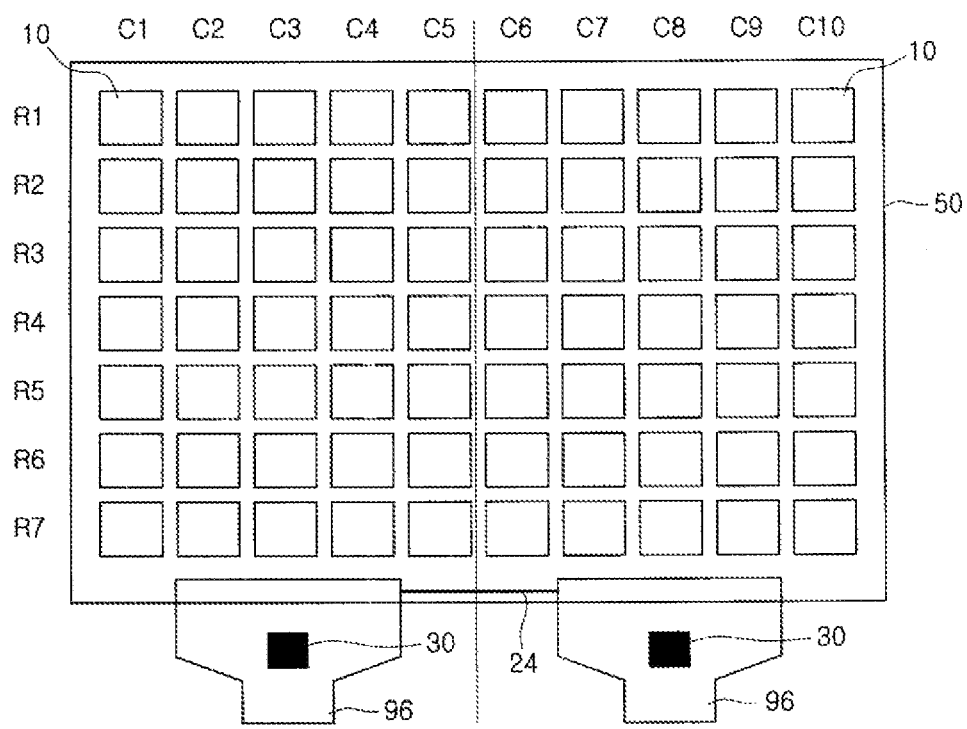
[ FIG. 53 ]
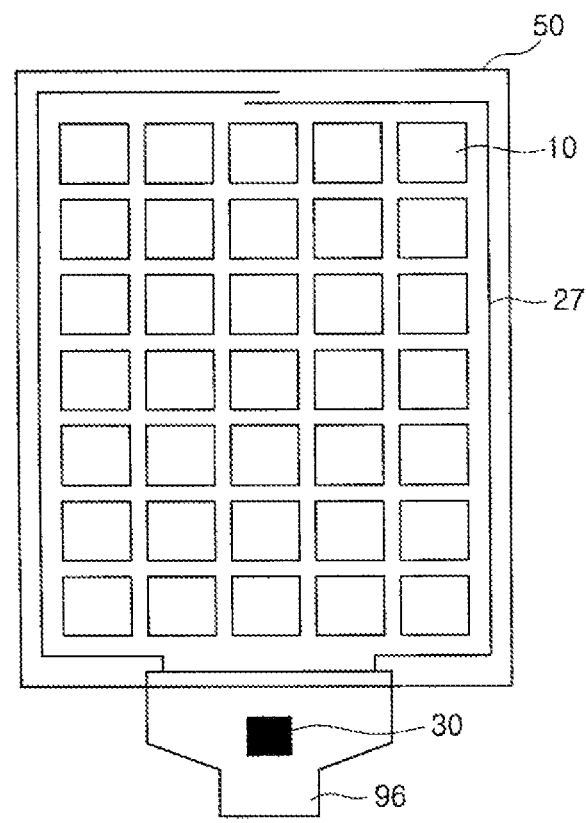

[ FIG. 54 ]
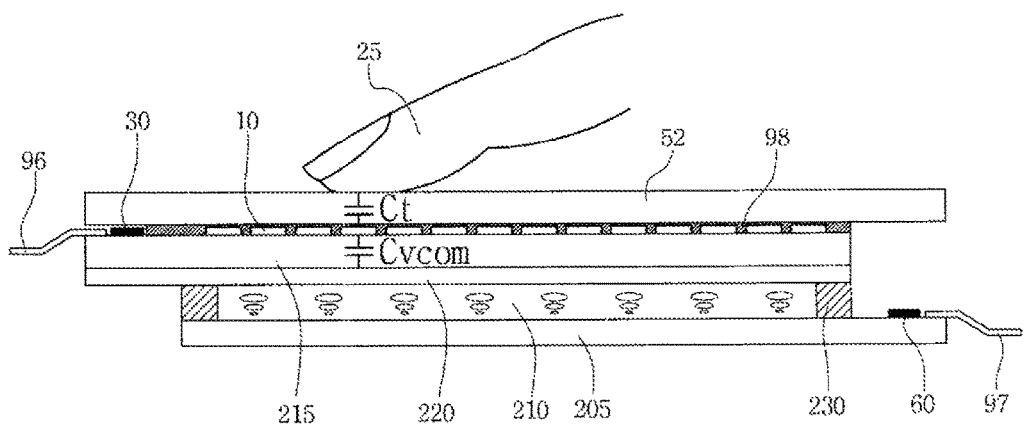
[ FIG. 55 ]
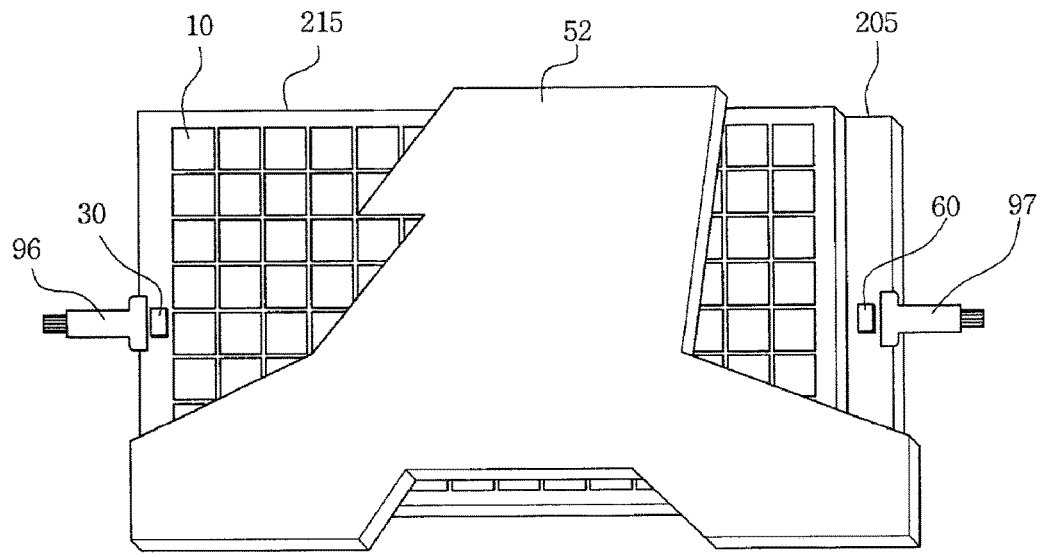

[ FIG. 56 ]
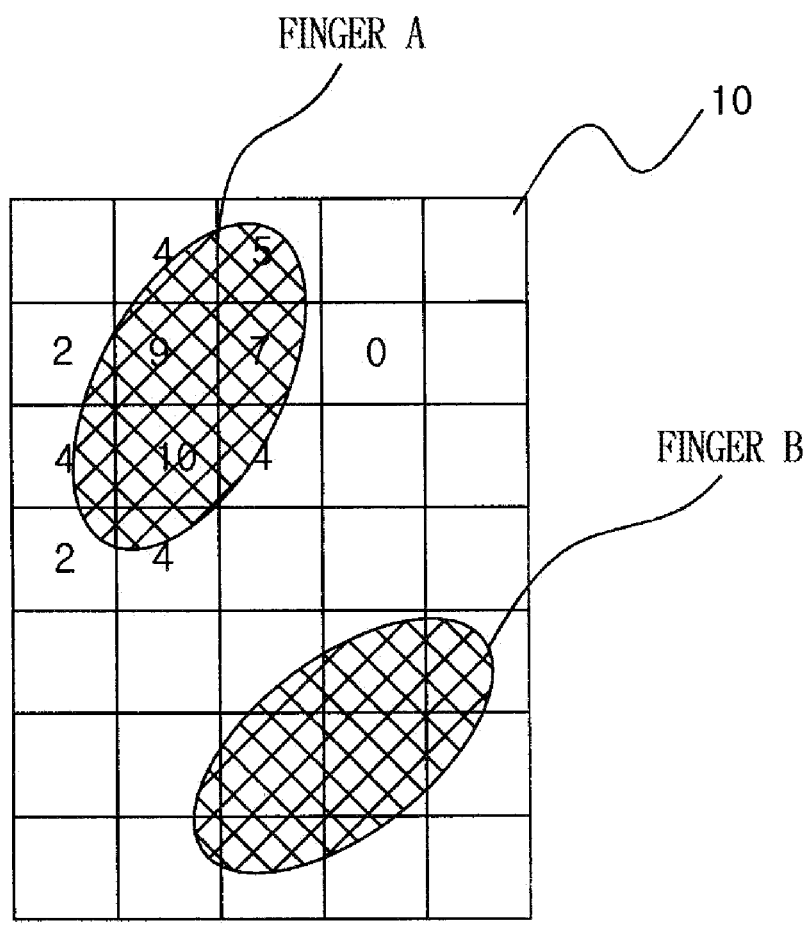

TOUCH DETECTION DEVICE, TOUCH DETECTION METHOD AND TOUCH SCREEN PANEL, USING DRIVING BACK PHENOMENON, AND DISPLAY DEVICE WITH BUILT-IN TOUCH SCREEN PANEL

CROSS REFERENCE TO RELATED APPLICATION

This application is a continuation of U.S. patent application Ser. No. 14/347,892 filed Mar. 27, 2014 (now pending), which is a national entry of International Application No. PCT/KR2012/007940, filed Sep. 28, 2012, which claims priority to Korea Patent Appl. No. 10-2011-0098749 filed on Sep. 29, 2011 in the Korean Intellectual Property Office, the entire contents of which are incorporated herein by reference.

TECHNICAL FIELD

The present invention relates to a device, method, and touch screen panel, for detecting a touch input of a bodily finger or a touch input instrument having conductive characteristics similar to the bodily finger, and a display device with a built-in touch screen panel, and more particularly, to a touch detection device, touch detection method, and touch screen panel, which acquires a touch signal by using a driving back phenomenon occurring in a touch detector when a driving voltage is applied to a driving capacitor connected to the touch detector, and a touch input occurs, and a display device with a built-in touch screen panel.

BACKGROUND ART

Usually, touch screen panels are input devices which are respectively attached onto display devices such as LCDs (Liquid Crystal Displays), PDPs (Plasma Display Panels), OLED (Organic Light Emitting Diode) displays, and AMO-LED (Active Matrix Organic Light Emitting Diode) displays, to thus generate an input signal corresponding to a position where an object such as a finger or a touch pen is touched on the touch screen panel. The touch screen panels are widely used in various fields of mobile devices such as small-sized portable mobile phones, industrial terminal devices, and DIDs (Digital Information Devices).

Various types of conventional touch screen panels are disclosed, but resistive type touch screen panels having simple manufacturing processes and inexpensive manufacturing costs have been used most widely. The resistive type touch screen panels, however, have a low transmittance and undergo a pressure to be applied, respectively, to thereby cause an inconvenient use. The resistive type touch screen panels also have difficulties in recognizing multiple touches and gestures, and cause detection errors.

In contrast, capacitive touch screen panels may have a high transmittance, recognize soft touches, and recognize multiple touches and gestures satisfactorily, to thus widen a market share gradually.

FIG. 1 shows an example of the structure of a conventional capacitive touch screen panel. Referring to FIG. 1, in the conventional capacitive touch screen panel, transparent conductive films are respectively formed on the top and bottom surfaces of a transparent substrate 2 made of plastic or glass. Metal electrodes 4 for applying a voltage are formed at each of four corners of the transparent substrate 2. The transparent conductive film is formed of transparent metal such as ITO (Indium Tin Oxide) or ATO (Antimony Tin Oxide). The metal electrodes 4 respectively formed at the four corners of the transparent conductive film are formed by printing low resistivity conductive metal such as silver (Ag). A resistor network is formed around the metal electrodes 4. The resistor network is formed in a linearization pattern in order to transmit a control signal equally on the entire surface of the transparent conductive film. A protective film is coated on top of the transparent conductive film including the metal electrodes 4.

In the case of the capacitive touch screen panel, when a high-frequency alternating-current (AC) voltage is applied to the metal electrodes 4, the high-frequency alternating-current (AC) voltage is spread to the whole surface of the transparent substrate 2. Here, if a finger 8 or a conductive touch input unit lightly touches the top surface of the transparent conductive film on the transparent substrate 2, a certain amount of electric current is absorbed into the human body and a change in the electric current is detected by a built-in electric current sensor of a controller 6, to thus calculate the amount of electric current at the four metal electrode 4, respectively, and to thereby recognize a touch point.

However, the capacitive touch screen panel shown in FIG. 1 detects the amount of micro-current, and requires an expensive detecting device, to thus raise the price of the capacitive touch screen panel, and make it difficult to recognize multiple touches.

In recent years, in order to overcome such problems, the capacitive touch screen panel shown in FIG. 2 has been chiefly used. The touch screen panel of FIG. 2 includes a transverse linear touch pad 5a, a longitudinal linear touch pad 5b, and a touch drive IC (Integrated Circuit) 7 for analyzing a touch signal. The touch screen panel detects a magnitude of a capacitance that is formed between the linear touch pad 5 and the finger 8. Here, the touch screen panel scans the transverse linear touch pad 5a and the longitudinal linear touch pad 5b to thus detect a touch signal and to thereby recognize a plurality of touch points.

However, when the touch screen panel is mounted on a display device such as a liquid crystal display (LCD) and is used, it may be difficult to detect a signal due to noise. For example, the liquid crystal display (LCD) uses a common electrode and an alternating-current (AC) common voltage (Vcom) is applied the common electrode in some cases. The common voltage Vcom of the common electrode acts as noise when detecting touch points.

FIG. 3 shows an example in which a conventional capacitive touch screen panel is installed on a liquid crystal display (LCD). A display device 200 such as the liquid crystal display (LCD) has a structure that liquid crystal is sealed and filled between a lower-side thin film transistor (TFT) substrate 205 and an upper-side color filter 215 to thereby form a liquid crystal layer 210. To seal the liquid crystal, the TFT substrate 205 and the color filter 215 are joined by sealants 230 at their outer portions. Although they are not shown, polarizing plates are attached on the top and bottom of the LCD panel, and besides back light units (BLUs) are provided.

As shown, a touch screen panel is provided on top of the display device 200. The touch screen panel has a structure that the linear touch pad 5 is put on the upper surface of the substrate 1. A protection panel 3 for protecting the linear touch pad 5 is attached on top of the substrate 1. The touch screen panel is bonded to the edge portion of the display device 200 through the medium of an adhesive member 9 such as a double adhesive tape (DAT), and an air gap 9a is formed between the display device 200 and the touch screen panel.

In this configuration, if a touch occurs as shown in FIG. 3, a capacitance Ct is formed between the finger 8 and the linear touch pad 5. Meanwhile, as shown, a capacitance Cvcom is formed between the linear touch pad 5 and a common electrode 220 formed on the lower surface of the color filter 215 of the display device 200, and an unknown parasitic capacitance Cp due to capacitive couplings between patterns or manufacturing process factors also functions at the linear touch pad 5. Thus, the same circuit as an equivalent circuit of FIG. 4 is configured.

Here, the conventional touch screen panel recognizes a touch by detecting an amount of change in the capacitance Ct, where the components such as the capacitances Cvcom and Cp act as noise at the time of detecting the capacitance Ct. For example, small- and medium-sized LCDs for mobile devices employ a line inversion method in which the common voltage Vcom of the common electrode 220 alternates by one or a plurality of gate lines as shown in FIG. 5, in order to reduce current consumption, and thus the alternating electric field acts as considerable noise at the time of detection of touches.

Typically, in order to remove the noise, the air gap 9a is placed between the touch screen panel and the display device 200 as shown in FIG. 3. In addition, although it is not shown, an ITO layer is coated on the lower surface of the substrate 1 of the touch screen panel, to thereby form a shield layer. In addition, the shield layer is grounded with the ground signal.

However, in the case of the conventional art, products become thick and the quality of the products deteriorates due to the air gap 9a. In addition, the conventional art requires a separate shield layer and a manufacturing process of configuring the shield layer, thereby causing a rise of a manufacturing cost. In particular, in the case of forming a built-in touch screen panel in a liquid crystal display (LCD), it is very difficult to form the air gap 9a or the shield layer, and thus it is also very difficult to form the built-in touch screen panel in a display device such as the liquid crystal display (LCD).

DISCLOSURE

Technical Problem

In order to solve the above-mentioned problems of a conventional touch screen panel, it is an object of the present invention to provide a touch detection device, touch detection method, and touch screen panel, which acquires a touch signal by using a driving back phenomenon that causes a difference between voltages in magnitude that are detected from a touch detector according to a magnitude of a touch capacitance, when a driving capacitor is connected to the touch detector, a driving voltage is applied through one end of the driving capacitor, and the touch capacitance is formed between a touch input instrument such as a finger and a touch pad, to thereby minimize an influence due to noise of a common electrode of a display device, and an influence due to a parasitic capacitance, to thereby stably acquire the touch signal, and to thereby simultaneously facilitate to incorporate a built-in touch screen panel in the display device such as a liquid crystal display (LCD).

Technical Solution

To attain the above object of the present invention, according to an aspect of the present invention, there is provided a touch detection device that is attached on top of a display device and detects occurrence of a touch capacitance (Ct) by an approach of a bodily finger or a touch input instrument such as a conductor similar to the bodily finger, the touch detection device comprising: a touch pad that forms the touch capacitance (Ct) between the touch input instrument and the touch pad; a driving capacitor (Cdrv) whose one side is connected to the touch pad and to the other side of which a driving voltage for detection of a touch input is applied; a common voltage detector that detects a common voltage generated from the display device; a driving voltage generator that generates the driving voltage in synchronization with the common voltage; and a touch detector that is connected to the touch pad, and that detects a touch signal by using a driving back phenomenon when the touch capacitance (Ct) is added to the driving capacitor (Cdrv) according to occurrence or non-occurrence of a touch in the touch input instrument.

According to an embodiment of the present invention, a common electrode capacitance (Cvcom) is formed between the touch pad and a common electrode of the display device.

According to another embodiment of the present invention, a driving capacitor (Cdrv) is not connected to the common voltage detector.

According to a further embodiment of the present invention, the touch pad is connected to the touch detector or the common voltage detector.

According to a further embodiment of the present invention, a charging unit for applying a pre-charging voltage is connected to the touch pad connected to the common voltage detector.

According to a further embodiment of the present invention, the charging unit is a switching device and an output portion of the switching device connected to the touch pad connected to the common voltage detector is in a high impedance state upon detection of the common voltage.

According to a further embodiment of the present invention, the input of the common voltage detector is in a high-impedance state.

According to a further embodiment of the present invention, the signal output from the common voltage detector is input to a comparator to detect whether the common voltage is high (Hi) or low (Low).

According to a further embodiment of the present invention, an upper reference voltage for detecting the high state of the common voltage and/or a lower reference voltage for detecting the low state of the common voltage is input to the comparator as a comparison voltage.

According to a further embodiment of the present invention, the charging unit of the common voltage detector is maintained in an off-state for a predetermined time and detects the common voltage in the off-state.

According to a further embodiment of the present invention, the charging unit (12) of the common voltage detector (15) carries out an ON/OFF operation in synchronization with the common voltage.

According to a further embodiment of the present invention, one or more touch pads (10) are successively used as the touch pad (10) connected to the common voltage detector (15).

According to a further embodiment of the present invention, when the touch pad connected to the common voltage detector is connected to the touch detector, another touch pad is connected to the common voltage detector to detect the common voltage.

According to a further embodiment of the present invention, the touch detection device further comprises an output unit for outputting the signal of the common voltage detector to the outside of a touch drive integrated circuit (TDI).

According to a further embodiment of the present invention, the touch detection device further comprises an output determination unit for determining whether or not the signal of the common voltage detector is output to the outside of a touch drive integrated circuit (TDI).

According to a further embodiment of the present invention, the driving voltage is applied to one side of the driving capacitor (Cdrv) in synchronization with the rising edge or the falling edge of the common voltage.

According to a further embodiment of the present invention, the charging unit of the touch detector is a switching device.

According to a further embodiment of the present invention, the charging unit of the touch detector carries out an ON/OFF operation in synchronization with the common voltage.

According to a further embodiment of the present invention, the touch detection device further comprises a setting unit for setting the charging time of the charging unit.

According to a further embodiment of the present invention, the driving voltage is applied to one side of the driving capacitor (Cdrv) in synchronization with the common voltage or the charging time.

According to a further embodiment of the present invention, the touch signal is detected after a predetermined time elapses since the application of the driving voltage.

According to a further embodiment of the present invention, the touch detection device further comprises a start point-in-time determination unit for determining a start point-in-time at which the touch signal is detected since the application of the driving voltage.

To attain the above object of the present invention, according to another aspect of the present invention, there is also provided a touch detection device that detects occurrence of a touch capacitance (Ct) by an approach of a bodily finger or a touch input instrument such as a conductor similar to the bodily finger, the touch detection device comprising: a touch pad that forms the touch capacitance (Ct) between the touch input instrument and the touch pad; a driving capacitor (Cdrv) whose one side is connected to the touch pad and to the other side of which a driving voltage for detection of a touch input is applied; a driving voltage generator that generates the driving voltage periodically according to a set value; and a touch detector that is connected to the touch pad, and that detects a touch signal by using a driving back phenomenon when the touch capacitance (Ct) is added to the driving capacitor (Cdrv) according to occurrence or non-occurrence of a touch in the touch input instrument.

According to another embodiment of the present invention, the charging unit of the touch detector is a switching device.

According to a further embodiment of the present invention, the charging unit of the touch detector carries out an ON/OFF operation in synchronization with a detection cycle.

According to a further embodiment of the present invention, the touch detection device further comprises a detection cycle determination unit for determining the detection cycle.

According to a further embodiment of the present invention, the touch detection device further comprises a setting unit for setting the charging time of the charging unit.

According to a further embodiment of the present invention, the driving voltage is applied to one side of the driving capacitor (Cdrv) in synchronization with the charging time.

According to a further embodiment of the present invention, the touch signal is detected after a predetermined time elapses since the application of the driving voltage.

According to a further embodiment of the present invention, the touch detection device further comprises a start point-in-time determination unit for determining a start point-in-time at which the touch signal is detected since the application of the driving voltage.

According to a further embodiment of the present invention, the driving voltage applied to the other side of the driving capacitor (Cdrv) is an alternating voltage alternating at a predetermined frequency.

According to a further embodiment of the present invention, the touch detection device further comprises a variation unit for varying a magnitude of the driving capacitor (Cdrv).

According to a further embodiment of the present invention, the driving capacitor (Cdrv) is not connected to the touch detector (14).

According to a further embodiment of the present invention, the touch detector (14) detects a driving back phenomenon in the touch pad (10) at the rising time and/or the falling time of the driving voltage applied to the driving capacitor (Cdrv).

According to a further embodiment of the present invention, the touch detector (14) detects a driving back phenomenon causing a difference in magnitude of the voltage detected by the touch detector when the touch capacitance (Ct) is added by occurrence of the touch input in comparison with a magnitude of the voltage detected in the touch detector at the non-occurrence of the touch input.

According to a further embodiment of the present invention, the voltage detected in the touch detector at the non-occurrence of the touch input is determined by Equation 1, the voltage detected by the touch detector when the touch capacitance (Ct) is added is determined by Equation 2, and the driving back phenomenon is caused by a difference between Equations 1 and 2, $$\Delta Vsensor = Vpre \pm (Vh - Vl)\frac{Cdrv}{Cdrv + Cvcom + Cp} \qquad \text{Equation 1}$$

$$\Delta Vsensor = Vpre \pm (Vh - Vl)\frac{Cdrv}{Cdrv + Cvcom + Cp + Ct} \qquad \text{Equation 2}$$

in which $\Delta Vsensor$ is the voltage detected by the touch detector, and Vh is a high level voltage applied to the driving capacitor, Vl is a low level voltage applied to the driving capacitor, Cdrv is the driving capacitance, Cvcom is the common electrode capacitance, Cp is the parasitic capacitance, and Ct is the touch capacitance.

According to a further embodiment of the present invention, the touch detector (14) detects a touch area of the touch input instrument with respect to the touch pad (10) corresponding to the driving back in magnitude.

According to a further embodiment of the present invention, the touch detector (14) comprises an amplifier (18) for amplifying the detected voltage.

According to a further embodiment of the present invention, sensor signal wires (22) connected to the touch pad (10) that detects occurrence of the touch input are present in the left and right sides of the touch pad (10), in which the sensor signal wires (22) connected to the touch pad (10) that does not detect any touch input are in a floating state.

According to a further embodiment of the present invention, the sensor signal wires (22) connected to the touch pad (10) excluding the sensor signal wires (22) connected to the touch pad (10) that detects occurrence of the touch input are in a floating state.

According to a further embodiment of the present invention, sensor signal wires (22) connected to the touch pad (10) that detects occurrence of the touch input are present in the left and right sides of the touch pad (10), in which the sensor signal wires (22) connected to the touch pad (10) that does not detect any touch input are in a floating state before the charging unit (12) of the touch detector is turned on.

According to a further embodiment of the present invention, the sensor signal wires (22) connected to the touch pad (10) excluding the sensor signal wires (22) connected to the touch pad (10) that detects occurrence of the touch input are in a floating state before the charging unit (12) of the touch detector is turned on.

According to a further embodiment of the present invention, the touch pad (10) connected to the touch detector (14) is separated from the touch detector (14) after the driving voltage is applied to the driving capacitor connected to the touch detector (14).

According to a further embodiment of the present invention, the touch pad (10) connected to the touch detector (14) is separated from the touch detector (14) within 1ns to 100 μs after the driving voltage is applied to the driving capacitor connected to the touch detector (14).

According to a further embodiment of the present invention, the touch pad separated from the touch detector is re-connected to the touch detector after sensing of the touch input is completed, or a predetermined voltage is applied to the touch pad.

According to a further embodiment of the present invention, the predetermined voltage is a ground (GND) or a DC voltage of a predetermined size.

According to a further embodiment of the present invention, a predetermined voltage is applied to the touch pad (10) that does not detect any touch input in a floating state after the touch detector has completed a touch sensing operation.

According to a further embodiment of the present invention, the predetermined voltage is a ground (GND) or a DC voltage of a predetermined size.

According to a further embodiment of the present invention, a plurality of touch pads are present in which resistance of a section that is connected to a connection portion where touch signal wires connected to the touch pad (10) are connected with a touch drive integrated circuit (TDI) is included in a range from −100% to +100%.

According to a further embodiment of the present invention, separation time of the touch pads connected to the touch detector is equally applicable to the plurality of touch pads.

Advantageous Effects

In a touch detection device, touch detection method, and touch screen panel, using a driving back phenomenon, and a display device with a built-in touch screen panel, according to the present invention, changes in the state of a common voltage are detected, a driving voltage is applied through a driving capacitor connected to a touch detector while avoiding a point in time of the changes of the state of the common voltage, occurrence of a driving back phenomenon is detected in the touch detector by a touch capacitance added by a touch input, to thereby acquire a touch signal, in the case that a common electrode of the display device has a common voltage level alternating at a predetermined frequency, the common electrode of the display device has a direct-current (DC) level, or the common electrode of the display device alternates at an unqualified unspecified frequency.

As a result, influences due to a parasitic capacitance generated by noise, a coupling phenomenon, or other factors are minimized, and erroneous recognition of signals does not occur. In addition, the present invention detects a touch input at a relatively high voltage level, to thus easily capture a signal even with a small cross-sectional area of a touch input instrument, and to thereby make it possible to perform a stylus pen input. In addition, the present invention obtains a touch share ratio of a touch input instrument depending on the magnitude of a driving back, to thus increase touch resolution and enable fine handwriting and drawing. In addition, the present invention may configure an active region of a touch screen panel into a single-layer, to thus simplify a manufacturing process and provide an effect of obtaining an excellent yield.

DESCRIPTION OF DRAWINGS

The above and other objects and advantages of the invention will become more apparent by describing the preferred embodiments with reference to the accompanying drawings in which:

FIG. 1 is a perspective view showing an example of a conventional touch screen panel;

FIG. 2 is a plan view showing another example of a conventional touch screen panel:

FIG. 3 is a cross-sectional view showing an example in which the touch screen panel of FIG. 2 is mounted on top of a display device;

FIG. 4 is an equivalent circuit diagram showing that a touch capacitance is detected in FIG. 3;

FIG. 5 is a waveform diagram illustrating a common voltage waveform of a liquid crystal display device;

FIG. 6 is a diagram conceptually showing a typical three-terminal type switching device;

FIG. 7 is a conceptual view depicting a principle of detecting a touch input:

FIG. 8 is a circuit diagram illustrating a basic structure of a touch detection device according to an embodiment of the present invention;

FIGS. 9A and 9B are graphs showing a correlation between a breakdown voltage of a touch drive integrated circuit (TDI) and a pre-charging voltage thereof:

FIG. 10 is a circuit diagram illustrating a touch detection device according to another embodiment of the present invention;

FIG. 11 is a circuit diagram illustrating a touch detection device according to still another embodiment of the present invention:

FIG. 12 is a cross-sectional view showing a configuration of touch pads according to an embodiment of the present invention;

FIG. 13 is a cross-sectional view showing a configuration of touch pads according to another embodiment of the present invention;

FIGS. 14A and 14B are views showing an example of a configuration of gesture using an area;

FIGS. 15A to 15C are views showing another example of a configuration of gesture using an area;

FIG. 16 is a waveform diagram illustrating a process of detecting a touch signal in the present invention:

FIG. 17 is a circuit diagram illustrating a configuration of a common voltage detector according to an embodiment of the present invention;

FIG. 18 is a waveform diagram of a common voltage detected by a common voltage detection circuit.

FIG. 19 is a detailed circuit diagram illustrating a common voltage detection circuit according to an embodiment of the present invention;

FIG. 20 is a waveform diagram illustrating a method of recovering a common voltage detection error when the common voltage detection error occurs according to an embodiment of the present invention;

FIG. 21 is a flow chart view illustrating factory calibration for extracting a common voltage component;

FIG. 22 is a waveform diagram illustrating a method of detecting a touch signal in synchronization with a common voltage according to an embodiment of the present invention;

FIG. 23 is a waveform diagram illustrating an example of an actually detected common voltage;

FIG. 24 is a table diagram illustrating a configuration that size of a driving voltage (Vdrv) is changed in accordance with a register set;

FIG. 25 is a circuit diagram illustrating a touch screen panel according to an embodiment of the present invention;

FIGS. 26A to 26C are schematic views illustrating a variety of configurations of a touch pad according to an embodiment of the present invention;

FIG. 27 is a view illustrating a touch screen panel shown in FIG. 5 in the laid-open patent publication;

FIG. 28 is a schematic view showing a conventional wiring diagram of sensor signal wires that are arranged on top and bottom of touch pads;

FIG. 29 is a diagram illustrating a configuration of a differential amplifier used in the present invention;

FIG. 30 is a diagram illustrating a configuration that an analog-to-digital-converter (ADC) conversion unit is connected to an output of an amplifier;

FIG. 31 is a flow chart view illustrating a factory calibration method;

FIG. 32 is a diagram illustrating an example of setting regions for real time calibration (RTC) according to an exemplary embodiment of the present invention;

FIG. 33 is a circuit diagram illustrating a conventional capacitive touch signal detection device;

FIG. 34 is a diagram illustrating a configuration of a thin film transistor (TFT) on a transverse electric field mode liquid crystal display (LCD) substrate;

FIG. 35 is a cross-sectional view illustrating a conventional background configuration on a transverse electric field mode liquid crystal display (LCD) substrate;

FIG. 36 is a cross-sectional view illustrating a background configuration on a transverse electric field mode liquid crystal display (LCD) substrate according to an exemplary embodiment of the present invention;

FIG. 37 is a front view of a configuration in which a touch detection device is applied to a transverse electric field mode LCD substrate according to an exemplary embodiment of the present invention;

FIG. 38 is a circuit diagram illustrating a configuration in which touch pads are used as a background according to an exemplary embodiment of the present invention;

FIG. 39 is a diagram illustrating a layout of sensor signal wires (22) according to an exemplary embodiment of the present invention;

FIGS. 40A to 40C are diagrams respectively illustrating a space filler between the touch detector and the sensor signal wires according to an exemplary embodiment of the present invention;

FIG. 41 is a circuit diagram illustrating a configuration of a touch detection error by a conductor according to an exemplary embodiment of the present invention;

FIG. 42 is a waveform diagram illustrating a configuration of opening non sensing pads according to an exemplary embodiment of the present invention;

FIG. 43 is a waveform diagram illustrating a configuration of opening sensing pads according to an exemplary embodiment of the present invention;

FIGS. 44A and 44B are schematic diagrams illustrating a configuration of extracting touch coordinates from data detected or calculated by a touch sensor, according to an exemplary embodiment of the present invention;

FIG. 45 is a diagram illustrating a configuration of detecting a touch signal and the common voltage by touch pads, according to an exemplary embodiment of the present invention;

FIG. 46 is a diagram illustrating the use of function keypads according to an exemplary embodiment of the present invention;

FIG. 47 is a configurational diagram illustrating the implementation of function keypads according to an exemplary embodiment of the present invention;

FIG. 48 is a table diagram illustrating a configuration of setting registers applied to the function keypads according to an exemplary embodiment of the present invention;

FIG. 49 is a diagram illustrating the structure of function key pads according to an exemplary embodiment of the present invention;

FIG. 50 is a diagram illustrating a conventional configuration of an edge portion of a touch screen panel;

FIG. 51 is a diagram illustrating a configuration of an edge portion of a touch screen panel according to an exemplary embodiment of the present invention;

FIG. 52 is a diagram illustrating a configuration of a plurality of touch drive integrated circuits (TDIs) used in the present invention, according to an exemplary embodiment of the present invention;

FIG. 53 is a diagram illustrating a configuration for discharging the static electricity according to an exemplary embodiment of the present invention;

FIG. 54 is a cross-sectional view showing a configuration of a display device with a built-in touch screen panel according to an embodiment of the present invention;

FIG. 55 is an exploded perspective view a display device with a built-in touch screen panel according to an embodiment of the present invention; and FIG. 56 is a diagram illustrating a configuration of determining a touch group according to an embodiment of the present invention.

BEST MODE

Hereinbelow, preferred embodiments of the present invention will be described in detail with reference to the accompanying drawings.

First, the present invention relates to a touch detection device, touch detection method, and touch screen panel, using a driving back phenomenon, and a display device with a built-in touch screen panel. A conventional touch detection device detects a magnitude of capacitance due to contact of a finger and the like, but the touch detection device according to the present invention detects a driving back phenomenon caused by a change in magnitude of a touch capacitance, when an alternating driving voltage is applied to an added driving capacitor. A touch detecting system according to the present invention compares a voltage that is generated due to a driving capacitor, a common electrode capacitance, and a parasitic capacitance at the time of non-occurrence of a touch input, with a voltage that is generated by a driving back phenomenon when a touch capacitance is added to the common electrode capacitance at the time of occurrence of a touch input, and thus detects a difference in magnitudes between the two voltages, to thus minimize influences caused by external noise or a parasitic capacitance, and to thereby acquire a touch signal more reliably.

The display devices referred to in the present invention, may be LCDs (Liquid Crystal Displays), PDPs (Plasma Display Panels), OLED (Organic Light Emitting Diode) displays, and AMOLED (Active Matrix Organic Light Emitting Diode) displays or any other means of displaying images thereon.

LCDs (Liquid Crystal Displays) of the above-listed display devices need a common voltage (Vcom) for operation of liquid crystals. As an example, small and medium-sized LCDs for mobile devices employ line inversion driving methods in which a common voltage of a common electrode alternates for one or a plurality of gate lines, to reduce the current consumption. As another example, large-sized LCDs are configured to employ dot inversion driving methods in which a common voltage of a common electrode has a constant DC level. As still another example, transverse electric field mode LCDs display images by line or dot inversion driving methods in which a common electrode is formed in a part of an area on a TFT substrate of each LCD. In the case of transverse electric field mode LCDs, a back ground is commonly formed in the entire color filter exposed to the outside through a rear surface ITO (indium tin oxide) film, and grounded into the ground signal to shut off the external electrostatic discharge (ESD).

In the present invention, in addition to the electrodes to which the above common voltage (Vcom) is applied, all the electrodes playing a common role in a display device are referred to as "common electrodes" and an alternating voltage or a DC voltage or a voltage alternating at an unspecified frequency is referred to as a "common voltage."

The present invention detects a non-contact touch input of a finger or a touch input instrument having electrical characteristics similar to the finger. Here, the term "non-contact touch input" means that a touch input instrument of a finger and the like performs a touch input at a state spaced by a predetermined distance apart from a touch pad by a substrate. The touch input instrument may contact an outer surface of the substrate. However, even in this case, the touch input instrument and the touch pad remain in a non-contact state. Therefore, a touch action of a finger on a touch pad may be expressed in the term "approach." Meanwhile, since a finger remains in a contact state for an outer surface of the substrate, a touch action of a finger on the substrate may be expressed in the term "contact." In this specification and claims, the terms "approach" and "contact" are commonly used as the same meanings as above.

The components such as "~portion" are an aggregate of unit function elements that perform certain functions. For example, an amplifier for amplifying a certain signal is a unit function element, and an aggregate of amplifiers or signal converters may be named as a signal conversion portion. In addition, the components such as "~portion" can be included in larger components or can include smaller components. In addition, the components such as "~portion" may contain their own central processing units (CPUs) therein.

In the following drawings, thickness or areas have been enlarged to definitely show several layers and areas. Through the whole detailed description of the specification, like reference numerals are used for like elements. When it is mentioned that a portion such as a layer, a film, an area and a substrate is placed "on" or "on the upper surface" of another portion, this means that the portion is not only placed "justly on" the other portion but also the former is placed on a third portion between the former and the latter. In contrary, when it is mentioned that a certain portion is placed "justly on" another portion, this means that there are no other portions between them.

In addition, the signal described herein, collectively refer to, unless otherwise stated, voltage or current.

In addition, in the present specification, the term "capacitance" is the physical capacity, and is used as the same meaning as the term "electrostatic capacity." On the other hand, the term "capacitor" refers to an element having a capacitance representing the physical capacity. The capacitance may be made by a designed value and process, or indirectly made as being naturally produced between two signal wires parallel at a distance from each other. In the present specification, both directly and indirectly created capacitors shall be named "capacitor" without any discrimination.

In addition, in the present specification, the term "forcing a signal" means that a level of a signal which has already maintains any condition is changed, or gains access to a certain signal in a floating state. For example, a meaning of forcing a signal to an ON/OFF control terminal of a switching device may be used as a meaning of changing an existing low level voltage into a high level voltage, or used as a meaning of applying a certain voltage to an ON/OFF control terminal of a switching device that is in a floating state without having any signal, in order to turn on/turn off the switching device.

In addition, in the present invention, the term "driving back phenomenon" or "driving back" is synonymous with each other, and used as "D/B" in abbreviation.

In addition, in the present invention, the touch drive integrated circuit (IC) is abbreviated as TDI.

In addition, in the present invention, a voltage caused due to D/B when a touch does not occur, or a voltage caused due to D/B when a touch occurs, and thus it is determined whether or not a touch occurs and how may contact area of a touch device is, using correlation or relationship between the two voltages. Accordingly, a meaning of detecting a voltage caused due to D/B is used in the same meaning as that of detecting a touch signal.

FIG. 6 is a conceptual diagram showing a three-terminal type switching device from among switching devices that are used as examples of a charging unit in the present invention. Referring to FIG. 6, the three-terminal type switching device includes three terminals having an ON/OFF control terminal (indicated as "Cont" in FIG. 6), an input terminal (indicated as "In" in FIG. 6), and an output terminal (indicated as "Out" in FIG. 6). The ON/OFF control terminal is a control terminal for controlling the ON/OFF operations of the switching device. If a predetermined magnitude of voltage or current is applied to the ON/OFF control terminal, voltage or current that is applied to the input terminal is output in the form of voltage or current via the output terminal.

The three-terminal type switching device referred to as the charging unit in the present invention may be for example, a relay, a MOS (Metal Oxide Semiconductor) switch, a BJT (Bipolar Junction Transistor) switch, a FET (Field Effect Transistor) switch, a MOSFET (Metal Oxide Semiconductor Field Effect Transistor) switch, an IGBT (Insulated Gate Bipolar Transistor) switch, a TFT (Thin Film Transistor) switch, or an OPAMP (OPerational AMPlifier) switch, and may be formed by a homogeneous or heterogeneous combination among these.

The relay may be used as a four-terminal type switching device, in addition to the three-terminal type switching device. All devices having an ON/OFF control terminal that turns on/off an input and output regardless of the number of input and output terminals and whose input and output are turned on/off by the ON/OFF control terminal, may be used as the charging unit.

Meanwhile, a CMOS (Complementary Metal Oxide Semiconductor) switch is formed by a mutual combination of PMOS (P-channel MOS) and NMOS (N-channel MOS) switches as an example of the three-terminal type switching device, in which input and output terminals are connected to each other, but the ON/OFF control terminal exists separately and is connected to an identical control signal, or is connected separately to individual control signals, to thus determine an ON/OFF state of the switch. The relay is a device that when a current is applied to a control terminal, a voltage or current applied to the input terminal is output without loss. The BJT switch is a device in which a certain amount of amplified current flows from a collector terminal thereof to an emitter terminal thereof when a current is applied to a base terminal thereof at a state where a current higher than a threshold voltage of the base terminal has been applied to the base terminal. In addition, the TFT switch is a switching device that is used in a pixel unit for display device such as a LCD or AMOLED, and includes a gate terminal that is a control terminal, a source terminal that is an input terminal, and a drain terminal that is an output terminal, in which the TFT switch is energized when a voltage higher than a threshold voltage higher than a voltage applied to the drain terminal is applied to the gate terminal, and thus a current depending on the magnitude of a voltage applied to the gate terminal flows from the input terminal to the output terminal.

Prior to describing embodiments of the present invention, a principle that detects a touch input in the present invention will be described briefly with reference to FIG. 7. As shown in FIG. 7, it is assumed that when a finger 25 or a conductive touch unit similar to the finger approaches to a touch pad 10, a distance between the finger 25 and the touch pad 10 is an interval "d" and an opposite area is "A." An electrostatic capacitance "C" is formed between the finger 25 and the touch pad 10 as shown in a right-side equivalent circuit of FIG. 7 and a numerical Equation. If a voltage or current signal is applied to a signal input line of the touch pad 10 having the electrostatic capacitance "C," charges of a magnitude "Q" are accumulated in a capacitor having the magnitude of the electrostatic capacitance "C" and thus the capacitor can accumulate charges by a voltage relationship Equation formed as $V=Q/C$. As a result, the electrostatic capacitance "C" accumulates the charges "Q." In the present invention, when a driving back having a correlation with respect to the magnitude of the electrostatic capacitance "C" occurs in the touch pad 10 connected with the touch detector, a touch input is detected by using the detected driving back.

FIG. 8 is a circuit diagram illustrating a basic structure of a touch detection device according to the present invention. Referring to FIG. 8, the touch detection device according to the present invention has a basic structure including a charging unit 12, a touch pad 10, a sensor signal wire 22, a driving capacitor Cdrv, a common electrode capacitor Cvcom, and a touch detector 14.

The charging unit 12 supplies a pre-charge signal to the touch pad and is turned off by a turn-off signal supplied to the ON/OFF control terminal indicated as "Cont" in FIG. 6, to thus make an output terminal 12-1 become in a high impedance state.

The pre-charge signal is a voltage that is applied to all capacitors connected to the touch detector 14 as a constant DC voltage to charge the capacitors, prior to detecting touch inputs. Thus, the charging unit 12 is a switching device that performs a switching operation according to a control signal supplied to the ON/OFF control terminal, or a linear device such as an OPAMP that supplies a signal based on a control signal.

As shown in FIG. 8, when a three-terminal type switching device is applied as the charging unit 12, a proper charging voltage may be supplied to all capacitors connected to the output terminal 12-1 of the charging unit 12, for example, the touch pad 10, the driving capacitor Cdrv, and the common electrode capacitor Cvcom, at a required point in time by using a control signal supplied to the ON/OFF control terminal and a signal fed to the input terminal. A DC voltage including zero V, or an alternating AC voltage such as square, triangular or sinusoidal waves, may be used as the charging voltage.

This charging voltage has a relationship with a voltage that is used in a touch drive integrated circuit (IC) (hereinafter abbreviated as TDI) in which a touch detection system has been integrated. Such a relationship will be described below with reference to FIGS. 9A and 9B as an example.

A breakdown voltage of a TDI is 5V. Assuming TDI is broken when a voltage of 5V or more is supplied to the TDI, an operation voltage of an internal circuit in the TDI should not exceed 5 V. As in the embodiments of FIGS. 9A and 9B, it is assumed that a potential difference caused due to D/B which will be described later is 3 V. Here, as shown in FIG. 9A, when a voltage of the output terminal 12-1 in the charging unit 12 is 3 V before the D/B occurs as shown in FIG. 9A, the voltage of the output terminal 12-1 in the charging unit 12 becomes 6 V. As a result, 6 V that is the voltage of the output terminal 12-1 exceeds 5 V that is the breakdown voltage of the TDI, the TDI is placed in a damaged area.

In order to solve this problem, as shown in FIG. 9B, if a voltage of 1 V is applied to an input terminal of the charging unit at the charging unit has been turned on and thus all the capacitors connected to an output terminal of the charging unit are charged into 1 V, the potential of the output terminal 12-1 becomes 4 V even if a potential difference of 3 V occurs due to the aforementioned driving back, and thus the TDI operates in a safety area.

Thus, according to one embodiment of the present invention, a function of controlling the charging voltage to control the maximum voltage in the event of occurrence of the driving back based on the breakdown voltage of the TDI may be provided.

FIG. 10 is a circuit diagram illustrating a touch detection device according to another embodiment of the present invention, in which a touch detector 14 is shown in detail. Referring to FIG. 10, the output terminal 12-1 of the charging unit 12 and all the capacitors connected with the output terminal 12-1 are connected to the touch pad 10. Since the D/B phenomenon which will be described later occurs a capacitor connected to the output terminal 12-1 of the charging unit 12, the voltage caused due to the D/B is transferred to a buffer 14-1 in the touch detector 14. Since the input terminal of the buffer 14-1 is in the state of high impedance (hereinafter referred to as Hi-z), the output terminal 12-1 of the charging unit 12 becomes in the Hi-z state, and thus all capacitors connected between the output terminal 12-1 of the charging unit 12 and the buffer 14-1 become in the Hi-z state. In this embodiment, the case that the output terminal 12-1 of the charging unit 12 is directly connected to the buffer 14-1 has been exemplified as an example, but the output terminal 12-1 of the charging unit 12 may be connected to the terminals of all elements whose input terminals are in the Hi-z state, for example, such as the gate of a MOS or the gate of a TFT, instead of the buffer 14-1. The reason of making the output terminal 12-1 of the charging unit 12 and the touch detector 14 be in the Hi-z state is that the D/B phenomenon which will be described later should be performed in the Hi-z state to thereby lengthen a detection time to have a longer time. That is, since there is no discharge path of an isolated charge in the Hi-z state, the level of the voltage that is formed due to the D/B is maintained for a long time with variation at minimum.

The signal output from the buffer 14-1 is input to the amplifier 14-2. If an input terminal of the amplifier 4-2 is in the Hi-z state, a point P in FIG. 10 may be directly connected to the input end of the amplifier 14-2.

In the case that the level of the signal at the point P is lowered and thus should be amplified, the signal can be amplified by using a variety of amplifiers, however, a differential amplifier may be preferably used. The reason is that a pre-charging voltage or a charging voltage which will be described later is charged at the point P, and thus it is possible to remove the charging voltage through the differential amplifier and amplify only a voltage generated due to the D/B phenomenon at the point P, in the amplification process.

In order to eliminate DC offset such as the charging voltage when the differential amplifier is used, the DC voltage should be applied to the negative terminal of the differential amplifier. A digital-to-analog converter (DAC) 14-4 should be used or a reference voltage supply "Ref voltage" 14-5 should be used, in order to apply the DC voltage. The "Ref voltage" 14-5 is the reference voltage which is a DC voltage with a constant potential, and is generated by a power supply unit 47 of FIG. 25 which will be described later.

FIG. 10 shows the use of only one ADC corresponding to a touch pad 10, but in the case that a plurality of touch detection circuits are used as shown in FIG. 10, a plurality of ADCs may be used. As more ADCs may be used, it is advantageous that an operation time consumed for calculating signals can be reduced.

Although not shown in FIG. 10, filters may be used between various functional portions shown in the touch detector 14. For instance, a filter may be used in the previous stage of the buffer 14-1, and a filter may be used in the front end or rear end of the amplifier 14-2. These filters include various filters such as bandwidth low-pass filters, bandwidth high pass filters, or grass cut filters (GCFs), ranking filters, and average filters by chopping.

The touch pad 10 is formed of a transparent conductor or metal. In the case that the touch pad 10 is mounted on a display device and is formed as a transparent conductor, the transparent conductor is formed of a transparent conductive material, such as ITO (Indium Tin Oxide), ATO (Antimony Tin Oxide), CNT (Carbon Nano Tube), or IZO (Indium Zinc Oxide) or a transparent material with conductive characteristics similar to the ITO, ATO, CNT, or IZO. In the case that the touch pad 10 is not mounted on the display device, but is applied as a touch keyboard or a touch key pad that is used for a refrigerator or monitor, the touch pad 10 may be formed of a non-transmissive material such as metal.

The touch pad 10 may be patterned in various forms. For example, the touch pad 10 may be arranged in a dot-matrix form in which isolated islands are arranged in a matrix form in an active region of a touch screen panel 50 of FIG. 12, or the touch pad 10 may be arranged so that linear patterns are arranged lengthwise and crosswise on the touch screen panel 50. A form of the touch pad 10 will be described in an embodiment to be described later.

The sensor signal wire 22 is a signal wire through which a polarity of a capacitor formed when a finger 25 or a touch unit (for example, such as a touch pen) having a conductive characteristic similar to that of the finger 25 approaches the touch pad 10 is connected to the touch detector 14. Like the touch pad 10, the sensor signal wire 22 may be formed of the same conductive transparent material as that of the touch pad 10. However, in some cases, the sensor signal wire 22 may be formed of a non-transmissive material such as metal. The specific embodiments of the sensor signal wire 22 will be described later.

The driving capacitor (Cdrv) is an element to which a driving voltage is applied for detection of a touch input in the present invention, in which one end of the driving capacitor (Cdrv) is connected to the touch detector 14, and to the other end of which a driving voltage is applied, to thereby generate a D/B phenomenon due to the driving voltage. Here, the reference characters "Cdrv" is a symbol that represents both the name and magnitude of a capacitor. For example, the symbol "Cdrv" means a capacitor named Cdrv and simultaneously means a capacitance having Cdrv in magnitude. Other capacitor symbols such as Ct, Cvcom and Cp to be described later represents both the names and magnitudes of the capacitors.

As illustrated in FIG. 8, the output terminal 12-1 of the charging unit 12 is connected to the touch detector 14. In addition, one end of the driving capacitor (Cdrv) is connected to the output terminal 12-1 of the charging unit 12, and a detection signal is applied to the other end of the driving capacitor (Cdrv). The detection signal is a voltage alternating at a plurality of respectively different potentials, and is a periodic or non-periodic waveform such as a square, sinusoidal, or triangular wave. A D/B voltage that is proportional to the size of the alternating driving voltage is derived and detected from the touch detector 14 or the touch pad 10. Accordingly, since the detected D/B voltage is detected at a crossing point of the touch detector 14, the touch pad 10, and the output terminal 12-1 of the charging unit 12, a meaning of detecting the D/B signal from the touch pad 10, the touch detector 14, or the output terminal 12-1 of the charging unit 12 means that the D/B signal is detected at the same position as the crossing point of the touch pad 10, the touch detector 14, and the output terminal 12-1 of the charging unit 12 throughout this specification.

A common electrode capacitor (Cvcom) of FIG. 8 has a capacitance that is formed when the touch pad 10 faces the common electrode of the display device, in which the one side of the common electrode capacitor (Cvcom) is connected to the touch detector 14 and the common voltage is applied to the other side of the common electrode capacitor (Cvcom). In this case, the common voltage may be directly connected to and applied to the common electrode capacitor (Cvcom), but the common voltage is usually electromagnetically induced through the medium such as glass or air and applied to the common electrode capacitor (Cvcom).

For example, in FIG. 12, the touch pad 10 forms a touch capacitance (Ct) together with the touch unit such as a finger 25, and also forms the common electrode capacitance (Cvcom) while interposing a color filter 215 therebetween.

FIG. 11 illustrates a touch detection device according to an embodiment of the present invention, in which MOS (Metal Oxide Semiconductor), TFT (Thin Film Transistor), or FET (Field Effect Transistor) is used as a switching device. In FIG. 11, an analog to digital converter is used in the touch detector 14. The ADC performs a function of converting the detected analog signals to digital signals, and in this embodiment, the ADC performs a function of converting the detected touch signal into the digital signal and transferring the conversion result to a signal processor 35 or a CPU 40 of FIG. 25.

As shown in FIG. 11, if a bodily finger 25 approaches the touch pad 10 within a certain distance from the touch pad 10, a touch capacitance "Ct" is formed between the finger 25 and the touch pad 10. Ct is a value that is set by the relational Equation of FIG. 7, and may be freely formed by adjusting an interval between a touch unit such as a bodily finger 25 and the touch pad 10, and an opposite area of the touch pad 10. For example, if the touch pad 10 is selected as a large area, the touch capacitance "Ct" is also designed to have a large value based on the relationship Equation of FIG. 7. In contrast, if the touch pad 10 is selected as a small area, the touch capacitance "Ct" is also formed to have a small value. As an embodiment, the touch capacitance "Ct" may be formed to have a value of tens of fF (femto F) to tens of uF (micro F).

The symbol "Cp" of FIG. 11 is a parasitic capacitor. The "Cp" is the sum of values of capacitors other than capacitors formed by the relational Equation as "Ct," or fabricated as "Cdrv" and may be modeled as a capacitor whose one end is connected to the touch detector 14 and the other end of which is connected to any ground. Thus, a plurality of differently grounded parasitic capacitors (Cp) can be formed, but only one ground is assumed in the present specification, and only one parasitic capacitor connected to the only one ground has been shown. The parasitic capacitor (Cp) may be implemented into one of a variety of parasitic capacitors such as a parasitic capacitor that occurs between the sensor signal wire 22 and the display device, a parasitic capacitor that occurs between the sensor signal wires 22 when a plurality of the touch pads 10 are provided in a dot matrix form as shown in FIG. 25, and thus the sensor signal wires 22 connected to the touch pads 10 are wired in parallel to each other, a parasitic capacitor that occurs in a connection portion when a TDI is connected to the touch pad 10, or a parasitic capacitor that occurs due to interference of a circuit portion connected to the sensor signal wire in the TDI with peripheral circuits. According to Equations 1 and 2 to be described later, these parasitic capacitors play a role of lowering the D/B signal after being inserted to the denominators of Equations 1 and 2. Thus, it is advantageous to detect touch inputs with no parasitic capacitors included as many as possible.

Referring back to FIG. 11, a pre-charging voltage (Vpre) is applied to the input terminal of the charging unit 12, and the pre-charging voltage (Vpre) is output through the output terminal 12-1 when the switching device is turned on by a control voltage (Vg) which is applied to an ON/OFF control terminal (cont). Thus, all capacitors connected to the output terminal 12-1 of the charging unit 12 are charged as the pre-charging voltage (Vpre).

According to an embodiment, assuming that the switching device is turned on when Vpre is 3 V and Vg varies from 0 V (Zero Volt) to 10 V, the potential of the touch detector 14 to which the driving capacitor (Cdrv), the touch capacitance (Ct), and the parasitic capacitor (Cp) are connected is 3 V after the turn-on of the switching device. After being charged at a point P, the control voltage (Vg) of the switching device is fallen from 10 V to 0 V to thus turn off the switching device, and the point "P" of the touch detector is in a high-impedance state, to thus isolate electric charges at the point "P" and then an alternating driving voltage is applied to the driving capacitor (Cdrv). In this case, the magnitude of the voltage detected at the point "P" is proportional to that of the driving voltage the driving back phenomenon occurs depending on the magnitude of the capacitors connected to the point "P." At this point, assuming Cdrv, Cp, and Cvcom are fixed values, and the magnitude of the driving voltage applied to the driving capacitor (Cdrv) is constant, the magnitude of the voltage detected by driving back phenomenon at the point "P" depends on the touch capacitance (Ct). Thus, since the voltage detected in the touch detector 14 varies depending on the magnitude of the touch capacitance (Ct), it is possible to detect the presence of the touch input and to compute the opposite area (or touch area) between the touch pad 10 and the touch input instrument such as the finger 25, by detecting difference between the driving voltages due to driving back phenomenon, and to also find out a touch point.

FIG. 12 is a cross-sectional view showing a configuration of touch pads according to an embodiment of the present invention, and FIG. 13 is a cross-sectional view showing a configuration of touch pads according to another embodiment of the present invention. FIG. 12 illustrates that the touch pads 10 are mounted on a substrate that is formed separately from the display device, and FIG. 13 illustrates that the touch pads 10 are embedded in the display device. Referring to FIGS. 12 and 13, the formation of the common electrode capacitor (Cvcom) will be described as follows.

As shown in FIG. 12, the display device 200 has the common electrode 220. An AMOLED or PDP display device does not have a common electrode that functions to display the quality of image, but since the common electrode capacitor (Cvcom) of FIG. 11 is formed between a variety of potentials formed on the TFT substrate of the AMOLED or the driving substrate of the PDP and the touch pads 10 facing the variety of potentials, a virtual electric potential that can be formed of the variety of potentials formed on the TFT substrate of the AMOLED or the driving substrate of the PDP is also named a common electrode.

The display device 200 may be a display device formed in various forms as described above. The common electrode 220 may be an electrode of a common voltage (Vcom) in a liquid crystal display (LCD), or may be one of other types of electrodes. Among a variety of display devices, the LCD has been illustrated in the embodiment of FIG. 12.

In the display device 200 shown in FIG. 12, liquid crystal is sealed and filled between a lower-side thin film transistor (TFT) substrate 205 and an upper-side color filter 215, to thus have a structure of forming a liquid crystal layer 210. To seal the liquid crystal, the TFT substrate 205 and the color filter 215 are joined by sealants 230 at their outer portions. Although they are not shown, polarizing plates are attached on the top and bottom of the LCD panel, and besides optical sheets such as a back light unit (BLU) and a brightness enhancement film (BEF) are provided.

As shown, a touch screen panel 50 is provided on top of the display device 200. As shown in FIG. 12, the touch screen panel 50 is attached to the upper portion of the display device 200 at the outer portion thereof, through the medium of an adhesive member 57 such as a double adhesive tape (DAT), and an air gap 58 is formed or a contact member 58 is filled between the touch screen panel 50 and the display device 200. The contact member 58 is made of a material such as a permeable silicone or OCA (Optically Clear Adhesive) or adhesive resin that is used to attach the touch screen panel 50 and the display device 200.

A common voltage level for displaying images is applied to the common electrode 220 of the display device 200, in which the common voltage is a DC voltage or a voltage whose amplitude alternates at a predetermined frequency. For example, a line-inversion type small-sized LCD has an alternating common voltage of the common electrode 220 as shown in FIG. 5, and the other dot-inversion type LCDs that are used for a notebook computer, monitor, or TV have a common voltage direct-current (DC) level of a constant magnitude voltage.

As shown, the common electrode capacitor (Cvcom) is formed the touch pad 10 and the common electrode 220 of the display device 200. If a certain pre-charge signal is applied to the touch pad 10, the common electrode capacitor (Cvcom) is charged with the pre-charging voltage grounded by the common voltage. For example, if the common voltage is 5 V, and the pre-charging voltage is 3 V at the time of the pre-charging, the common electrode capacitor (Cvcom) is charged with the pre-charging voltage of 3 V grounded by the common voltage of 5 V. Thus, one end of the common electrode capacitor (Cvcom) is electrically grounded to the potential of the common electrode 220. As a result, in the case that an alternating voltage is applied to the common electrode 220, the potential of the touch pad 10 connected to the other end of the common electrode capacitor (Cvcom) alternates by the alternating voltage applied to the common electrode 220. In the case that such an alternating potential overlaps with a touch signal using the D/B phenomenon, the alternating potential may cause obstacles to detection of the touch signal. Thus, when the touch signal is detected by using the D/B phenomenon, the touch signal should be detected by avoiding the rising edge and falling edge of the alternating common voltage.

Meanwhile, a reference numeral 24 in the drawing denotes a protective layer 24 to protect the touch pad 10, in which the protective layer 24 is made of glass, plastic, vinyl, or cloth.

FIG. 13 shows an example of a configuration of a touch pad, which illustrates an embodiment of the case where the touch pad 10 is built in the display device. Referring to FIG. 13, the touch screen panel 50 may be formed on top of a color filter 215 that is a part of the display device. As shown, the common electrode 220 is formed at the lower portion of the color filter 215, and the touch pads 10 are patterned on the top surface of the color filter. In the FIG. 13 embodiment, the protective layer 24 is replaced by a polarizer.

Even in the FIG. 13 embodiment, the common electrode capacitance (Cvcom) is also formed between the common electrode 220 and the touch pad 10. If an alternating voltage is applied to the common electrode, the electric potential of the touch pad 10 is induced and alternates by the alternating voltage. The voltage caused by the D/B phenomenon induced by the alternating potential overlaps with the touch signal detected by the D/B phenomenon induced by the alternating driving voltage applied to the driving capacitor (Cdrv), and thus influences upon the touch signal. Thus, when the touch signal is detected by using the D/B phenomenon, the touch signal should be detected by avoiding the rising edge and falling edge of the alternating common voltage.

Referring back to FIG. 11, the touch capacitance (Ct), the auxiliary capacitor (Caux), the common electrode capacitance (Cvcom), and the parasitic capacitance (Cp) that are formed between the touch pad 10 and a conductor such as a finger 25 are connected to the output terminal 12-1 of the charging unit 12. Thus, when a pre-charge signal such as any voltage or current is applied to the input terminal 12-1 of the charging unit 12 at a state where the charging unit 12 has been turned on, Cdrv, Ct, Cvcom, and Cp are charged in a pre-charge level and thus the potential of the input end of the touch detector 14 becomes the pre-charge level. Thereafter, if the charging unit 12 is turned off, the pre-charge (or charge) signal level is maintained unless the signals charged in the four capacitors Cdrv, Ct, Cvcom, and Cp are separately discharged from the four capacitors Cdrv. Ct. Cvcom, and Cp.

To stably isolate the charged signals, the output terminal 12-1 of the charging unit 12 and the input end of the touch detector 14 have a high-impedance (or Hi-z) state. Preferably, the output terminal 12-1 of the charging unit 12 and the input end of the touch detector 14 have an impedance of at least 100 Kohm. If a touch input is observed while discharging the signals charged in the four capacitors, the charged signals are isolated in the other ways, or the signals are quickly observed at the time of discharge initiation, there is no need to inevitably have a high-impedance (or Hi-z) state at the input end of the touch detector 14.

The touch detector 14 detects whether or not a signal level of the touch pad 10 is shifted. Preferably, the touch detector 14 detects a difference in the magnitude of a voltage detected by the D/B phenomenon at the time of occurrence of a touch input (that is, when Ct is formed), in contrast to the magnitude of a voltage detected by the D/B phenomenon at the time of non-occurrence of a touch input (that is, when Ct is not formed), to thus acquire a touch signal. The touch detector 14 may have a wide variety of devices or circuit configuration. In the embodiments to be described later, examples in which a switching device and an amplifier are used as the touch detector 14 will be described, but the configuration of the touch detector 14 is not limited thereto.

The output of the buffer 14-1 due to the driving capacitor (Cdrv) and the driving voltage applied to one end of the driving capacitor (Cdrv) at the time of non-occurrence of a touch input is determined by following Equation 1.

$$\Delta Vsensor = Vpre \pm (Vh - Vl)\frac{Cdrv}{Cdrv + Cvcom + Cp} \quad \text{Equation 1}$$

Since the touch capacitance (Ct) is added in parallel in the touch detector 14 at the time of occurrence of a touch input, the voltage detected by the D/B phenomenon at the input end of the touch detector 14 is determined by following Equation 2.

$$\Delta Vsensor = Vpre \pm (Vh - Vl)\frac{Cdrv}{Cdrv + Cvcom + Cp + Ct} \quad \text{Equation 2}$$

In Equations 1 and 2, ΔVsensor is a voltage detected by the D/B phenomenon at the input end of the touch detector 14, Vpre is a pre-charging voltage, Vh is a high level voltage of the driving voltage applied to the driving capacitor (Cdrv), or a turn-on voltage applied to a control terminal of the charging unit 12, Vl is a low level voltage of the driving voltage applied to the driving capacitor (Cdrv), Cvcom is a common electrode capacitance, Cp is a parasitic capacitance, and Ct is a touch capacitance.

The touch detector 14 detects voltages generated by Equations 1 and 2, which will be described below in detail.

First, the D/B phenomenon is defined again by using Equations 1 and 2 as follows. According to the D/B phenomenon, there are one or more capacitors connected to the driving capacitor. When an alternating voltage of a predetermined magnitude is applied to the other side (an end of FIG. 11 through which Vdrv is applied) of the driving capacitor, the potential of the point at which the capacitors are commonly connected is proportional to the magnitude of the voltage applied to one end of the driving capacitor, and has a correlation with respect to commonly connected capacitors. The correlation that is mentioned here means that a sum of the capacitance of all the capacitors connected in common is located in the denominator and the driving capacitance is located in the numerator.

According to the difference between Equations 1 and 2, Ct exists in the denominator of Equation 2. Since the touch capacitance (Ct) is a capacitance formed between the touch pad 10 and the touch unit such as a finger, the capacitance that is the size of Ct varies depending on the presence or absence of a touch input or a facing area of an opposing distance between the touch unit and the touch pad 10. Such a variation of Ct may cause a difference between the voltages induced by Equations 1 and 2. Thus, if such a voltage difference is detected, it is possible to recognize if a touch input occurs or to calculate a touch area.

In Equations 1 and 2, Vh and Vl represent the high level and low level of the driving voltage applied to the driving capacitor (Cdrv), and the D/B phenomenon occurs in both cases that the driving voltage is changed from high to low and from low to high. If the driving voltage changes from a starting point at which Vh=5 V to a point at which Vl=2 V, D/B will be proportional to −3V that is −(Vh−Vl), and if the driving voltage changes from a starting point at which Vl=2 V to a point at which Vh=5 V, D/B will be proportional to 3V that is (Vh−Vl).

At the moment the driving voltage alternates from low to high, electric charges are supplied to the driving capacitor and the charges supplied to the driving capacitor are supplied to all the capacitors connected in parallel with the driving capacitor, to thus raise the potential of all the capacitors. Accordingly, the driving voltage caused due to the D/B phenomenon is as follows.

$$\Delta Vsensor = Vpre + (Vh - Vl)\frac{Cdrv}{Cdrv + Cvcom + Cp} \quad \text{Equation 1-1}$$

In addition, at the moment the driving voltage alternates from high to low, charges are discharged from the driving capacitor and all the capacitors connected in parallel with the driving capacitor, to thus drop the potential of all the capacitors. Accordingly, the driving voltage caused due to the D/B phenomenon is as follows.

$$\Delta Vsensor = Vpre \pm (Vh - Vl)\frac{Cdrv}{Cdrv + Cvcom + Cp} \quad \text{Equation 1-2}$$

This way applies identically to the Equation 2.

Meanwhile, Vh and Vl can be easily set, and will be determined in the range of not exceeding the breakdown voltage of TDI. For example, assuming that Vpre=3V and the value by the correlation of the capacitors is 0.1, the driving voltage caused due to the D/B phenomenon will be 2 V when the driving voltage changes from a starting point at which Vh=10 V to a point at which Vl=0 V.

Also, Cvcom may be obtained from following Equation 3.

$$Cvcom = \varepsilon 1 \frac{S1}{D1} \quad \text{Equation 3}$$

In Equation 3, ∈1 may be obtained from the composite dielectric constant (or permittivity) of media existing between the touch pad 10 and the common electrode 220. In the case of FIG. 12, since glass, an air space, a polarization plate, and an adhesive for attaching the polarization plate onto glass exist between the touch pad 10 and the common electrode 220, a composite dielectric constant of these media becomes ∈1 in Equation 3. S1 is an opposite area between the touch pad 10 and the common electrode 20, which will be easily calculated. In the case that the common electrode 220 is formed over the entire lower surface of the color filter 215 as shown in FIG. 12, the opposite area S1 is determined by an area of the touch pad 10. In addition, D1 is a distance between the touch pad 10 and the common electrode 220, and thus corresponds to thickness of the medium.

As seen, Cvcom is a value that may be easily obtained and set.

The touch capacitance Ct may be obtained from following Equation 4.

$$Ct = \varepsilon 2 \frac{S2}{D2} \quad \text{Equation 4}$$

In Equation 4, the permittivity ∈2 may be obtained from a medium between the touch pad 10 and the finger 25. If a plurality of media are used between the touch pad 10 and the finger 25, a composite dielectric constant of these media can be obtained. If reinforced glass is attached on the top surface of the touch screen panel 50, in FIG. 12, the permittivity ∈2 can be obtained by multiplying the specific dielectric constant of the reinforced glass by the dielectric constant of vacuum. S2 corresponds to an opposite area between the touch pad 10 and the finger 25. If the finger 25 covers the entire surface of a certain touch pad 10, S2 corresponds to the area of the certain touch pad 10. If the finger 25 covers part of a certain touch pad 10, S2 will be reduced from the area of the touch pad 10, by an area of the certain touch pad 10 that is not covered with the finger 25. In addition, D2 is a distance between the touch pad 10 and the finger 25, and thus corresponds to thickness of a protection layer 24 that is put on the upper surface of the touch screen panel 50.

As described above, Ct is a value that can be also easily obtained, and that can be also easily set up by using the material and thickness of the protection panel 24 or the reinforced glass that is put on the upper surface of the touch screen panel 50.

According to Equation 4, since Ct is proportional to the opposite area between the finger 25 and the touch pad 10, a touch share of the finger 25 with respect to the touch pad 10 can be calculated from the Ct. A method of calculating a touch share of the finger 25 is as follows. Considering Equations 1 and 2, a difference between Equations 1 and 2 is a difference in size of a touch capacitance (Ct) according to the presence or absence of a touch input. Assuming Vh, Vl, Vpre, and Cdrv are fixed values, only Ct can be extracted from Equations 1 and 2. Namely, a relationship Ct=f (ΔVsensor, parallel-connected capacitors, Vh, Vl, Vpre) is established. Assuming that ∈2 and D2 are fixed values in Equation 4, a touch area is proportional to the capacitance. Thus, it is possible to calculate an area by the extracted Ct.

Further, when an area is obtained by using Equations 1 and 2, both the D/B voltage generated by Equation 1 and the D/B voltage generated by Equation 2 are used. The D/B voltage generated by Equation 1 is a value set in factory calibration or real time calibration which will be described later, and is an event that has happened earlier than Equation 2. The D/B voltage generated by Equation 2 is a voltage generated at the touch detection time, and thus the touch detection time is later than the detection time of the D/B voltage generated by Equation 1. In order to obtain the touch area in the present invention, both the past D/B voltage such as factory calibration or real time calibration and the D/B voltage at a point in time when a touch input occurs are used. For example, the voltage derived by Equation 1 may be applicable in the denominator and numerator of a certain term in an equation for calculating an area, and the voltage derived by Equation 2 may be applicable in the denominator and numerator of another certain term, in which these terms that are different from each other are included in the equation for calculating the area.

Since it is possible to detect an area according to a variation of an opposite area between a finger 25 and the touch pad 10, various gestures can be carried out by varying a contact area of the finger with respect to the touch pad 10. Referring to FIG. 14A, the finger 25 is in contact with the touch screen panel 50, and the finger 25 is opposed to nine touch pads 10. Further, referring to FIG. 14B, the finger 25 is opposed to fifteen touch pads 15. Raising or lowering the single finger varies a contact area between the finger 25 and the touch pad 10, and thus it is possible to make an image screen (e.g., a landscape or a person, or a keyboard, etc.) displayed on a display device large and small in conjunction with the contact area.

FIGS. 15A to 15C are views showing another example of a configuration of gesture using an area. U.S. Apple's iPad® has four sides made of black matrix (BM) as shown in FIG. 15A, which are screen sections where no images are displayed as regions where fingers are located when the iPad is ergonomically held with both hands to then watch movies. Such a pad series device has a wide screen of more than 7 inches and thus is mostly held with both hands to thus watch an active area (hereafter abbreviated as A/A) on which images are displayed. Accordingly, BM is essentially needed. However, the BM is a factor that widens the screen size of the device where BM has been applied, and thus it may cause a problem of degrading the portability.

FIGS. 15B and 15C are views showing another example of a configuration of gesture using an area to solve problems of BM. In FIG. 15B, BM does not exist unlike FIG. 15A, and most of the device is made of the A/A except for a BM area of several millimeters (mm) in an absolute screen (e.g., passages along which LCD's gate signal wires or source signal wires pass). If one does not hold the device as he or she watches the device upright on a desk or lap, the full screen is displayed on the device shown in FIG. 15B.

However, in the case that the device is held by the hand and the finger contacts one side of the screen, the BM in correlation with the area of the finger contacting the screen is displayed on the screen. The BM is not a BM that is always present as shown in FIG. 15A, but a BM by images. That is, if the finger is in contact with the screen and thus the contact area becomes a certain area above, the BM can be displayed into images in black series by allowing the finger in contact with the screen to become an interface or a border between the BM and the A/A. Here, since the area marked by the BM should not react with a touch, GUI (Graphic User Interface) such as a touch icon is not included in the BM area indicated by the black or dark color. Even though GUI is included in the BM area, reaction by touch should not occur. In addition, in the case that one finger is pushed deeper into the screen or is put out to the outside, the BM will be made wider or narrower in conjunction with a contact area between the finger and the screen. If one finger 25 contacts the left or right side of the screen or the left and right sides thereof, it is preferable that the upper and lower BMs are automatically generated, and an area ratio of the A/A is 4:3 or 16:9.

In addition, if an area of a finger 25 that is in contact with one side of the screen is smaller than a threshold value that has been set in advance, the area of the finger 25 may not be recognized as a gesture for a grip, while if the former is greater than the latter, it is desirable to generate the BM from that time.

By using the above-described technical principles, a portable electronic device varying an area where an image of a display apparatus image is displayed on the basis of a gripping area and a position according to one embodiment of the present invention, can be provided.

FIG. 16 is a waveform diagram showing a process for detecting a touch signal in the embodiment of FIG. 11. Referring to FIG. 16, a method of detecting a touch signal by using a driving back phenomenon, will be described as follows.

As mentioned earlier, in one embodiment of the present invention, a common voltage may be an alternating voltage alternating with a constant frequency, or a DC voltage that does not alternate or an AC voltage that alternates aperiodically. In the FIG. 16 embodiment, the common voltage alternates periodically in an area 1 to an area 8, and the common voltage having the DC voltage that does not alternate is provided in an area 11 to an area 15. Accordingly, it can be seen that the present invention can be carried out regardless of the form of the common voltage.

In order to proceed with the present embodiment, a common voltage should be detected first. If the waveform of the rising edge and falling edge of the common voltage is applied at an interval at which the driving back phenomenon is detected in the case that the common voltage alternates with a certain size, the waveforms that are detected in the touch detector 14 may be distorted due to the waveform of the common voltage. Accordingly, the present invention detects the driving back phenomenon while avoiding the points in time at which the rising edge and falling edge of the common voltage occur. However, in another embodiment, as in the exemplary embodiment of the present invention, both a driving back phenomenon that occurs when the driving voltage is applied to one side of the driving capacitor (Cdrv), and a driving back phenomenon that occurs at the rising edge and falling edge of the common voltage may be detected together, to thus detect the touch input.

If a common voltage is a DC level that does no alternate, it is possible to detect a driving back phenomenon that does not depend on the waveform of the common voltage. A touch drive IC (TDI) 30 that will be described later may include a mode setter unit of setting a mode of sensing the rising edge and falling edge of the common voltage and referring to the sensed rising edge and falling edge thereof in the case that the common voltage alternates, and a mode where the common voltage is not referred to when the common voltage does not alternate. By setting the mode setter unit, when the common voltage does not alternate, the common voltage is not detected and is not synchronized with a touch detection process. Thus, it is possible to detect the driving back phenomenon easily. Once the common voltage is detected and the common voltage alternates, the driving back voltage due to the driving voltage applied to the driving capacitor (Cdrv) can be detected while avoiding the points in time at which the common voltage alternates. Thus, according to benefits of this approach, the driving back phenomenon due to the touch input can be detected in any display devices in which the common voltage alternates or does not alternate.

Embodiment in an Area where a Common Voltage Alternates

The waveform of the common voltage is first detected to then detect the rising edge or falling edge of the waveform of the common voltage, and then the ON/OFF control terminal of the charging unit 12 is turned on after a predetermined time (indicated as 't1' in this embodiment) to thereby pre-charge capacitors. Referring to FIG. 11, the capacitors that are charged in this embodiment are Cdrv, Ct, Cvom, and Cp. It may be good that Vpre that is the pre-charging voltage is always maintained as the charging voltage level, or any potential may be used as the pre-charging voltage until the charging voltage level is maintained immediately before Vg is turned on.

Referring to FIG. 11, Vpre that is the pre-charging voltage is connected to the input unit 12-2 of the charging unit 12, and is transferred to the output unit 12-1 at a state where the charging unit is turned on, to thus charge the capacitors. In this case, a voltage drop due to a resistance between the input unit 12-2 and the output unit 12-1 of the charge unit 12 has been neglected.

The control voltage (Vg) can be applied in any areas. For example, an area ④ is an interval where the common voltage alternates, and a change in the magnitude of the voltage occurs due to the D/B caused by the alternating common voltage, but the control voltage (Vg) is applied in the interval of the area ④. Thus, a voltage variation due to the common voltage does not occur. If the ON/OFF control terminal of the charging unit 12 is turned off, after capacitors have been charged, the output unit 12-1 of the charging unit 12 is in the Hi-z state and the input of the touch detector 14 is in the Hi-z state by use of the buffer. Accordingly, the charged voltages are maintained in the capacitors. Likewise, intervals of charging voltages and maintaining the charged voltages are areas ①, ④, and ⑦. In the areas ①, ④, and ⑦, predetermined discharge may occur due to the fact that the output unit 12-1 of the charging unit 12 and the input of the touch detector 14 are not in the ideal Hi-z state, but such discharge can be neglected in this embodiment.

In this embodiment, the case that the voltage due to the D/B is detected at the time the driving voltage is changed from low to high has been illustrated in which the charging voltage is 2 V. In addition, it was assumed the amplitude of Vdrv is 10 V, and the calculated value of $$\frac{Cdrv}{Cdrv + Cvcom + Cp}$$

is 0.2. Thus, the voltage in the areas ②, ⑤, and ⑧ where the D/B phenomenon occurs is 4 V by Equation 1-1. Equation 1-1 represents the detection voltage by the D/B phenomenon in the case that no touch occurs, and Equation 1-2 represents the detection voltage by the D/B phenomenon in the case that a touch occurs.

If a touch has occurred in the area ⑦, the voltage in an area ⑧ should be changed by Equation 2. Therefore, if the value of $$\frac{Cdrv}{Cdrv + Cvcom + Cp + Ct}$$

in Equation 2 is 0.1, the voltage in the area ⑧ is to be 3 V. As described above, the touch detector 14 detects the voltage when a touch has occurred as 3 V on the basis of a voltage of 4 V when no touch has occurred, and calculates a difference between the detection voltage of 3 V and the reference value of 4 V, to thereby judge whether it has been touched or untouched, and to calculate a touch area.

The time required for the touch detection in touch detecting areas such as areas ②, ⑤, and ⑧ is only dozens of microseconds (ρs) and the discharge amount of the detected voltage is insufficient, and thus in the present embodiment, the voltage due to the D/B phenomenon in the areas ②, ⑤, and ⑧ is detected, to thus ignore the discharge in the areas where it is determined whether or not a touch is detected. Therefore, the voltage due to the D/B becomes 2 V by Equations 1-2 even in the intervals such as areas ③ and ⑥ where the driving voltage returns to 0 V.

On the other hand, referring to a boundary region between the areas ⑧ and ⑨, the boundary region is an interval where the D/B phenomenon occurs by the common voltage, and the voltage that is formed when the interval is changed from the area ⑧ to the area ⑨ is being changed since the common voltage is changed from high to low. Referring to Equations 1 and 2, when the magnitude of the voltage applied to one side of a capacitor that is connected in common is changed, a change of the potential at the commonly connected capacitor is called a D/B phenomenon. Thus, referring to FIG. 11, a variation of the potential occurs due to the D/B at a point P in both cases where an alternating driving voltage is applied to the driving capacitor (Cdrv) and an alternating common voltage is applied to the common electrode capacitor (Cvcom).

In the case where a touch occurs and Ct is formed, the voltage that is caused due to the D/B by an alternating common voltage is represented by following Equation 5.

$$\Delta Vsensor = Vpre \pm (VcomH - VcomL)\frac{Cvcom}{Cdrv + Cvcom + Cp + Ct} \quad \text{Equation 5}$$

In Equation 5, ΔVsesor is the driving voltage that is caused due to the D/B in the touch detector 14, Vpre is the potential of the capacitors that are commonly connected immediately before the D/B voltage due to the alternating of the common voltage is generated, VcomH is the high-level voltage of the common voltage applied to the common electrode capacitor (Cvcom), VcomL is the low-level voltage of the common voltage applied to the common electrode capacitor (Cvcom), Cdrv is the driving capacitance, Cvcom is the common electrode capacitance, Cp is the parasitic capacitance, and Ct is the touch capacitance.

In Equation 5, assuming that VcomH-VcomL is 10 V, and $$\frac{Cvcom}{Cdrv + Cvcom + Cp + Ct}$$

is 0.05, the voltage in the area ⑧, that is, Vpre is 3 V. Thus, 3 V−10*0.05 V=2.5 V, and so the voltage of the area ⑨ is 2.5 V. Also, since the voltage drop due to Vdrv that is the driving voltage in the area ⑩ is 2 V, the potential is lowered from 2.5 V to 0.5 V.

On the one hand, Equation 5 is a voltage detection equation according to the alternating of the common voltage in the case that a touch has occurred. On the other hand, in the case that a touch has not occurred, there is no Ct in denominator of Equation 5, which will be expressed by Equation 6.

$$\Delta Vsensor = Vpre \pm (VcomH - VcomL)\frac{Cvcom}{Cdrv + Cvcom + Cp} \quad \text{Equation 6}$$

In Equation 6, ΔVsensor is the driving voltage that is caused due to the D/B in the touch detector 14, Vpre is the potential of the capacitors that are commonly connected immediately before the D/B voltage due to the alternating of the common voltage is generated, VcomH is the high-level voltage of the common voltage applied to the common electrode capacitor (Cvcom), VcomL is the low-level voltage of the common voltage applied to the common electrode capacitor (Cvcom), Cdrv is the driving capacitance, Cvcom is the common electrode capacitance, Cp is the parasitic capacitance, and Ct is the touch capacitance.

On the other hand, referring to Equations 5 and 6, it is possible to detect the voltage due to the D/B by applying an alternating driving voltage to the driving capacitor (Cdrv), but it is possible to detect a change in the voltage that is caused by the D/B phenomenon when the alternating common voltage is applied to the common capacitor electrode (Cvcom) of the display device, to thus detect a touch. In this embodiment, in order to detect a larger voltage, that is, in order to increase a detection sensitivity, it is better to remove the Cdrv term from the denominators of Equations 5 and 6. Since Cdrv can be formed within the TDI 30, it is possible to eliminate Cdrv in order to detect the D/B voltage due to the alternating of the common voltage. If a switching device such as a CMOS or TFT switch is connected to one side of Cdrv and then the switching device turned on or off, in order to remove Cdrv, it is possible to determine whether or not Cdrv is connected to the touch detector.

The following Equations 7 and 8 are used to calculate the driving voltages when Cdrv is removed and the voltage due to the D/B by the alternating of the common voltage is detected.

$$\Delta Vsensor = Vpre \pm (VcomH - VcomL)\frac{Cvcom}{Cvcom + Cp} \quad \text{Equation 7}$$

$$\Delta Vsensor = Vpre \pm (VcomH - VcomL)\frac{Cvcom}{Cvcom + Cp + Ct} \quad \text{Equation 8}$$

Equation 7 is an equation of calculating the driving voltage when no touch occurs, and Equation 8 is an equation of calculating the driving voltage when a touch occurs.

Equations 5 to 8 are applicable to both cases where the touch screen panel 50 is mounted on the upper surface the display device 200 as shown in FIG. 12, and where the touch screen panel 50 is patterned directly on the color filter or the TFT substrate of the display device, as shown in FIG. 13.

Embodiment in an Area where a Common Voltage does not Alternate

By way of areas ⑪ to ⑮ as an example, an embodiment of a case where a common alternating voltage does not alternate will be described as follows.

A display device using an LCD employing dot inversion is a display device in which a common voltage that is applied to a common electrode is a DC level, and a display device using an AMOLED or PDP is a display device including no common electrode or having no alternating common voltage. In the embodiments of such cases, if a touch screen panel 50 is coupled with a display device as shown in FIG. 12 or 13, the touch detector 14 has no need to consider the driving voltage variation by the common voltage according to Equation 5 or 6, and a complex process of detecting a common voltage may be omitted as a unit of detecting a touch by avoiding the rising edge or the falling edge of the common voltage.

Areas ⑪ and ⑭ of FIG. 16 are intervals at which capacitors are charged into the pre-charging voltage (Vpre) by the charging unit 12 and the charged voltage is maintained in the capacitors when the charging unit 12 is turned off. In addition, areas ⑫ and ⑮ of FIG. 16 are intervals at which the voltage due to the D/B is formed by the driving voltage (Vdrv), and thus it is confirmed whether or not a touch occurs by considering the magnitude of the voltage. In this embodiment, assuming no touch has occurred, the voltage in the area ⑫ is detected to be 4 V. An area ⑬ is an interval at which a voltage drop of 2 V occurs and thus the potential is kept as 2 V, when the driving voltage is changed from high to low.

Even in the case that the common voltage of the DC level is applied to the common electrode, an alternating voltage may be generated in the common electrode due to the noise generated during the driving of the switching device (for example, a TFT switch of a TFT substrate of the LCD) or the liquid crystal in the display device. Typically, ITO (Indium Tin Oxide) is used as the common electrode and the sheet resistance of ITO is several hundred ohms or so. Thus, when the ITO common electrode is used in a large-area display device of 7 inches or 10 inches, the resistance increases at a place further away from an applying unit to which the common voltage of the DC level is applied, and the magnitude of the common voltage at the place further away from the applying unit may vary. This noise may be periodic and non-periodic noise. This noise may correspond to VcomH and VcomL in Equation 5 or 6. That is, assuming the noise alternates from −1 V to 2 V, VcomH is 2 V and VcomL is −1V.

In the case that the size of the alternating voltage of this noise is small, changes in the magnitude of the voltage according to Equation 5 or 6 are small, and thus the D/B voltage due to the driving of the driving capacitor (Cdrv) is not affected, but if the alternating voltage of noise is big, the D/B voltage due to the driving of the driving capacitor (Cdrv) is affected. As a result, a touch signal should be detected while avoiding such noise. Thus, in the same manner as the common voltage, the rising edge or the falling edge of such noise is detected and then the touch signal should be detected while avoiding the edges of the noise.

In the case that the alternating common voltage exists in the embodiment of FIG. 16, the touch signal should be detected in synchronization with the common voltage, and the touch coordinate is calculated. A report time of reporting the touch coordinate to a CPU of a set in use, for example, a CPU of a mobile phone or a central processor such as A4 of iPad® is determined in synchronization with the alternating cycle of the common voltage. However, in the case that there is no alternating common voltage, a touch signal cannot be detected in synchronism with the common voltage and thus the touch signal should be detected by setting a detection interval.

In FIG. 16, t10 is a period for detecting the touch signal in the absence of the alternating common voltage. This period may have a time duration from several µs to several ms, and a touch signal is reported to a CPU of a set in synchronism with the period.

On the other hand, if distortion of a signal occurs due to the common voltage as in the case of the boundary area of the areas ⑧ and ⑨, at the time of detecting the touch signal in areas ②, ⑤, and ⑧ that are intervals of detecting the touch signal, the touch detector 14 may perform a touch operation by considering the signal distortion. However, the touch detector 14 may not easily perform detection of a touch due to the D/B voltage by the common voltage under the circumstances that the magnitude of the alternating common voltage is non-continuous or unpredictable. Thus, if a touch is detected in an interval at which the common voltage has a flat DC level by avoiding the rising edge or the falling edge of the common voltage, it is possible to circumvent this problem.

Thus, according to the embodiment of the present invention, timing of a touch detection is dynamically determined by performing synchronization with the common voltage based on the characteristics of the common voltage, to thereby perform the touch detection. Hereinafter, an embodiment for detecting a common voltage will be described below in detail.

FIG. 17 shows a common voltage detection circuit for detecting a common voltage according to an embodiment of the present invention. Referring to FIG. 17, a method of detecting edge portions of the common voltage will be described as follows.

FIG. 17 shows the embodiment in which the common electrode capacitor (Cvcom) formed between the touch pad 10 and the common electrode 220 is FIG. 12 or 13 is formed in a common voltage detector 15.

As described earlier, if a plurality of the touch pads 10 of FIG. 12 or 13 are used to form the touch screen panel 50, the parasitic capacitors Cp is formed between the sensor signal wires 22, and may also be formed in the process of assembling the TDI and the touch screen panel. Thus, Cp should be considered in the common voltage detection circuit.

In order to detect the edges of the common voltage, it is necessary to make the common electrode capacitor (Cvcom) be in the Hi-z state. For this purpose, the charging unit 12 that may be made in the Hi-z state at a time of a turn-off operation and the common voltage detector 15 whose input is in the Hi-z state are needed. An upper reference level (hereinafter, abbreviated as URL) and a lower reference level (hereinafter, abbreviated as LRL) are supplied to the common voltage detector 15, and these reference levels may be generated in the inside of the TDI or may be supplied to the TDI from outside of the TDI.

For the convenience of setting such LRL and URL, or in order to make the output waveform of the detected Vcom included within the scope of the operating breakdown voltage of TDI, it is preferable that capacitors connected to Cvcom and Cvcom be also charged with an appropriate DC level.

FIG. 18 is a waveform diagram of the common voltage detected by a common voltage detection circuit. Referring to FIG. 18, the waveform of Real Vcom at the top of FIG. 18 is the actual Vcom that is applied to the common electrode 22 in FIG. 12 or 13. In this embodiment, assuming that Vcom alternates from 0 V to 5 V, and the charging voltage Vpre_com is 2.5 V, since the charging voltage of 2.5V is charged in Cvcom and Cp, at the state that charging unit 12 is turned on, the potential at the point P is 2.5 V.

The common voltage is detected in two stages. The area 1 of FIG. 18 is a point in time when the common voltage has not been still detected. This is a moment when the common voltage is not generated immediately after the power is on or during performing the process of detecting the common voltage and detecting the subsequent common voltage in synchronism with the detected common voltage.

At a point in time when the common voltage has not still detected as in an area 1, the charge unit 12 is made to be turned on, to then apply the charging voltage Vpre_com to Cvcom and Cp, and the charge unit 12 is made to be turned off, to then wait until the rising edge or falling edge of the common voltage is detected. Since Cvcom is in the Hi-z state if the charging unit is turned off, a voltage difference is generated according to Equation 7 when the rising edge or falling edge of the voltage is applied to the common electrode 220 of FIG. 12 or 13.

Assuming that ΔVsensor detected in Equation 7 is 2 V, in the case of the rising edge of the common voltage, the potential at the point P of FIG. 17 is 4.5 V, and in the case of the falling edge of the common voltage, the potential at the point P of FIG. 17 is 0.5 V. Thus, in the case that the waveform of Real Vcom is a rising edge as in the area 1, detected Vcom is 4.5 V.

Since a value of $$\frac{Cvcom}{Cvcom + Cp}$$

in Equation 7 is a value that is predictable in advance, it is also possible to predict the value of ΔVsensor to some degree. Assuming that a value of $$\frac{Cvcom}{Cvcom + Cp}$$

is predicted as about 2 V, the value of ΔVsensor may alternate or swing between 4.5 V and 0.5 V by the Vpre_com. In this case, when the detected common voltage is higher than the charging voltage of 2.5 V, it may be determined that the current common voltage is in the rising edge state. In contrast, when the detected common voltage is lower than the charging voltage of 2.5 V, it may be determined that the current common voltage is in the falling edge state.

Referring to FIG. 18, URL was set at 3 V and LRL was set at 2 V. In the embodiment of FIG. 18, the URL is a reference voltage for detecting the rising edge, and thus a voltage that is higher than the URL may be determined as a rising edge. In the embodiment of FIG. 18, the URL is only one example, and thus all the voltages that are larger than 2.5 V and lower than 4.5 V may be set to URL. In the embodiment of FIG. 18, LRL is set to 2 V and the common voltage that is lower than the LRL may be determined as a falling edge. A voltage between 2.5 V to 0.5 V can be arbitrarily set to LRL.

Referring to Equation 7, the D/B voltage detected by the alternating of the common voltage depends on the size of the charging voltage. Accordingly, the size of the charging voltage should be necessarily considered in order to set the URL and LRL.

Once the common voltage is detected, the subsequent common voltage should be detected in synchronism with the detected common voltage. This is because, since the common voltage usually repeats high and low periodically in the case that an alternating common voltage is generated in the display device, it is predictable when the next common voltage having a polarity opposite to that of the detected common voltage will be detected if the common voltage has been detected in any state. For example, assuming that the alternating cycle of the common voltage is 30 μs, it is predicted that a falling edge will be detected and a low state will be maintained 30 μs after the common voltage maintaining the high state has been detected after the rising edge. Thus, if the state of the detected common voltage, that is, a high state or a low state is found, the state of the next common voltage to be detected can be predicted within a set time. Thus, if the common voltage is not detected within the set time, this is because a common voltage detection system is abnormal, or the common voltage is not generated. Accordingly, it is possible to perform an appropriate exception handling process.

An area 2 in FIG. 18 illustrates a process of detecting the next common voltage in synchronization with the detected common voltage. If it is assumed that Vg_com applied to the ON/OFF control terminal of the charging unit 12 of FIG. 17 continues the low state in the area 2, the output unit of the charging unit 12 is in the Hi-z state and thus the potential of the detected common voltage will continue to maintain at 4.5 V (however, a potential change caused by the discharge has been ignored). In this state, the charging unit 12 is turned on (here, Vgcom_on determines a turn-on time.) and thus a charging voltage of Vpre_com is supplied to Cvom and Cp, the common voltage will continue to maintain at 2.5 V from the charged time to a time even after the charging unit is turned off. "Wait_vgcom" that is a time at which a charging voltage for detecting of the next common voltage after the common voltage has been detected is applied may be a time that can be arbitrarily set, and it is possible to set a desired time by using a register for setting the "Wait_vgcom." For example, if the period of the common voltage is 30 μs, "Wait_vgcom" is a time that can be changed within 30 μs. It is possible to freely set "Wait_vgcom" as 1 μs, 5 μs, 10 μs, etc.

Thus, it is possible to remove noise that may occur in the common voltage by setting "Wait_vgcom" to a desired position. For example, assuming the period of the common voltage is 30 μs, if "Wait_vgcom" that determines a turn-on time of the charging unit 12 is set to 1 μs, and "Vgcom_on" is set to 25 μs, the potential of the point P in FIG. 17 is 2.5 V for at least 27 μs long, and fluctuation of the voltage due to the noise that is caused by the application of the charging voltage does not occur. Accordingly, a probability of malfunction due to noise may drop greatly.

In the embodiment of FIG. 18, the cycles of the high section and the low section of the common voltage are different from each other. Thus, it is preferable that "Wait_vgcom" can be set separately in the intervals where the common voltage is high and low. If the register is used to set the intervals of "Wait_vgcom," "Wait_vgcom_hi" is a value that is set in the interval where the common voltage is high, and "Wait_vgcom_lo" is a value that is set in the interval where the common voltage is low.

Thus, according to the embodiment of the present invention, the common voltage whose high and low intervals are different in their lengths can be detected efficiently.

An area 3 is an interval at which the common voltage remains low since the falling edge. In the area 3, the common voltage is detected, Cvcom is charged after "Wait_vgcom" to then wait for the detection of the common voltage. Here, the potential is 2.5 V, and the potential of the detected common voltage due to the D/B phenomenon by the falling edge of the common voltage becomes 0.5 V. Since the potential of the detected common voltage of 0.5 V is lower than the LRL of 2 V, the common voltage detector 15 detects the potential of the detected common voltage of 0.5 V to thus output that the falling edge has been detected. This is output through "detection result" of FIG. 18 and the TDI 30 uses the signal output through "detection result" of FIG. 18 to generate a signal required for the touch detection which will be described later, or to generate a signal required for detection of the next common voltage. The "detection result" is output to the outside of the TDI. The "detection result" can be used in order to accurately see the high or low level of the detected common voltage, or in order to accurately measure the time of the high or low interval.

FIG. 19 shows a common voltage detection circuit for detecting a common voltage according to an embodiment of the present invention. Referring to FIG. 19, the common voltage may be detected in the common voltage detection circuit, or can be supplied from an external source that is located in the outside of the TDI 30. The TDI 30 has a unit for determining whether the common voltage is detected in the inside of the TDI or whether an external common voltage is used. By setting the common voltage determination unit, a switching device 16 determines whether to use an externally applied common voltage or whether to use a common voltage detected by the common voltage detector 15.

A comparator unit 19 is used in the common voltage detector 15. The comparator unit 19 includes a comparator 19a for detecting the rising edge of the common voltage, and a comparator 19b for detecting the falling edge of the common voltage. The comparator 19a uses URL as the reference voltage and the comparator 19b uses LRL as the reference voltage. The comparator 19a for detecting the rising edge of the common voltage outputs high or low when the detected common voltage is higher than the URL, and the comparator 19b for detecting the falling edge of the common voltage outputs high or low when the detected common voltage is lower than the LRL.

On the other hand, referring to FIGS. 12, 13 and 19, the touch pad 10 for touch detection detects the common voltage as well as the touch. Accordingly, it is assumed that the touch occurs at the moment when the common voltage is detected, it is impossible to detect the common voltage by using Equation 7, and thus the common voltage should be detected by using Equation 8. When Equation 8 is used, the size of the high and low section of the common voltage detected due to the addition of Ct in the denominator of Equation 8 may vary in contrast to the absence of Ct. However, in the case that such a variation is not large, it is possible to detect the common voltage by changing the level of the URL and LRL. In the case that the high voltage or low voltage of the detected common voltage lacks discrimination due to Ct, to accordingly make it difficult to use it or induce noise, it is possible to detect the common voltage by using the touch pad 10 where no touch occurs. Although it will be described later, several dozens or hundreds of touch pads 10 are used in the touch screen panel 50. Thus, it is possible to select the touch pad where no touch occurs by making several touch pads connected to the common voltage detecting circuit by using a multiplexer (hereinafter, abbreviated as Mux).

The input portion connected to the point P in common voltage detection unit 15 of FIG. 17 or 19, should be in the Hi-z state. For this purpose, a device having a Hi-z input for connection with a buffer or gate may be connected at point P. In addition, the level of a common voltage is detected by using an ADC and the detected common voltage level is transferred to an internal CPU in the inside of the TDI (not shown) or an external CPU in the outside of the TDI, to thus be compared with an URL or LRL that is set in advance and to thereby detect the edges and levels of the common voltage. Although it is not shown in the drawings, the common voltage detector 15 may use a filter in which a LPF (Low Pass Filer) HPF (High Pass Filter), ranking filter or GCF may be used as the filter.

In the case that a display device includes an LCD, no common voltage is generated in the back porch or front porch interval of the image frame. Otherwise, a change in the common voltage whose period is longer or shorter may occur. Alternatively, the common voltage may not be detected or a detection error may occur due to an abnormal operation of the common voltage detector 15 and the noise superposed on to the common voltage. Even when such a problem occurs, the operation of the touch detection circuit and the touch detection for detecting the touch should continue, and thus measures for the common voltage detection errors is needed.

Measures for Common Voltage Detection Errors

1) Factory Calibration

Factory Calibration (hereinafter, abbreviated as fac.cal) is a method of continuously performing touch detection in which a common voltage is detected in a stable environment at the time of being shipped from a factory, factors regarding the detected common voltage are stored in a memory, and the touch detection is continued by using the data stored in the memory when the common voltage is not detected. The factors regarding the common voltage includes a duration of the high section of the common voltage, a duration of the low section of the common voltage, each duration of the high section and low section of the common voltage in the back porch or front porch interval of the image frame, and the like. In the process of detecting the common voltage after factory calibration has been completed and various factors of the common voltage are stored in the memory, an exception handling process depending on a failure mode of the common voltage is as follows.

(1) In the Case that a Common Voltage is not Detected

As described above, a time that will be taken until the appearance of a next common voltage since the common voltage has been detected can be seen schematically by calculation. A correct time may be measured by using the output for the external monitor of the common voltage connected to the exterior of the TDI. Therefore, if the common voltage is not detected at the expected time, a CPU 40 or a signal processor 35 of the TDI that will be described later extracts the duration of the missed common voltage among the common voltage factors stored in the memory, and detects the touch signal in synchronization with the extracted duration.

For example, the common voltage of the low section has been detected and then the common voltage of the high section should be detected after 30 μs. Here, the time of 30 μs is a value that is detected in the process of fac.cal and stored in the memory. Thus, if the rising edge of the common voltage is not detected even with a waiting of 30 μs, the CPU 40 generates a virtual starting point of the rising edge and generates a signal necessary to detect the next common voltage in synchronization with the virtual starting point of the rising edge, and also generates signals required for the touch detection. The signals required for the touch detection include the charge time using the charging unit 12 shown in the embodiment of FIG. 11, the adjustment of the time at which the driving voltage is applied after the charge time, the setting of the time at which the touch detection starts, etc., which will be described later.

(2) When an Error Occurs in the Detected Common Voltage

FIG. 20 is a waveform diagram illustrating a method of recovering an error when the error occurs at the time of detecting a common voltage according to an embodiment of the present invention. Referring to FIG. 20, the detected common voltage 1 (detected Vcom1) that is detected in contrast to the value stored in the memory represents early occurrence of the detected common voltage, and the detected common voltage 2 (detected Vcom2) that is detected in contrast to the value stored in the memory represents late occurrence of the detected common voltage. One of the methods of recovering a detection error, is embodied by setting a window based on the value stored in the memory. For example, in the case that the duration of the high section of the common voltage stored in the memory is 30 μs, the detection time should become from 30±5 μs in order to set a window of 5 μs. Accordingly, the common voltage that has been detected within a range of 25 μs to 35 μs is considered normal and thus the common voltage detected beyond the range of 25 μs to 35 μs is treated as badness. Here, the window can be set arbitrarily and the TDI 30 has a unit of setting the window. For example, a window should be set through a register or should be written in a certain area of a non-volatile memory such as a flash memory.

The common voltage that is detected earlier than the window in the same manner as that of the detected common voltage 1 (detected Vcom1) is considered as noise and is ignored. If the common voltage is not detected even at the end of the time window, at 35 μs, the CPU recalls the duration of the low-level common voltage among the factors written in the memory, and generates a signal for detecting the next common voltage in synchronization with the recalled duration of the low-level common voltage, and also generates a touch signal for detecting a touch input. For example, assuming the duration of the low section is 25 μs, 5 μs has already passed and thus the necessary signals are generated in synchronism with 20 μs. In addition, if a common voltage is not detected during 35 μs that is obtained by adding 30 μs written in the memory and 5 μs that is the window area in the same manner as that of the detected common voltage 2 (detected Vcom2), the CPU generates a virtual common voltage of 20 μs as described above, and generates signals required in synchronization with the virtual common voltage.

The embodiment of the present invention having the above-described configuration, performs common voltage synchronization dynamically corresponding to the non-detection or detection error of the common voltage, by using the common voltage information and the window information pre-stored in the process of fac.cal.

2) Real-Time Calibration (Abbreviated as RTC)

In the case that a display unit is med of a LCD (Liquid Crystal Display), a LCD Drive IC (hereinafter, abbreviated as LDI) generates a common voltage. LDI is an IC (Integrated Circuit) of playing a role of applying a pixel voltage to a TFT (Thin Film Transistor) of a LCD and controlling the gate timing of the TFT. In order to generate a common voltage from the LCD, an oscillator (hereinafter, abbreviated as OSC) is used, and the OSC has a variable period since values of a resistor and a capacitor constituting the OSC are changed depending upon a change in temperature. If the common voltage is detected by referring to only the factors stored in the process of fac.cal in the case of a big change, an error may occur at the time of an exception handling process that is treated in the case that the common voltage is set in the outside of the window area. In order to avoid such a problem, the factors of the common voltage detected in real time, are stored in the memory and the stored factors of the common voltage are used for the exception handling process, which is called RTC.

In addition, without performing fac.cal, there is a method of storing factors extracted from RTC in a memory and using the stored factors in an exception handling process.

Since fac.cal, a separate memory area is required for RTC, and a unit for determining whether the factors stored in the process of fac.cal are used or the factors detected from RTC are used in order to perform the exception handling process should be provided. It is reasonable to use the RTC factors. However, since the RTC factors have the probability of occurrence of detection errors due to noise higher than the detection error occurrence probability of the fac.cal factors, it may be necessary to use the fac.cal factors as absolute standards. Accordingly, it is necessary to provide a unit for selecting either the RTC factors or the fac.cal factors. Such a unit for selecting either the RTC factors or the fac.cal factors may be determined by changing a register that is set in the inside of the TDI or storing the RTC factors and the fac.cal factors in the non-volatile memory, and referring to the changed register or stored factors.

FIG. 21 is a flow chart for performing a fac.cal process for extraction of factors of a common voltage. Referring to FIG. 21, a first step for the fac.cal process for extraction of factors of a common voltage is a step of determining whether the common voltage is detected. As described above, since the common voltage has the DC level in the case of a dot inversion LCD, it is not necessary to detect the common voltage. Thus, a unit for determining whether the common voltage is detected or not should be provided in the inside of the TDI. Such a unit may be implemented by using a register or a non-volatile memory.

In the case of detecting the common voltage, the signals illustrated in FIG. 16 are generated, and thus the common voltage detection circuit shown in FIG. 17 or 19 is provided to perform the common voltage detection step.

Referring back to FIG. 21, once the common voltage detection is completed, a step of storing the common voltage factors detected in the common voltage detector 15 in the memory, is performed.

Assuming that the absolute time required for detecting the touch signal and calculating the detected signal is 40 µs, it is impossible to detect the touch signal while avoiding the rising edge or the falling edge of the common voltage in synchronization with the common voltage during performing the touch detection in the case that the duration of the common voltage is less than 40 µs. Likewise, in the case that the duty of the common voltage is less than the time required for the operation of the touch signal, the duties of a plurality of the common voltages may be used. For example, assuming that each of the durations of the high and low sections of the common voltage is 30 µs and the time required for the touch signal operation is 40 µs, the touch detector 14 detects the rising edge and falling edge of common voltage and outputs only one signal, to thus calculate a touch signal in synchronism with only the one output signal. Otherwise, the TDI 30 may generate signals necessary for the touch signal operation in synchronism with one of the two detected voltage signals.

In the case that duration of the common voltage is too long, the time required for the touch signal operation may be consumed a plurality of times in some cases. For example, duration of the common voltage is 100 µs, and the time required the touch operation is 40 µs. In such cases, a plurality of times of touch operations are performed in a common voltage, and thus the report time taken for reporting the touch coordinates to a set can be even faster, which will be a unit for making a reaction rate faster. Likewise, a unit for determining whether a single touch signal operation for a plurality of common voltages will be performed or whether a plurality of times of touch signal operations within a period of a common voltage will be performed, should be provided in the TDI 30, which may be implemented as registers or memory.

By the above configuration, timing of the effective touch detection operation may be determined on the basis of duration of the common voltage and the time necessary for the touch operation.

The voltages due to the D/B that is induced during detection of the rising edge or the falling edge of the common voltage are expressed as Equations 7 and 8, and these signals affect the voltages detected by the driving voltages that are expressed as Equations 1 and 2, and are applied to the driving capacitor. Accordingly, the voltage due to the D/B phenomenon that is the touch signal should be detected while avoiding a point in time where the rising edge or the falling edge of the common voltage occurs.

The distortion of the voltage by Equation 7 or 8 using the common voltage at the state where the detection has been completed by using Equation 1 or 2, the "Vpre_com" term in Equation 7 or 8 becomes ΔVsensor that is a voltage detected in Equation 1 or 2. That is, when the common voltage alternates after the voltage has been detected according to Equation 1 or 2 representing the D/B voltage detection method using the driving capacitor (the point P is still in the Hi-z state), the voltage by Equation 7 or 8 is detected. Here, the "Vpre_com" term of Equation 7 or 8 means the voltage detected by Equation 1 or 2. This embodiment has been described in the embodiment of the areas ⑧ and ⑨ of FIG. 16. Accordingly, in order to prevent distortion of the touch signal that may occur at the rising edge or the falling edge of the common voltage, or that may occur due to noise occurring in the common voltage, the touch signal should be detected while avoiding an inflection point at which the size of the signal changes.

FIG. 22 is a waveform diagram illustrating a method of detecting the touch signal in synchronization with the detected common voltage according to an embodiment of the present invention. Referring to FIG. 22, the "detected common voltage" is a common voltage detected by the common voltage detector 15 in the embodiment of FIG. 17. In FIG. 22, "Vg" is a voltage applied to the ON/OFF control terminal of the charging unit 12 in the embodiment of FIG. 11, in which a switching device that is used as the charging unit 12 in a high state, is turned on, and the switching device that is used as the charging unit 12 in a low state is turned off. In FIG. 22, "Sel_pretime" determines the high section time of Vg. In FIG. 22, "Vdrv" is a driving voltage applied to the driving capacitor (Cdrv) of FIG. 11. The time at which Vdrv becomes high in synchronization with the falling edge of Vg is defined as "sel_drvdly."

In FIG. 22, the time t1 of the high section of the detected common voltage and the time t2 of the low section of the detected common voltage are different from each other, but both t1 and t2 may be same or t2 may be longer than t1.

In FIG. 22, an area 1 is an area for detecting the touch signal at the rising edge of the common voltage and an area 2 is an area for detecting the touch signal at the falling edge of the common voltage. Here, the touch is detected while avoiding the edge portions of the common voltage detected in the area 1 or 2. In order to detect the touch, the charge unit 12 is first turned on, and thus the charging voltage is supplied to all capacitors connected to the point P of FIG. 11, to thus charge the capacitors. Although it will be described later, several dozens of to several hundreds of touch pads 10 are connected with the TDI via the sensor signal wires 22 on the touch screen panel 50. Accordingly, as the length of the sensor signal wires 22 becomes longer, the resistance is increased. Thus, the charging time may vary depending upon the positions of the touch pads 10 which are located on the touch screen panel 50. Thus, "sel_pretime" of FIG. 22 for determining the charging time the charging unit 12, should be variable, which has a unit for varying the charging time in the inside the TDI. For example, "sel_pretime" is a value that can be selected within a range from 1 ns to 1000 ms, which is determined by the internal register in the inside of the TDI.

In one embodiment, 10 µs may be assigned in the '01' register and 100 ms may be assigned in the '0A' register. This is one embodiment of assigning the registers. A variety of charging times are assigned into more registers on a one-to-one correspondence basis.

According to the embodiment described above, the charging time may be variably determined on the basis of the distance between the touch pads formed in a matrix form and the TDI 30, and thus it is possible to detect the touch accurately.

When the charging voltage is applied in the area 1 or 2, it is preferable that the charging voltage should be applied while avoiding the rising edge or falling edge of the common voltage that is a voltage transform portion of the common voltage. This is because it is preferable that the charging voltage should be applied after a predetermined time since the common voltage is detected, in order to provide a method of avoiding noise that can be applied to a voltage inflection portion and can last to a degree in the case that a common voltage is actually detected in industrial applications, although there is no noise ideally in the common voltage detected in the embodiment of FIG. 22, FIG. 23 is a waveform diagram illustrating an example of an actually detected common voltage. Since the initial parts of the rising edge and falling edge of the common voltage are not linear, distortion occurs in the touch signal in the case that the touch signal is detected in non-linear sections of the rising edge and falling edge of the common voltage. Thus, in order to avoid such non-linear sections, the charging voltage is applied to thus detect the touch signal after a specified time of "sen_hi_dly" or "sen_lo_dly" has elapsed. "Sen_hi_dly" is a delay point in time that is synchronized with a point in time at which the common voltage higher than the URL is detected and "sen_lo_dly" is a delay point in time that is synchronized with a point in time at which the common voltage lower than the LRL is detected.

Here, the time for turning-on the charging voltage may be given in a portion of the non-linear section of the common voltage. This is because fluctuation of the voltage due to D/B phenomenon by the alternating common voltage does not occur if the charging is made in the non-linear section of the common voltage, and fluctuation of the voltage due to the common voltage does not occur if the linear section of the common voltage is output at the point in time when the charging has been completed.

Referring back to FIG. 23, duration of the non-linear section at the high section of the common voltage and duration of the non-linear section at the low section of the common voltage differ from each other. In order to avoid non-linear sections differing from each other in the high and low sections of the common voltage, it is necessary to make setting of "sen_hi_dly" that is the time to avoid the high section and setting of "sen_lo_dly" that is the time to avoid the low section differ from each other. The TDI 30 has a unit for setting two pieces of the time and, in one embodiment, may be determined by means of such registers within the TDI.

Referring again to FIG. 22, a signal for detecting a touch signal in synchronization with the falling edge of the common voltage is generated in an area 2. When the common voltage is changed from high to low, the time to avoid the low section is delayed for a certain time and is expressed by "sen_lo_dly." Meanwhile, the driving voltage "Vdrv" in FIG. 22 is changed from low to high in synchronization with the point in time at which the charging unit 12 is turned off after the potential of the point P of FIG. 11 is formed into the charging voltage since the charging unit 12 is turned on. The process of detecting the touch signal by using Equation 1 or 2 by the change of the state is the same as described above.

In an embodiment of the present invention, the case of detecting the voltage variation occurring when Vdrv is changed from low to high has been described as an example. This is only one embodiment, and alternatively a touch signal can be detected even when Vdrv is changed from high to low. In addition, a synchronization point in time at which the level of Vdrv is changed may be the common voltage, or a point in time of turning on the charging unit 12.

In FIG. 22, if the time for applying Vdrv becomes longer after the completion of charging, noise may be input during waiting the input of Vdrv, to thus change the potential of the point P in FIG. 11. To circumvent this, it is necessary to quickly apply the driving voltage (Vdrv), but Vdrv should be applied after the switching device used in the charging unit 12 has been completely turned off, and thus the time at which Vdrv is applied is made to be variable to thereby find out an appropriate time for tests. Thus, the TDI 30 has a unit for varying a time at which Vdrv is applied. In one embodiment, the Vdrv applying time may be selected in a range of 1 ns to 100 ms in synchronization with the change in the voltage level of Vg when the charging unit is turned off by the change in the voltage level of Vg that is the control voltage input to the ON/OFF control terminal of the charging unit 12. A register can be used as an example of a unit for the Vdrv applying time, in which the first value of the register is 1 ns and the last value thereof is 100 ms.

In addition, as described above, the point in time at which Vdrv is applied may be synchronized with the high or low of Vg, but may also be the transform portion of the common voltage, and Vdrv may be also applied by a timer of the TDI or an interrupt.

When the driving voltage (Vdrv) is applied, the voltage du to the D/B is formed and is detected by the touch detector 14. Here, as described above, the resistance values of the sensor signal wires 22 vary by the position of the touch screen panel 50, and thus the time at which the voltage due to the D/B when Vdrv is applied is formed appears differently according to the resistance value formed by the sensor signal wires 22. For example, the touch pad 10 that is located the farthest away from the TDI has a resistance value of several hundreds of Kohm and the touch pad 10 adjacent to the TDI has a resistance value of several tens of Kohm. This is because the resistance value of several hundreds of Kohm is derived by calculation, when the sensor signal wires 22 of the line width of about 50 jan are formed at a distance by 9 cm, that is, the farthest away from the touch screen panel 50 that is used in the seven-inch class display device, since the touch pad 10 includes a transparent conductor such as ITO or IZO, or CNT and the sheet resistance is approximately several hundred ohms or so, which will be described later. As described above, since the point in time at which the change in voltage due to the D/B by resistance of the touch pad 10 and the capacitor formed in the sensor signal wires 22 is completed varies, the point in time at which the voltage is detected since Vdrv is applied should be variable. Thus, the TDI has a unit for varying the time at which the voltage is detected since Vdrv is applied.

"Start Detection" of FIG. 22 is illustrative of such a voltage detection point in time, and has a variable width of around from 1 ns to 100 ms in synchronism with an inflection portion of the common voltage or Vg. Varying can be done by using registers in which a plurality of times are mapped to a plurality of registers on a one-to-one correspondence basis.

Meanwhile, referring to Equation 1 or 2, the voltage detected by the D/B is in proportion to Vh-Vl, which is the voltage fluctuation width of Vdrv. The voltage detected when Vdrv is changed from 0 V to 2.5 V falls down to a 50% level, in comparison with the voltage detected when Vdrv is changed from 0 V to 5 V. Therefore, it is possible to adjust the size of the detection voltage by the D/B by properly adjusting the voltage amplitude of Vdrv. This action can be achieved by a power supply contained in the TDI 30 or an external power supply that is provided from the outside of the TDI 30. When using the internal power supply contained in the TDI 30, the size of Vdrv is changed by changing the set values of the registers contained in the TDI.

FIG. 24 is a table diagram illustrating an embodiment for changing the size of Vdrv according to the setting of the registers contained in the TDI. Referring to FIG. 24, when selecting the 00h address of the register, the voltage of Vdrv becomes 2 V and when selecting the 07h address of the register, the voltage of Vdrv becomes 16 V.

As described above, the touch detecting device according to an embodiment of the present invention may vary the driving voltage (Vdrv), and may adjust the size of the detection voltage associated with the touch sensitivity.

FIG. 25 is a circuit diagram illustrating a touch screen panel according to an embodiment of the present invention. FIG. 25 shows an embodiment applying the touch detecting device of FIG. 10 or 11, in which touch pads 10 are arranged in a dot matrix form.

The configuration of the TDI 30 is illustrated at the bottom of FIG. 25. The TDI 30 includes a driving unit 31, a touch detector 14, a timing controller 33, a signal processor 35, a memory unit 28, a common voltage detector 15, a power supply 47, and a communication unit 46, and may further include a CPU 40. The CPU 40 is a microprocessor having an arithmetic function and may be located outside of the TDI 30.

The touch pads 10 and the sensor signal wires 22 are patterned and formed on the touch screen panel 50. The touch pad 10 is made of a transparent conductor such as ITO, IZO, or CNT (Carbon Nano Tube), and formed of a square, circle, triangle, star-shaped, or fractal configuration, but is not limited thereto. The touch pads 10 and the sensor signal wires 22 are formed of an identical material, that is, when the touch pads 10 are formed of ITO, the sensor signal wires 22 are also formed of ITO. This enables the touch pads 10 and the sensor signal wires 22 to be patterned on one piece of a mask, and enables the touch screen panel 50 according to the present invention to be fabricated into a single layer with a single piece of a mask.

The touch screen panel 50 according to the present invention using the single layer does not make the touch pads 10 or the sensor signal wires 22 pass across the upper or lower side of the other touch pads 10 or the sensor signal wires 22, to thereby reduce the thickness of the touch screen panel 50, improve the transmittance, and improve yield, and to thus provide a cost savings effect.

FIGS. 26A through 26C show various configurations of the touch pads 10 in accordance with the embodiments of the present invention. Referring to FIGS. 26A through 26C, FIG. 26A shows a pattern of triangles facing each other, FIG. 26B shows a pattern of arrows matched to each other in shape, and FIG. 26C shows a pattern of crescent or half moon shapes matched to each other in shape. These shapes enable the coordinates of the touch to be extracted by using the relationship of the areas of the touch pads 10*c* and 10*d* when a plurality of the touch pads that are formed in oblique lines of FIG. 26A face each other.

For example, when a touch unit is located in the center of a square formed by the touch pads 10*c* and 10*d*, information of the area obtained by the touch pad 10*c* is same as that obtained by the touch pad 10*d*, and thus it can be seen that the touch unit is located at the center of the square. In addition, when the touch unit occupies 20% of the area of the touch pad 10*c* and 80% of the area of the touch pad 10*d*, it can be seen that the touch unit is located at the upper portion of the square, and is located below about 20% from the upper portion of the square. Thus, as shown in FIGS. 26B and 26C, in the case that the touch unit contacts the plurality of touch pads 10 adjacent to the touch unit, it is possible to detect the position of the touch unit with an area ratio each other. Combinations of the touch pads 10 having a cross-correlation as illustrated in FIGS. 26A through 26C are only examples, and may be implemented in various forms, such as a star-shaped or leaf-shaped configuration.

FIG. 27 shows an example of a touch screen panel 50 is illustrated in FIG. 5 of Korean Patent Laid-open Publication No. 10-2010-0021112 according to the prior art in contrast to the embodiment of the present invention. The example of FIG. 27 corresponds to the FIG. 26A embodiment of the present invention, in which according to the technique of FIG. 27, the sensor signal wires 22 do not pass along the left and right sides of the touch pads (522, 524, 526, and 528 of FIG. 27 and 10*c* and 10*d* of FIG. 26A) but the sensor signal wires 540 are wired only on the top and bottom of the touch screen panel, differently from the FIG. 26A embodiment of the sensor signal wires 22 passing along the left and right sides of the touch pads. This technique narrows the width of the left and right sides of the touch pads (522, 524, 526, and 528 of FIG. 27 and 10c and 10d of FIG. 26A) to enable accurate detection of the touch coordinates but to limit a number of the touch pads. On the other hand, if the touch detection sensitivity is good, as shown in FIG. 26A, the sensor signal wires 22 are wired along the left or right sides of the touch pads 10. Although the gap between the touch pads is widened, the touch signal can be detected, and since a more number of touch pads can be also laid in comparison with the embodiment of FIG. 27, the touch coordinates can be detected more precisely.

FIG. 28 shows the prior art compared with the other prior art, and is a schematic view showing a conventional wiring diagram of sensor signal wires 22 that are arranged on top and bottom of touch pads 10. Referring to FIG. 28, the sensor signal wires 22 of FIG. 28 are arranged at the upper and lower sides of the touch pads 10, in which the left-side sensor signal wires 22 are gathered on the left side of the touch screen panel and the right-side sensor signal wires 22 are gathered on the right side of the touch screen panel 50. This connection method has drawbacks of degrading marketability of products since the signal wires gathered at the left and right of the touch screen panel 50 are increased and thus the left and right areas of the touch screen panel 50 are widened. In contrast, since the sensor signal wires 22 are not integrated in the left and right of the touch screen panel 50, in the embodiment of FIG. 25, the left and right areas of the touch screen panel 50 is narrowed, and thus the touch screen panel 50 can be formed of a narrow bezel type, to thus increase marketability.

On the other hand, in the case of the technique of FIG. 28, the signal wires originating from the touch pad located on the top of the layout are connected with the TDI 30, and thus length of the wires becomes longer considerably, to thus increase the resistance. Accordingly, it is impossible to make the touch pads 10 and the sensor signal wires 22 formed of a transparent conductor such as ITO. Thus, the sensor signal wires 22 disposed along the left or right of the touch screen panel 50 are formed of a metal-based material such as copper (Cu) or silver (Ag). This means that a further process separated from a process of patterning the touch pads 10 should be used, to thereby cause a production cost to rise and the yield to be decreased.

Referring back to FIG. 25, as shown in the embodiment of FIG. 11, the driving unit 31 has the charging unit 12 and the driving capacitor (Cdrv). Also, a common voltage detection circuit shown in FIG. 17 or 19 is present in the driving unit 31. Referring to Equation 1 or 2, since a difference in the size of the voltage detected by the size of Cdrv occurs, a unit for changing the size of Cdrv should be provided in the inside of the TDI. As Cdrv becomes large, the size of the detection voltage becomes large, which means that the detection sensitivity is good. However, if Cdrv becomes too large, the volume of the TDI is increased, which is a factor of causing a rise in price of the TDI. Cdrv should be designed to have an appropriate size. In order to adjust the size of Cdrv, registers for adjusting the size of Cdrv are provided in the inside of the TDI. Each register has a plurality of addresses, in which respectively different Cdrv values are mapped to the respective addresses. Cdrv corresponding to the selected register values is connected to the touch signal detection circuit included in the touch detector 14.

In the embodiment of FIG. 25, the touch pads 10 consist of 35 units of touch pads of 5 (width)×7 (length), in which the touch pads 10 are located on top of the A/A area of the display device, and the A/A area is divided into 35 touch areas. This is just one example. 100 or more touch pads 10 may be mounted on the actual touch screen panel 50. If the touch detector 14 shown in FIG. 14 which corresponds to the so-may touch pads 10 on a one-to-one basis is present in the driving unit 31 of the TDI 30, the area of the TDI is widened to thereby cause a factor of raising the prices. Therefore, a small type of the touch detector 14 is provided in the driving unit 31, and the touch pads 10 are multiplexed in a time division manner to thus detect the touch signal.

For example, a touch detector 14 shown in FIG. 11 is provided in the driving unit 31. The touch pads 10 are multiplexed in sequence one by one and are connected to the charging unit 12, the touch detector 14, and the touch signal detection circuit connected with the capacitors connected with the charging unit 12 and the touch detector 14. That is, the touch signal detection circuit is one, but the number of the touch pads 10 is 35, and so a multiplexer having 35 inputs and selecting one of the 35 inputs to then connect the selected one input to the detection circuit should be designed.

In another embodiment, a driving unit 31 is provided with a plurality of touch signal touch detectors 14. However, the plurality of touch signal touch detectors 14 includes the number of the touch detectors less than the number of the touch pads 10. In the embodiment in FIG. 25, five or seven touch detectors 14 are provided. In the case of the five touch detectors 14, the five touch detectors 14 correspond to five laterally arranged touch pads 10 on a one-to-one correspondence basis, to thus simultaneously detect touch signals from the five touch pads 10. Therefore, it is possible to detect the touch signals from the 35 touch pads 10 by seven-times scanning operations. In addition, if the seven touch detectors 14 are used, it is possible to detect the touch signals from the longitudinally partitioned seven touch pads 10 for one-time scan, and thus it is possible to detect the touch signals from the 35 touch pads 10 for five-times longitudinal scanning operations.

The touch pads 10 are used for detecting the touch signals but are used for detecting the common voltages. For example, in FIG. 25, the first touch pad (hatched in FIG. 25) of the sixth line in the transverse direction, is connected to the common voltage detector to detect the common voltage, since the first touch pad of the sixth line is not still a sequence of detecting the touch signal when the touch pads 10 included in the first line to the fifth line detect the touch signals. When the first touch pad of the sixth line becomes a sequence of detecting the touch signal since the touch detection has been completed up to the fifth line, the touch pad 10 with which the touch detection has been already completed or the touch pad 10 with which the touch detection has not been completed yet is used as the touch pad that detects the common voltage. A signal processor 35 controls the multiplexer (MUX) of the driving unit to determine whether the touch pad 10 is connected to the touch detector shown in FIG. 11 or the common voltage detector shown in FIG. 17, and to thus transfer necessary control signals to the driving unit 31. The driving unit 31 makes the touch pad 10 connected to the touch detector or the common voltage detector according to on the signal received from the signal processor 35. Here, one or a plurality of common voltage detectors are used to detect the common voltage, in which a plurality of respectively different touch pads 10 are connected to the plurality of common voltage detectors.

It is desirable to lower the resistance of the sensor signal wires 22 originated from the touch pads 10 and connected to the TDI 30 as low as possible. For this purpose, as shown in FIG. 25, the sensor signal wire 22 is connected to the corner of the 5 o'clock position of each touch pad 10 so that a connection path between the touch pad 10 and the TDI may be the shortest distance. The 5 o'clock position of the touch pad 10 provides a path of minimizing the connection path between the touch pad 10 and the TDI. In the configuration of the touch pad 10 as shown in FIG. 25, when the TDI 30 is located on the upper side of the layout, the sensor signal wires 22 will be originated from near the corner part located in the 11 or 5 o'clock position of the touch pad 10 and will be connected to the TDI 30.

Further, as the touch pad 10 is the farther away from the TDI 30, the resistance by the sensor signal wires 22 and the parasitic capacitance detected by the sensor signal wires 22 become large. Accordingly, as the distance becomes farther, the line widths of the sensor signal wires 22 are widened, to reduce the size of resistance and the gaps between the sensor signal wires 22 are widened, to reduce Cp. That is, according to one embodiment of the present invention, the widths between the sensor signal wires 22 are differently set on the basis of the distance between the touch pads 10 and the TDI 30, to thereby prevent degradation of the touch detection according to the positions of the touch pads 10.

As described above with reference to FIG. 11, the touch detector 14 detects the voltage due to the D/B and amplifies the detected voltage to then output the amplified result to the ADC converter 14-5 (hereinafter, shortly named as ADC). One or a plurality of ADCs 14-5 may be included and used in the touch detector 14. As more ADCs 14-5 are used, it may be advantageous to shorten the time that is taken to convert the detected analog signals into digital signals. However, as the number of ADCs 14-5 is increased, the current consumption increases, and the area of the TDI 30 is increased, to thereby cause the cost to rise. Thus, an appropriate number of ADCs should be selected considering a report time to a set. The DAC 14-3 is also included in the touch detector 14. The DAC 14-3 plays a role of calibrating the voltage that is used as a reference signal applied to a differential amplifier for the configuration of the differential amplifier that will be described later, and that is detected in each of the touch pads 10.

The timing controller 33 plays a role of generating a plurality of different clock signals required by the TDI. For example, the clock is required in order to operate the CPU 40 of FIG. 25, or the clock is also required in order to operate the ADC or sequentially operate the multiplexer in the driving unit 31. As described above, there are a number of types of clock required for each function, and the timing controller 33 generates and provides a plurality of various types of clock.

Since the common voltage detector 15 has been previously described, the detailed description thereof will be omitted.

Referring back to FIG. 25, the signal processor 35 transfers the ADC value generated from the touch detector 14 to the CPU 40, or transfers the ADC value to the outside of the TDI 30 through the I2C or SPI signal wire by controlling the communication unit 46, or generates and supplies signals required by all internal functional devices or blocks such as the signal processor 35 and the driving unit in the inside of the TDI 30. The functional devices or blocks refer to respective functions that are shown in FIG. 25. For example, there are nine (9) functional devices or blocks inside the TDI in which the CPU 40 is one of them. The signal processor 35 stores the ADC value generated from the touch detector 14 in the memory unit 28 and performs the required operations. For example, the signal processor 35 may calculate a touch area due to a touch operation between the touch pad 10 and the contact unit with reference to the ADC value generated by the touch detector 14, and also calculate the coordinate of the touch by using the ADC value or the calculated area value. Referring to FIG. 14B, the touch is detected from the fifteen touch pads 10 by the finger 25, and the opposite area with respect to the finger for each touch pad 10 is generated. Here, since the touch coordinate is the center of gravity of the area formed by the fifteen touch pads, the area and the touch coordinate have different concepts.

The memory unit 28 includes a flash memory, E2PROM, SRAM, DRAM, or the like. The result values of fac.cal or register values, or programs necessary to operate the CPU 40 are stored in the flash memory or E2PROM. In FIG. 25, a set of the touch pads 10 that are arranged in a pattern of a 5×7 array is defined as a frame, and thus a memory including detection voltage values of the touch pads 10 included in a single frame may be called a frame memory. In order to sense the frame a number of times, and detect the touch signal by using the average of these or a filter, a plurality of frame memories are needed. When the touch signal is detected by using a 10-bit, 12-bit, or 14-bit ADC, the higher resolution of the ADC may be, the more size of the frame memory is increased. Accordingly, if an increment (that is a difference between the first value and the second value) is stored on the basis of the data that is initially detected and stored in the first frame memory, it will help to reduce the size of the memory.

On the other hand, the memory unit 28 may require a line memory. For example, in the embodiment of FIG. 25, in the case that the transversely partitioned five touch pads 10 or the longitudinally partitioned seven touch pads 10 are detected at the same time, the line memory capable of storing five or seven touch signals is required. In order to attempt to obtain an average or use a filter by using touch data detected by scanning the lines a plurality of times, a plurality of line memories are required. Since such a line memory is smaller than a frame memory in view of capacity, it is more efficient for reducing the size of the memory, to use a line memory other than a frame memory.

The CPU 40 overlaps with the signal processor 35 with a lot of features. Therefore, the CPU 40 may not be included in the TDI 30 or may be positioned outside of the TDI 30. In the case the CPU 40 and the signal processor 35 are concurrently used, it may be designed so that one of them may not be used.

The CPU may play a role of performing the most part of the signal processor 35, and for example may extract the touch coordinate, perform gestures such as zoom, rotation, move, or the like, or perform various functions. The functions may include "palm rejection" or a smart grip described in FIG. 15. Furthermore, a zooming signal is generated or the strength of the touch input is calculated, by calculating an area of the touch input. In the case that a GUI object such as a keypad is touched at the same time, data is processed in various forms in a manner that user's desired (e.g., the more detected area) GUI object is recognized as only valid input, the processed data may be used in the TDI 30 or may be transmitted to the outside via a communication cable.

A program for controlling the CPU 40 is installed in the memory unit 28, and can be replaced with a new program in the event of modifications. The new program is run by using a communication bus included in the communication unit 46, e.g., by using serial communications such as I2C, SPI, USB, or by using parallel communications such as CPU Interface (hereinafter I/F). The CPU 40 calls a plurality of the signal detection values that stored in the line memory or the frame memory, to thus obtain an average value, or to extract a stable value by using a filter. The values stored in the memory are the ADC values or and the area values.

The communication unit 46 externally outputs the necessary information to the outside of the TDI 30 or inputs the information provided from the outside of the TDI into the inside of the TDI 30. The serial communications such as I2C or SPI or the parallel communications such as parallel I/F of CPU Interface is used for the communication unit.

As shown in FIGS. 10 and 11, the voltage at the point P is converted into the ADC value in the ADC converter 14-3 of the touch detector 14. Before being converted into ADC value in the ADC converter 14-3, it is preferred that the voltage at the point P be amplified in the amplifier 14-2.

Various forms of amplifiers such as an inverting amplifier, non-inverting amplifier, a differential amplifier, or an instrument amplifier may be used as the amplifier. Referring to Equation 1 or 2, a meaning of detecting the touch signal is a meaning of detecting a difference between a result that is obtained by Equation 2 when Ct is added in the denominator of Equation 2, and a result that is obtained by Equation 1 when Ct does not exist in the denominator of Equation 1. For example, it is assumed that Equation 1 is a constant value, and this value is 4 V. Since Ct is added in the denominator of Equation 2, the value of Equation 2 may not be greater than 4 V, and is always lower than or equal to 4 V. A differential amplifier may be used in order to detect a minor difference by Equations 1 and 2 due to the difference in Ct. FIG. 29 is a circuit diagram showing a differential amplifier that is used in an embodiment of the present invention. As described above, a variety of amplifiers may be used as the differential amplifier of FIG. 29 according to an embodiment of the present invention.

Referring to FIG. 29, the differential amplifier has two input terminals, in which Vp and Vref are input to each input terminal. Vp is the potential at the point P in FIG. 11 and Vref is the reference voltage. The differential amplifier can set an amplification gain (hereinafter, called a gain) by using resistors and capacitors, and the output voltage of the differential amplifier is determined according to the Equation shown on the right side in FIG. 29. The differential amplifier of FIG. 29 does not indicate only one device, but functionally indicates the differential amplifier. Therefore, as shown in FIG. 29, a plurality of amplifiers may be used in the inside of the differential amplifier, and these amplifiers are connected in series to one another or connected in parallel with each other. In addition, Vp and Vref may be connected to the input of another amplifier contained in the differential amplifier of FIG. 29.

In addition, although it is not shown in FIG. 29, another signal or another reference voltage Vref may be applied to the differential amplifier. In addition, the gain may be also set in a single amplifier, or a plurality of amplifiers. For example, in the case that the gain is 12, the gain of a signal is set to 12 when the signal passes through the amplifier whose gain is 12. When a signal having passed through the amplifier whose gain is 4 passes through the amplifier whose gain is 3, it is possible to form the gain of 12. In addition, when a signal passes through the amplifier whose gain is 2 two times and then passes through the amplifier whose gain is 3 once more, a total gain becomes 12.

According to an embodiment of the present invention, it is preferable that the gain of the differential amplifier have a variety of multiples of gains. This is because, since the magnitude of the voltage detected by Equation 1 or 2 varies depending on the area of the touch pad 10 and the structure of the touch screen panel 50, the detected voltage should be amplified as large as possible if the magnitude of the detected voltage is too small, and the detected voltage should be amplified as small as possible if the magnitude of the detected voltage is too large. Thus, it is preferable that the TDI 30 have a unit for setting the gain. A gain setting may be set in the register or memory unit 28, and the gain setting may be changed by changing the circuit with reference to the set value or carrying out a control for changing the circuit.

In FIG. 29, Vp is connected to the differential amplifier through the buffer 14-1 or directly coupled to the differential amplifier.

Vref is generated in the power supply 47. In FIG. 29, in the case of Vout that outputs the positive (or plus) polarity, if polarities of Vp and Vref that are connected to the input of the differential amplifier are reversed, in contrast to the polarities of Vp and Vref that are connected to the input of the differential amplifier, the negative (or minus) voltage is output as the output of the differential amplifier. In the case that the TDI uses only a positive voltage, the negative output is not generated as Vout when the output of the differential amplifier is the negative (or minus) voltage, to thus cause a detection error. Therefore, it is necessary to take necessary steps of preventing detection errors, which will be described later.

Referring to the Equation of FIG. 29 and Equations 1 and 2, in the case that Vdrv varies from low to high and is applied to Cdrv, the magnitude of the voltage detected by Equation 1 is equal to or greater than the voltage detected by Equation 2. In one embodiment, assuming that the resulting value of Equation 1 is 4 V, and the resulting value of Equation 2 is 3.8 V, the difference between the resulting values of Equations 1 and 2 is 0.2 V. Therefore, if Vref is set to 4 V, and the gain is set to 10, Vout of FIG. 29 is 0 V such that Vout=$\{10*(4-4)\}$=0, when Vp follows Equation 1 (i.e., when the touch does not occur), while Vout of FIG. 29 is 2 V such that Vout=$\{10*(4-3.8)\}$=2, when Vp follows Equation 2 (i.e., when the touch occurs). Thus, it is possible to extract only the difference between Equations 1 and 2 in the differential amplifier according to the size of Vref. Here, the reference voltage (Vref) is set to the same value as 4 V that is the result of Equation 1, or is set to be larger or smaller by a predetermined amount based on the results of Equation 1. For example, Vref is preferably larger or smaller by 1 V or so than the resulting value of Equation 1.

On the other hand, the device used in the differential amplifier of FIG. 29 is mostly an OPAMP. Thus, in the case that single power having a positive polarity is used in the OPAMP, 0 V (zero volt) is used as the ground potential. Assuming that Vout is 0V in this environment, a voltage higher than 0 V is output when 0 V should be output to thus cause a signal detection error, in the case that the OPAMP is not a rail-to-rail type. In order to solve this problem, it is desirable that the ground potential used in the OPAMP is a potential higher than 0 V.

In one embodiment of the ground potential, the voltage that is ½ of the bias power of the OPAMP is preferably formed as the ground potential. For example, a 5 V power supply is used as the bias power of the OPAMP, the ground potential of the OPAMP will be 2.5 V. In this environment, a meaning that Vout becomes the ground potential is a meaning that the output of Vout is 2.5 V. Since the output of Vout is higher than 0 V, a signal is properly output even if the ground potential is output.

It is preferable that Vref should be equal to or larger than the detection value by Equation 1 depicting the detection voltage when the touch does not occur. This is because distortion of a signal occurs since, when Vref is smaller than Vp, a negative voltage should be output as Vout, and when the TDI 30 uses only positive power, a negative voltage is not output as Vout, referring to the equation on the right side of FIG. 29. Vref should be at least equal to or greater than the voltage detected by Vp when the touch does not occur, and the size of Vref varies depending on the size of the touch pad 10 or the structure of the touch screen panel 50. Thus, it is preferable to set the size of Vref by the program or registers by using the DAC, rather than using a plurality of fixed voltages. However, if the DAC may not be used, a plurality of reference voltages are generated to then be connected to the differential amplifier.

Another reason why the DAC that can produce precisely various sizes of the voltages, or a plurality of reference voltages are used in the differential amplifier is as follows. Referring to FIG. 25, the other sensor signal wires 22 or the touch pads 10 are present at the right and left sides of a sensor signal wire 22. With this structure, capacitance is formed by the equation of FIG. 7 between the sensor signal wires 22 or between the sensor signal wires 22 and the touch pads 10. According to the equation of FIG. 7, the longer the distance between two electrodes that mutually oppose may be, the higher the capacitance may be. In addition, in the case that the sensor signal wires 22 and the touch pads 10 are mutually adjacent to each other, the more the sensor signal wires 22 adjacent to the touch pad 10, the larger the capacitance. In addition, capacitance will be generated even at portions where the sensor signal wires 22 are connected with the TDI 30, which will be variable depending on the materials used in the connection, the process conditions, and the connection area. Further, the sensor signal wires 22 in the inside of the TDI 30 may cause capacitances due to the interference with the signal wires that are disposed in the vertical and horizontal directions during a layout processing. All of these capacitances are parasitic capacitors that are inevitably formed during a manufacturing process of the touch screen panel 50 or the TDI 30, and are depicted as Cp in Equation 1 or 2.

These parasitic capacitors Cp vary depending on the sensor signal wires 22 or the process conditions, or the layout in the inside of the TDI 30. As a result, it may be modeled that different sizes of parasitic capacitors exist in the respective touch pads 10 of FIG. 25. According to this modeling, the detection voltage described by Equation 1 or 2 or Equation 7 or 8 is different for each touch pad 10, and Vout output by the calculation equation of FIG. 29 is different for each touch pad 10.

As described above, a meaning of detecting the touch signal is a meaning of obtaining a difference between voltages defined by Equations 1 and 2. As a distribution region where a difference between voltages defined by Equations 1 and 2 exists is wider, the amplifier gain is degraded. For example, assuming that a difference between voltages defined by Equations 1 and 2 is 0.2 V in an ideal condition, and can be amplified up to 2 V by combination of the ADC, the gain can be set to 10 times. However, assuming that a difference between voltages defined by Equations 1 and 2 is present in the distribution region ranging from 0.1 V to 0.4 V, the gain should have 5 since the gain should be inevitably set on the basis of 0.4 V. As a result, in the case of the touch pad 10 having the signal difference of 0.1 V, the amplified value is nothing but 0.5 V and thus sensitivity is poor. Therefore, in order to increase an amplification ratio, a method of adjusting Vref and thus setting the distribution area of Vout narrowly is used. One of easy ways to accomplish this is to adjust Vref of FIG. 29 and make the output voltage of Vout become the ground potential, when the touch does not occur. When Vout is investigated at the state where the touch does not occur, the voltage of Vref should be lowered in the case that Vout is higher than the ground voltage, while the voltage of Vref should be heightened in the case that Vout is lower than the ground voltage. This process is called a correction or calibration.

FIG. 30 is a circuit diagram showing an ADC converter is connected to the output end of the amplifier according to an embodiment of the present invention. A calibration process will be described as follows, with reference to FIG. 30.

First, at the state where no touch occurs, calibration is to be carried out. Conditions under which no touch occurs in the touch screen panel 50 manufactured by the present invention or a product in which the touch screen panel 50 is applied, are guaranteed by a manufacturing or shipping process under the control of a producer. Thus, a calibration process that is performed at a state where a product is not under the condition of use by a user is called a "correction at the factory," "factory calibration," or "fac.cal" in abbreviation. The fac.cal process may be defined as a process of finding a DAC value that is the reference voltage so that the value output from the amplifier of FIG. 30 becomes a certain value by considering a unique Cp of each touch pad 10 in a non-touch state. Cp has a different capacitance for every detected touch pad 10, and thus the DAC value also will vary for each detected touch pad 10. As described above, the calibration is completed for each detected touch pad to have a different DAC value, and an input identical to the different DAC value should be input to the amplifier corresponding to each detected touch pad 10 at a step of detecting the touch signal. The different DAC values should be stored in the non-volatile memory in the memory unit 28, that is, a flash memory and E2PROM, and is called each time the stored DAC values are used. An "expected value" or "target value" in the calibration process, is a value (or "ADC output") output from the ADC converter of FIG. 30, after having completed the calibration. For example, when the expected value is the ground potential of 0 V, the output of the ADC will be zero in the ideal case. Otherwise, in the case that the ADC having a 10-bit resolution is used, and the maximum output voltage of the amplifier 14-2 is pre-defined as 5 V, if an output voltage of the amplifier 14-2 is 2.5 V, the output of the ADC converter 14-3 will be 512 code. Under these assumptions, the output value of the ADC converter such as 50 code may be an excellent target value.

It is undesirable that the target value output from the ADC converter is 0 code. This is because it is difficult to discern whether the output of 0 code is the real 0 code, or whether 0 code is output even with the value less than 0 code, since any value should be applied to the DAC of FIG. 30 in order to begin calibration in the first place, but the output of the ADC is 0 code even at the conditions where the DAC is applied lower than Vp and thus the output of the amplifier is negative. Therefore, the target value that should be output from the ADC converter should be set to be slightly higher than 0 code. For example, the target value is the ADC code that should be a value equal to or greater than 0 and 50, 100, or 200 code becomes a good target value. However, if the target value is set too high, the fluctuation of the ADC code narrows when the touch occurs, and thus the lower target value, the better.

The approximation of the DAC when calibration is completed cannot but be used as the DAC value applied to the amplifier at the time of the first fac.cal process. This approximation of the DAC may be obtained by calculation. Referring to the equation of FIG. 29, in the case that Vp is greater than the DAC value, the output of the amplifier 14-2 should be a negative value. The ADC code corresponding to such a negative value should be also output as a negative value, but in the case that ADC does not output a negative value, the lowest value, 0 (zero) is output. In this case, a unit for confirming whether a 0 (zero) value is a substantially 0 (zero) value, or a value less than 0 (zero) exists is needed. One of these measures is a unit that is called "Under Flag."

The "Under Flag" is a signal that is generated when the ADC output value is 0 (zero). The "Under Flag" is generated in the touch detector 14, the signal processor 35, or the CPU 40. If the "Under Flag" (hereinafter, abbreviated as UDF) occurs, the signal processor 35 or the CPU 40 extracts a voltage higher than the currently applied DAC voltage among a plurality of voltages of the DAC included in the touch detector 14, to thereby connect the amplifier 14-2. However, in the case that UDF continues to be generated, UDF does not occur at a certain point and a target value is output, if a DAC value of a higher voltage.

The fac.cal process to meet the target value will be described as follows. Assuming that the target value is ADC code of 100, the first applied voltage output from the DAC is an estimated value in which 100 may be output as the ADC code, which is applied to the amplifier 14-2. If the DAC output having the initially applied voltage value is DAC(init), the ADC output by DAC(init) is higher or lower than 100 code that is the target value. Otherwise, UDF may occur. If code that is output from ADC is higher than 100 code, the DAC output of the voltage lower than DAC(init) should be applied to the amplifier. If code that is output from ADC is lower than 100 code, the DAC output of the voltage higher than DAC(init) should be applied to the amplifier. Finding new DAC is carried out through a trial and error process, but this may require a lot of time. Thus, applying DAC values derived by calculation one-time can preferably shorten a calibration time.

Referring to FIGS. 29 and 30, ADC9(init) that is the output value of the ADC that has been output by the first DAC(init) and has not been calibrated yet is defined as Equation 10, and ADC(target) that is the target value by DAC(cal) that is the calibrated DAC value is defined as Equation 11.

$$ADC(init) = \text{Gain}(DAC(init) - Vp)) \quad \text{Equation 10}$$

$$ADC(\text{target}) = \text{Gain}(DAC(cal) - Vp)) \quad \text{Equation 11}$$

By the relationship of Equations 10 and 11, DAC(cal) has the following relationship:

$$\frac{ADC(\text{target}) - ADC(init)}{G} = DAC(cal) - DAC(init).$$

Accordingly, the DAC(cal) value for output of the target value is a value that can be calculated by a simple calculation. Thus, instead of finding the target value by a trial and error process, the signal processor 35 or the CPU 40 calculates the DAC value for output of the target value through an operation, and applies the calculated result to the amplifier 14-2, to thereby enable to calibrate touch pad 10 within a short time. On the other hand, assuming that a 10-bit DAC is used and the output voltage ranges from 0 V to 5 V, 0 V is output from the DAC in the case that 0 (zero) code is applied to the DAC; 2.5 V is output from the DAC in the case that 512 code is applied to the DAC; and 5 V is output from the DAC in the case that 1023 code is applied to the DAC. Since the input-output relations of the DAC or ADC can be easily seen by one of ordinary skill in the art, the detailed description thereof will not be given through the detailed signal flow associated with the input-output relations of the DAC or ADC, but will be given by referring to only the output value of the DAC or ADC.

FIG. 31 is a flow chart for implementation of a fac.cal process. Referring to FIG. 31, at the first stage (F30a) of fac.cal, the DAC(init) value is applied to the amplifier. For the operation of DAC(cal) at the stage (F30d), the target value is called from the memory (F30b) and the ADC(init) value is secured (F30c). The DAC(cal) value secured through the operation is stored in non-volatile memory contained in the memory unit 28 (F30e), in which the voltage that is the output value of the DAC(cal) or the input code of the DAC(cal) to generate the DAC(cal) is stored as the stored value. Then, when the touch pads 10 of the touch screen panel 50 of FIG. 25 are scanned on a one by one basis or on a plurality of numbers basis, to thus detect a touch, the voltage that is a unique DAC(cal) value corresponding to an arbitrary touch pad 10 is applied to the amplifier 14-2, together with Vp generated by the arbitrary touch pad 10.

It is desirable that the process of performing fac.cal also follows a scan method for the touch detection of the touch pad 10 formed on the touch screen panel 50 of FIG. 25. That is, if a single touch pad 10 is individually scanned by using the scan method for the touch detection of the touch pad 10, fac.cal is performed on a touch pad 10 at a time, while fac.cal is performed on a plurality of touch pads 10 at a time, for the touch detection of a plurality of the touch pads 10 at a time. This is because the circuit design is complicated, the volume of the TDI 30 is increased, to thereby raise the cost, and the operations of the CPU 40 or signal processor 35 for processing the signals are increased and complicated, since the multiplexer (MUX) used for the touch detection process may not be used but the multiplexer (MUX) with a different sized input and output should be used if the method of scanning the touch pads 10 is changed in the calibration process.

The touch detection device according to one embodiment of the present invention decreases the variation in the detected voltage of the touch that is caused by the position of the touch pad 10 and the characteristic of the parasitic capacitance through fac.cal using the above-mentioned DAC, to thereby provide an accurate touch detection.

After the completion of fac.cal, a product in which the touch screen panel 50 according to the present invention is applied is sold to a user and exposed to a variety of use environments. For example, a change in temperature may also occur and even the time elapses. Due to these environmental changes, characteristics of the touch pads 10 and the TDI 30 formed on the touch screen panel 50 may also vary. For example, the resistance of the sensor signal wires 22 may be changed and the Cp value may be changed, due to the temperature change. In addition, as the time elapses, the protective layer 24 to protect the touch pad 10 is worn out, and then change of d occurs in Equation 3. As a result, the change of sensitivity may also occur. Extracting the touch coordinate or the touch area by considering these changes in real time, is called a real-time calibration (hereinafter, abbreviated as RTC).

In order to calculate the touch area or the touch coordinate, a number of values are stored in the memory unit 28. For example, in order to calculate the touch area or touch coordinate of a certain touch pad, the voltage detected in the touch pad depending on Equation 1, that is, the voltage at the time of a non-touch operation is converted into a digital value in the ADC converter 14-3 to then be stored in the memory unit. Vpre that is the charging voltage is also stored in the memory unit, and values of Vdrv and Cdrv are also stored in the memory. This is because Vpre, Vdrv or Cdrv can be applied in different size for each touch pad. If Cp is too large and thus the touch sensitivity falls in a certain touch pad 10, Vdrv or Cdrv is made to become large, according to Equation 1 or 2, to thereby increase the voltage detected due to the D/B and to thus improve the sensitivity.

If these values written in the memory unit are used in real time without any calibration, errors can occur at the time of the touch detection. For example, the voltage detected at the time of the non-touch operation is a voltage that is actually detected theoretically in accordance with Equation 1. The analog voltage output from the amplifier 14-2 is converted into a digital value in the ADC converter 14-3. A difference between the digital value and the ADC value detected in accordance with Equation 2 at the time of a touch operation, is detected, to thus extract the touch area and the touch coordinate. Here, when the voltage detected in accordance with Equation 1 at the time of the non-touch operation has been stored in the memory unit, and a difference between the stored value and the value detected in real time in accordance with Equation 2 at the time of a touch operation is detected, the signal detected in real time reflects all changes depending upon an environment, but the value stored in the memory unit is a value stored through the fac.cal process at the time of shipment from a factory, which does not reflect the changed characteristics due to the environmental factors to thereby cause the detection error. Accordingly, values that are stored in the memory unit should also reflect the changed characteristics through RTC to then be re-stored.

For this purpose, the memory areas of the memory unit storing the calibrated values 28 is preferably separated into two. In the case that a different type of correction is required other than fac.cal or RTC, the memory areas should be separated into more areas.

First, when considering only fac.cal and RTC, the values detected or calculated through the fac.cal process are stored in one of two separate memory areas, and the values detected or calculated through the RTC process are stored in the other of two separate memory areas. It may be necessary to determine whether to use the fac.cal data or the RTC data in the touch detection process. This is because to use the RTC data in order to reduce the detection errors may cause more serious detection errors than to use the data obtained through the fac.cal process, since data stored in the memory unit through the RTC has a high probability of noise affected values under a noisy environment. In the case that the CPU 40 or the signal processor 35 has a unit capable of detecting the size of such noise, it is possible to determine whether to use the fac.cal data or the RTC data depending on the size of the noise.

The CPU 40 or the signal processor 35 may detect the size of the noise t using the value of the ADC converter 14-3. In the case of sequentially scanning the single touch pad 10 or the touch pads 10 included in the longitudinal or transverse group, and detecting the touch signal, the voltage is not usually detected by the D/B only onc-time, but the voltage is detected a plurality of times and filtered, to thus extract desired data. This technique is intended to remove noise that is included in the detected voltage and extract a more stable signal. If any of the touch pads 10 is scanned about 100 times, and the detected value is stored in the memory each time at every scan, the signal band of the detected signal 100 times will be formed. For example, the signal band may be formed of 2 V to 4 V, or may be formed of 1 V to 5 V. In the case of the two signal bands, the central value is identically 3 V, but the first signal band is 2 V (i.e., 4 V−2 V), and the second signal band is 4V (i.e., 5 V−1 V). Therefore, it can be expected that the touch signal to generate the signal band of 4 V, generates noise greater than the touch signal to generate the signal band of 2 V. By using this technique, since the TDI 30 can determine the size of noise by using the output of the ADC converter 14-3, the TDI 30 may determine whether to use the fac.cal data or the RTC data stored in the memory unit depending on the size of the noise. According to one embodiment of the present invention, data to the memory unit may be differently taken depending on the size of the noise. The TDI 30 may determine which data can be used at a given number of conditions. Such a determination may be conducted by a program in the TDI 30, or may be carried out by the register.

The RTC is preferably performed at a non-touch state. For example, when a user performs a call or other operations by using a mobile phone in which the touch screen panel 50 of the present invention, the RTC is to be carried out at a non-touch state after the call or other operations have been completed. According to the basic idea of the calibration, the DAC value is found when no touch occurs, in which the ADC value is the target value, and the found value is stored in the memory unit, and the DAC value is called and used, when the touch signal of the corresponding touch pad 10 is detected. Therefore, if a calibration is performed when a touch occurs, the touch detection error occurs.

In order to enforce the RTC, it is important to distinguish whether a touch occurs at the point in time when the RTC is in progress. Thus, it is important to first enforce a determination on whether or not a touch occurs.

Then, the following embodiment determines whether or not a touch occurs. At the first point in time at which the RTC is performed, the fac.cal data should be used. The ADC value detected by using the fac.cal data is present between 0 and 1023 code if the ADC has the 10-bit resolution. The CPU 40 or the signal processor 35 calculates the touch area by using the ADC value, in which the touch area is also present within a specific range, like the ADC. Thus, the extracted ADC value or the calculated touch area reacts according to the contact area between the touch pad 10 and the touch unit such as the finger 25, to thus be linearly or non-linearly increased or decreased. In this specification, it is assumed that as the contact area becomes large, the extracted ADC value or the calculated touch area increases linearly. Since the extracted ADC value or the calculated touch area is increased linearly between 0 and 1023 code in proportion to the touch area, the ADC value when a touch does not occur is the above-described "target value" and as the contact area becomes large since the touch occurs, the ADC value or the touch area value increases. Under such circumstances, by setting a threshold value, it is possible to judge whether or not the touch occurs. If it is determined that a touch has occurred when the ADC value or the calculated touch area is over 300, the threshold value is determined as 300. Therefore, if the ADC value or the calculated touch area is detected as 300 or higher, it can be determined that the touch has occurred. When it is determined whether or not a touch occurs, it is more convenient to refer to a group of a plurality of the touch pads 10 that are distributed over a large area adjacent to each other, rather than considering the ADC value or the calculated touch area for one of the touch pads 10. If the touch unit such as the finger 25 is in contact with a plurality of the touch pads 10, the Gaussian curve is formed. The TDI 30 determines the touch has occurred if a normal Gaussian curve is detected. If a Gaussian curve is not detected, it can be determined as a non-touch state. Even though the threshold value is equal to or less than 300, if a Gaussian curve is detected and it is determined that a weak touch has occurred, the RTC process may not be conducted.

The RTC process proceeds in the same process as that of the fac.cal process. A DAC(cal) value for outputting a previously entered target value is extracted and the extracted DAC(cal) value is stored in the memory unit. The extracted DAC(cal) value has its own value for each touch pad 10. The DAC output value corresponding to the touch pad 10 is connected to the amplifier when the touch detection sequence of the corresponding touch pad 10 has come.

The TDI 30 has a unit for determining whether a touch will be detected by using the fac.cal data and whether the touch will be detected by using the RTC data. Such a unit may be usually set as a register, or may be located on the memory unit and the program. If the unit is set as the register, the corresponding bit is set to high or low, to thus take the RTC or fac.cal data. The corresponding bit may be automatically changed, or may be changed by the user, by determining change of the corresponding bit in the TDI 30.

As described above, when a touch has occurred, the RTC process should not be performed, but the region of the detected ADC value or the calculated touch area value may be referred to for determining whether the RTC process proceeds.

FIG. 32 is a diagram illustrating an example of setting regions for real time calibration (RTC) according to an exemplary embodiment of the present invention. Referring to FIG. 32, the peak of a square wave of FIG. 32 is a voltage by the D/B which is detected by Equation 1. This level is a level at the time of no touch, that is, when no touch has occurred. If the voltage at an instant time when Vdrv is changed from low to high when the touch has occurred is applied to Cdrv, the detection voltage due to the touch defined as Equation 2 is formed so as to be lower than the voltage by Equation 1. Accordingly, the detection voltage due to the touch defined as Equation 2 is formed lower than the voltage of the peak of FIG. 32. In the foregoing description, it has been described that it is determined whether a touch has occurred by a threshold value, and the threshold value is set at the boundary between the area 2 and area 3.

Meanwhile, the area 1 and the area 2 are set around the level at the time of no touch. If the Cp value is reduced, according to the environment and the lapse of time, the "level at the time of no touch" will be adjusted upward. Thus, according to the changes of the size of the values included in the denominator and the numerator of Equation 1 or 2, the "level at the time of no touch" will be changed upward or downward.

The "level at the time of no touch" of FIG. 32 is a value set by the result of the fac.cal process, and may be a value that is changed according to the lapse of time. Accordingly, the area 1 and the area 2 that are changed upward or downward based on the "level at the time of no touch" can be considered as a value that is formed when the target value has changed due to the fac.cal process before the RTC process.

Here, the area 1 of FIG. 32 is an area where it is unnecessary to perform the RTC. Typically, there is an item to inspect a touch sensitivity in a manufacturing specification or a shipment performance report for the touch screen panel 50 of the present invention. The touch sensitivity is specified together with tolerance. Thus, the area 1 is in the range of an area where the touch sensitivity is not affected although the fac.cal result value is changed by a predetermined value to thus cause an error.

However, the area 2 is in the range of an area where the touch sensitivity is affected, and the RTC process should be conducted in area 2. As explained earlier, the ADC value or the calculated touch area value changes linearly or non-linearly according to the size of the touch, and thus it is possible to distinguish the area 1 and the area 2 by the operation. The area 2 is an area in which an error occurs upon detection of a touch area if no calibration is performed, and an error range is a region beyond the range of the shipment performance report.

On the following, a signal processing operation of a touch detection method using the D/B phenomenon according to the present invention will be described.

FIG. 33 shows a conventional touch detection circuit.

Since the touch detection signals occurring in the touch detectors in the capacitive TDIs 30 according to the prior art are weak, the touch detection signals are integrated several times and the integrated touch detection signals are amplified again, to then be used for touch detection. FIG. 33 shows an example of a conventional capacitive touch detection circuit, which illustrates "Basic Circuit Model" of QT60xx5B series shown in FIGS. 1 to 5 of Application Note R1.06 regarding QT60xx5B of "QUANTUM" company. Referring to the waveform diagram on bottom right of the right side of FIG. 33, the voltage level of "Amp Out" is elevated in synchronism with the switching of "Xn." That is, whenever the switching of Xn is performed, charges are accumulated in Cs or Ca connected to a "Charge Integrator," and as the amount of accumulation increases, the voltage of Ca or Cs gradually increases in proportion to the charge amount Q by the classical equation formed between the voltage and charge amount Q. Since the voltage level of the voltage due to the charges accumulated is still low, the voltage is amplified in the amplifier "Amp" and the amplified result is output. These signals are shown on bottom right of the right side of FIG. 33. In such a conventional touch signal detection method, since an "X drive" that generates a driving signal should perform a high speed switching a plurality of times in order to detect a touch signal, and a number of times of the switching should increase in order to increase a detection accuracy, the resistance of the sensor signal wires 22 connected to an "X electrode" that is a touch pad in the X-axis direction and a "Y electrode" that is a touch pad in the Y-axis direction should be low. This is because a signal delay occurs due to the action of a resistor connected with the sensor signal wires if the resistance of the sensor signal wires 22 is increased, and thus it is not possible to detect a signal at high speed.

According to the conventional method, the resistance value is limited to an extent of about 20 Kohm. In order to apply the low resistance to the sensor signal wires 22, the sensor signal wires 22 made of a transparent conductive material such as ITO or CNT according to an embodiment of the present invention are not allowed to be used, but the metal-based sensor signal wires 22 made of copper (Cu) or silver (Ag) should be used. The metal-based sensor signal wires 22 made of copper (Cu) or silver (Ag) is non-transmissive and visible. Accordingly, when wirings are made on an active area (A/A) in a display device shown in FIG. 25 according to the embodiment of the present invention, wirings are not performed because of a problem that wirings stick out, and wirings should be wired on non-visible areas (or back matrix; BM) that are the left and right areas of the A/A. This causes the bezel of a product where the touch screen panel 50 is applied to widen, thus causing a problem that the value of the product drops. Another problem with the conventional product, in order to secure the signal, the driving device (that is the "X" drive) should perform the high speed switching, to thereby cause the EMS problem more likely.

Further, as can be seen from the equation formed between the voltage and charge amount, the voltage detected in the conventional case of FIG. 33 is sensitive to the variation of Cs or Ca that is the value of the capacitance of the capacitor C. Therefore, in order to compensate for these issues, that is a problem that calibration should be often performed.

However, referring to FIG. 11 according to the embodiment of the present invention, a signal is detected by performing a switching on a single-time basis according to the present invention, while a signal is detected by performing a switching on a plurality of times basis according to the conventional case. This is because the charge signal should be applied to the touch screen panel 50 according to the present invention each time it is detected whether or not a touch occurs, and accordingly the initial voltage (the charging voltage before the driving voltage is applied) at the point P in FIG. 11 becomes always the potential level of the charging voltage, to thus make it impossible to detect the signal a plurality of times. Further, since the size of the detection voltage can be adjusted in size by using the size of Vdrv or Cdrv, or Vh or Vl as in Equation 1 or 2, it is possible to artificially increase the detection voltage by adjusting the size of Vdrv or Cdrv, or Vh or Vl if the size of the detection voltage is low.

Accordingly, in order to detect a touch signal of the touch screen panel 50, the switching speed of applying Vdrv may be slow, and thus the resistance value the sensor signal wires 22 connected to the touch pad 10 may be high.

If a signal is detected by performing the switching 100 times according to the conventional method, the resistance value of the sensor signal wires 22 may be high 100 times, under the assumption that the sensor signal wires 22 according to the present invention achieve the same touch detection rate as the conventional art case. Also, since the touch is detected by only one-time switching, there are advantages that EMS problems are significantly lowered compared to the conventional art. Also, referring to Equation 1 or 2, capacitors are present in the numerator and denominator thereof, and in the case that a value of Cdrv is significantly larger than the other capacitors, the potential of the point P has no major changes although Cdrv or the values of the capacitors connected to Cdrv may cause a change.

According to another advantage of the present invention, a number of capacitors connected to the point P in FIG. 11 act as the memory unit. For example, since the detected voltage is stored in Cdrv, Cvcom, or Cp even if the sensor signal wires 22 are open after the voltage detection due to the D/B has been completed, the touch signal operation is not prevented. Although it will be described later, it is possible to detect a touch signal that is not affected by noise by using such a function.

According to an embodiment of the above-described present invention, it is possible to detect whether or not a touch occurs at a substantially single time, and the drive at a high frequency is unnecessary, the touch detection is strong against noise, and it is possible to perform accurate touch detection even with a high resistance.

FIG. 34 illustrates a configuration of a thin film transistor (TFT) substrate for a liquid crystal display (LCD), and particularly, shows the configuration of the TFT substrate of an IPs (In Plane Switching Mode) that is a transverse electric field mode. In contrast to the aforementioned embodiment, the common electrode 220 is not formed in the color filter 215 in the LCD of the transverse electric field mode, but is formed only in a part of an area of the TFT substrate 205. Referring to FIG. 34, the LCD of the transverse electric field mode will be described below briefly.

As illustrated in FIG. 34, gate lines 242 and data lines 244 are arranged in the length and breadth on the TFT substrate 205, and areas that are sectionalized by the gate lines 242 and the data lines 244 form pixels. A TFT 250 for switching an image signal is mounted in a pixel. A gate electrode 251 of the TFT 250 is connected to a gate line 242 to receive a scanning signal, and a source electrode 253 and a drain electrode 255 thereof are connected to a data line 244 and a pixel electrode line 248, respectively. In addition, a semiconductor layer 257 of the TFT 250 forms a channel between the source electrode 253 and the drain electrode 255 in order to apply an image signal to a liquid crystal layer. As shown, a common electrode line 246 is formed in the pixel in parallel to the pixel electrode line 248.

In the LCD having such a configuration, in the case that the TFT 250 is activated, and thus an image signal is applied to the pixel electrode line 248, a substantially parallel transverse electric field occurs between the common electrode line 246 and the pixel electrode line 248, and the liquid crystal molecules move on a plane. However, as shown, the common electrode line 246 is formed in only a partial area. Thus, in the case that the touch screen panel 50 shown in FIG. 25, is located on the upper surface of the touch pad 10 of the LCD in the transverse electric field mode, or the touch pad 10 is patterned on the upper surface of the color filter 215 of the LCD, the capacitance Cvcom that is formed between the touch pad 10 and the common electrode line 246, is formed smaller than the case that the common electrode line 246 is formed on the entire area of the TFT substrate 205.

Since the LCD that is made in the transverse electric field mode has no common electrode formed on the entire area of the color filter of 215, the LCD is vulnerable to an externally applied ESD. Thus, as shown in FIG. 35, a transparent conductive material such as ITO, ATO or CNT is coated on the upper surface of the color filter 215 in a full area painting manner, to then be connected with a predetermined DC potential, normally connected with the ground potential of 0 V. In the LCD made in the transverse electric field mode, a layer that is coated on the upper surface of the color filter 215 and connected with the ground potential is named a "back ground."

Referring to FIGS. 36 and 37, a touch detection method according to an embodiment of the present invention that may be used in the transverse electric field mode will be described as follows.

FIG. 36 is a cross-sectional view illustrating a background configuration on a transverse electric field mode liquid crystal display (LCD) substrate according to an exemplary embodiment of the present invention, and FIG. 37 is a front view of a configuration in which a touch detection device is applied to a transverse electric field mode LCD substrate according to an exemplary embodiment of the present invention. FIGS. 36 and 37 illustrate a case that touch pads 10 of the present invention are patterned in a color filter 215 of the LCD (hereinafter, called an on-cell-touch), according to an exemplary embodiment of the present invention. The touch pads 10 may be mounted in the inside or outside of the A/A 90 of the LCD. A non-visible area 92 on which images are not displayed is located on the edge portion of the LCD substrate 200, but the touch pads 10 according to the present invention can be also mounted. Also, the touch pads 10 are connected to the TDI 30 by using a flexible circuit board 96 such as FPC or COF.

In this configuration, except for the touch pads 10 that are being used in the process of the touch signal detection, the other touch pads 10 should be connected to the ground. Here, the ground is a DC voltage with 0 V or a predetermined potential.

FIG. 38 is a circuit diagram illustrating a configuration in which touch pads 10 are used as a background according to an exemplary embodiment of the present invention. Referring to FIG. 38, a touch detection circuit is configured to have touch pads 10 connected to respective switching units 16. Accordingly, the touch pad 10 will have three types of states. The first state of the touch pad 10 is a floating state where the touch pad 10 is not connected to the switching unit, the second state of the touch pad 10 is a state where the touch pad 10 is connected to the switching unit, and is connected to the ground potential that is one end of the switching unit, and the third state of the touch pad 10 is a case where the touch pad 10 is connected to the touch detector 14 that is connected to one end of the switching unit.

In this configuration, referring to FIGS. 36 and 37, except for the touch pads 10a that are being used for the touch detection, the other touch pads 10b that are not used for the touch detection should be all connected to the ground. Thus, since all the touch pads 10 except the touch pads that are being used in the progress of the touch detection are connected to the ground potential, the touch pads 10 act as a background.

Further, since the charging voltage due to Vpre is applied to the touch pads 10 that are being used for detecting a touch, for a certain amount of time, a discharge path is formed by the charging unit 12, and thus noise such as the ESD may be discharged to the outside of the touch screen panel 50. Accordingly, it is possible to act as a background. Thus, referring back to FIG. 38, the touch pad 10a that is being used for detecting a touch, or the touch pads 10b that are not being used for detecting the touch can play a role of the background.

In the embodiment of FIG. 37, a case in which a touch pad 10 that is detecting a touch is one has been also exemplified, but a group of all the horizontal touch pads 10 of FIG. 37 or a group of all the vertical touch pads 10 of FIG. 37 may detect a touch simultaneously. Alternatively, a group of a plurality of touch pads 10 may detect a touch in a specific area. Otherwise, a group of a plurality of touch pads 10 may detect a touch randomly. Even in this case, the remaining touch pads 10 except for the touch pads 10 that are being used for detection of a touch should be connected to the ground by the switching unit.

In the embodiment of FIG. 38, if the signal detection operation of the touch pad 10a that are being used for detecting a touch signal is completed, the completed touch pad 10a is connected to the ground by operation of the switching unit. Thereafter, one of the touch pads 10b is disconnected from the ground and is newly connected to the touch signal detector 14, according to a predetermined sequence. If a plurality of detection circuits are used as shown in FIG. 38, the longitudinal touch pads 10 and the transverse touch pads 10 are sequentially scanned in the case that the touch pads 10 are formed in the longitudinal and transverse directions as shown in FIG. 37, to thereby detect and complete a touch. Thereafter, since the touch pad may be connected to the ground, it is possible to detect a touch signal earlier than the case of scanning the individual touch pad 10.

Referring back to FIG. 37, since the upper and lower areas of the touch pads 10 are empty, the noise such as ESD is applied to the LCD, and thus the electric field can be formed in the liquid crystal of the display device located below the empty space. Accordingly, malfunction of an image quality on the display device may occur. Further, even in an area where a plurality of sensor signal wires 22 are laid on the left and right sides of the touch pads 10, spaces are present on the left and right of the signal wires. As a result, through these spaces, malfunction of an image quality can occur due to noise such as ESD.

FIG. 39 shows an exemplary embodiment of the present invention in order to solve the above-described problem, and is a diagram illustrating a layout of sensor signal wires 22 according to the exemplary embodiment of the present invention.

A LCD has dots 275 in which each dot is composed of three pixels Red, Green, and Blue. In the present invention, individual Red, Green or Blue regions are defined as pixels or picture elements. Referring again to FIG. 39, in the case that there are no sensor signal wires 22 between touch pads 10g and 10h of FIG. 39, the space between the touch pads 10g and 10h, should be narrower than the pixels. Thus, although noise is applied to the narrow region between the touch pads 10g and 10h, the noise is discharged by the ground potential connected to the touch pads 10g and 10h that are located in the top and bottom thereof, to thereby prevent the operation of the pixel from being affected.

Furthermore, the space between the sensor signal wires 22 is narrower than the pixels. Referring to the sensor signal wires 22a and 22b, the space between the two sensor signal wires is narrower than the width of the pixel. Thus, although noise is applied to the narrow region between the sensor signal wires 22a and 22b, the noise is discharged to the outside through the sensor signal wires 22a and 22b placed in the area of the pixel and connected to the ground, and thus malfunction of the image quality of the pixel does not occur. The sensor signal wires 22, 22a, and 22b have line widths W1, W2, and W3, respectively. The line width W3 is greater than the line width W2, and the line width W2 is greater than the line width W1.

Referring to FIG. 25 or 37, the space between each of the touch pads 10 forming the touch detection pattern and each of the sensor signal wire 22 occurs, and the farther from the TDI 30 it is, the wider the area of the space is. A transparent conductive material such as ITO that is used to form the touch pads 10 is not coated or printed in the spaces between the touch pads 10 and the sensor signal wire 22, to thus cause the touch pads and the sensor signal wires to be noticeable, and to thereby lead to a poor display quality and cause a poor image quality due to noise such as ESD. Therefore, measures of improving visibility and preventing the image quality from going bad need to be taken for the spaces between the touch pads 10 and the sensor signal wire 22.

FIGS. 40A to 40C show approaches to solve the above problems, in which a charging unit such as a filled Area or additional area is provided in a space formed between the touch pads 10 and the sensor signal wires 22. Referring to FIGS. 40A to 40C, the space filler unit 11 is filled in this empty space. The space filler unit 11 is filled with the same material as that used in the touch pad 10, and may be formed into a completely full state without an open space by a filling process, or may be formed of a mesh structure. In addition, the space filler space 11 may be extended from the touch pad 10 as shown in FIG. 40A, may be connected with the sensor signal wire 22 as shown in FIG. 40B, and may remain floated as shown in FIG. 40C without connected to the sensor signal wires 22 or the touch pads 10.

On the other hand, in the FIG. 41 embodiment, it is assumed that a drop of water or sweat or a conductor 26 such as a metal lies between the touch pad 10a that is detecting a touch and the touch pad 10b connected to the ground potential. Such conductor 26 is not directly in contact with the touch pad 10, but lies on the upper surface of the protective layer 24 as shown in FIG. 12 or 13. As shown in FIG. 41, this enables a path of movement of charges to be formed in the touch pad 10a that is detecting a touch, to thus charge Ct. Referring to FIG. 13 or 12, Ct that is formed by the equation of FIG. 7 is formed between the touch pad 10 and the protective layer 7 and the size of the capacitance Ct is determined according to the contact area between the touch pad 10 and the conductor. Since the conductor 26 of FIG. 41 is connected to the touch pad 10b connected to the ground in the touch state, a path of movement of charges is formed between one side of the touch capacitor Ct1 of the touch pad 10a and the touch pad 10b connected to the ground. Since the touch capacitor Ct2 is also formed in the touch pad 10b connected to the ground, one side of the touch capacitor Ct1 has a path that is connected to the ground through Ct2. Since Ct1 is charged when the touch pad 10a for detecting a touch is charged through the charging unit 12, even if the touch is not a touch that occurs due to the bodily finger 25 by Equation 2, it is recognized as occurrence of the touch.

In order to prevent such problems, the touch pad 10b (hereinafter, called a non sensing pad, and abbreviated as NSP) connected to the ground potential without detecting a touch, is disconnected from the connected ground potential to thus maintain a floating state when the touch pad 10a (hereinafter, called a sensing pad, and abbreviated as SP) is detecting a touch under the touch signal detection.

By the above-described configuration of the present invention, the touch pad has three states such as the ground state, the floating state, and the connected state, to thus support a transverse electric field mode liquid crystal display device, and prevent errors that may occur in the touch pad where no touch has occurred. In the case that the display device has no transverse electric field mode, the touch pad may not select the ground state.

Detailed description will follow with reference to FIG. 42. FIG. 42 is a waveform diagram except for a portion being synchronized with a common voltage in an embodiment of FIG. 22, which illustrates an opening of the NSP according to an embodiment of the present invention.

An area 1 of FIG. 42 is an interval at which capacitors connected with the touch detector 14 are charged and a voltage due to the D/B phenomenon is induced. Referring to FIG. 41, when capacitors connected with the touch detector 14 are charged by the charging unit 12, Ct1 and Ct2 are also charged by the conductor 26. Accordingly, in order to eliminate the charge path of Ct1, all the NSPs 10b are floated and the discharge path is not formed. The CPU 40 or the signal processor 35 controls the switching unit 16, to maintain all the NSPs 10b connected to the switching unit 16 to be in the floated state. In the FIG. 42 waveform diagram, a meaning of the NSP signal in a high state means that the NSP is opened or in the floated state, while a meaning of the NSP signal in a low state means that the NSP is connected to the ground via the switching unit 16.

It is preferable that the NSP 10a is opened before the touch capacitor Ct1 formed in the touch pad 10a that is used to detect a touch is charged. It is preferable that an open time is done from 1 ns to 100 ms before charging begins.

Thus, referring to FIG. 42, the NSP 10a has been opened before the charging unit 12 is turned on by Vg. The NSP can be open even during charging. The TDI 30 has a unit for setting a point in time at which the NSP is opened. This is driven by a value that is stored in a register or a memory unit or a program executing the CPU 40. For example, suppose a register. When selecting the address 00h of the register, the NSP may be opened within 1 ns, while when selecting the address 0Fh of the register, the NSP may be opened within 100 ms.

The area 1 is an interval at which the charging is completed by the charging unit 12, and then the voltage is formed due to the D/B phenomenon, to also complete stabilization. Then, the voltage due to the D/B is detected. The voltage detected in the area 2 is subjected to undergo a sampling process by which the voltage is stored in a storage unit such as a sample & holder and a capacitor (not shown) in the inside of the touch detector 14. An area 3 is an interval at which sampled data is amplified or is converted into a digital value in an ADC converter 14-3, after the completion of the sampling process. Therefore, the area 3 at which the sampling has been completed is an area where the opened NSP may be connected to the ground. It is desirable that connection of the NSP to the ground is made within from 1 ns to 100 ms from a point in time of termination of the area 2 whose sampling has been completed.

On the other hand, the touch pad 10 that is detecting the common voltage should be also opened and closed (or connected to the ground by the switching unit) at the same point in time as that of the NSP, to thus block a path of movement of the charges due to the touch pad 10 that is detecting the common voltage, and to thereby prevent malfunction of the touch operation.

The TDI 30 has a unit for determining a point in time at which the opened touch pad 10 is closed. This is driven by a value that is stored in a register or a memory unit or a program executing the CPU 40. For example, suppose a register. When selecting the address 00h of the register, the NSP may be opened within 1 ns, while when selecting the address 0Fh of the register, the NSP may be opened within 100 ms.

When the time that is taken until the NSP 10b is opened is longer, the time that is taken when the touch pad acts as a background is shortened. As described above, this may cause a poor image quality due to noise such as ESD with high probability. Thus, measures to reduce the open time of the NSP 10b is needed.

Referring to FIG. 41, Cdrv, Cvcom, and Cp are connected in parallel with the touch capacitance Ct. In the typical embodiments of the present invention, Cvcom or Cdrv has a larger capacity a couple of times than Ct. Thus, the potential at the point P is not greatly affected although the touch capacitor Ct is uninstalled after the completion of the charge sharing at the point P by the D/B. One of these reasons is that the point P is floated in the Hi-z state with the exception of being charged, and thus there is no discharging path. The fact that the remainder capacitors without Ct will act as a memory unit, and the charges are preserved, provides a theory in which there is no malfunction for the touch signal detection even though Ct is removed, since the voltage due to the D/B is generated by using Equation 2 by reflecting the capacitance of Ct at a state where Ct has been connected, and the resulting voltage is stored in a capacitor acting as the memory unit.

Referring again to FIG. 41, even if the SP 10a that is the touch pad 10a used for the touch detection is opened, a path of movement of charges formed by the conductor 26 is blocked. Thus, opening of the SP 10a is also one of methods of preventing touch malfunction caused by a drop of water, or the conductor 26 such as metal.

FIG. 43 is a waveform diagram showing an open of the SP 10*a* according to an embodiment of the present invention. In FIG. 43, the flow or time of all signals except SP 10*a* is the same as in FIG. 42.

Referring to FIG. 43, the voltage by the D/B is formed by the driving voltage Vdrv and the SP 10*a* in the area 1 is opened after the charge sharing has been completed between all the capacitors connected to the point P. Here, a meaning of the SP that is in a high state, is that the SP is opened, while a meaning of the SP that is a low state, is that the SP 10*a* is connected to the ground. If the SP is opened, the NSP 10*a* is again connected to the ground, which is made within 1 ns to 100 ms after the SP has been opened.

A point in time at which the SP 10*a* is opened may be synchronized with Vg, Vdrv or a common voltage (not shown). After the SP 10*a* has been opened and then the sampling has been completed in the area 2, the SP 10*a* is preferably connected to the ground in the area 3.

After the sampling has been completed in the area 2, the SP 10*a* is connected to the ground within 1 ns to 100 ms.

If one SP 10*a* still acts as the SP 10*a* in the following sensing sequence, the SP 10*a* should be connected to the point P before the charging is completed. Referring to FIG. 43, the opening and closing time of the NSP has an effect of being shortened in conjugation with the SP 10*a* at work, which gives a great help when the touch pad 10 acts as a background.

The TDI 30 has a unit for controlling an opening and closing time of the SP 10*a*, and is carried out by a register or memory unit, or by a program. In addition, the opening of the SP 10*a* plays a role of reducing an inflow time of noise introduced through the SP, and thus also serves to weaken the noise affecting at the point P.

Referring to FIG. 37, the touch pads 10 of R1 are farther away from the TDI 30 than the touch pads 10 of R7, and thus the resistance formed by the sensor signal wires 22 that form a sensor pattern is larger in the touch pads 10 of R1 than the touch pads 10 of R7 and the parasitic capacitance Cp is also larger in the touch pads 10 of R1 than the touch pads 10 of R7. Therefore, as the SP 10*a* shown in FIG. 43 is opened, the opening time of the SP 10*a* can be determined considering the resistance and the capacitance. This is because a change in voltage or the charge sharing due to the D/B in Ct by Vdrv applied to Cdrv is delayed by a factor according to a multiplication of RC (or a coupling of a resistor and a capacitor), since the resistance or parasitic capacitance of the sensor signal wires 22 connected with Ct formed in the touch pad 10 becomes large as the touch pad 10 is farther away from the TDI 30. Therefore, if the same opening time of the SP 10*a* is applied to all of the touch pads 10*a* of the touch screen panel 50, the touch pad 10 close to the TDI 30 has no specific problems since the touch pad 10 close to the TDI 30 performs the signal sampling after the completion of the charge sharing, but the touch pad 10 far away from the TDI 30 may lower the touch sensitivity and cause a touch coordinate detection error, since the touch pad 10 far away from the TDI 30 performs the signal sampling after the non-completion of the charge sharing between the capacitors connected to the point P.

In order to solve this problem, measures of varying the opening time of the SP 10*a* by the position of the touch pad 10 are needed. For example, in FIG. 37, the touch pad 10 of R 1 is the farthest from the TDI 30 and thus resistance or the parasitic capacitance is large in size. Accordingly, a unit for adjusting the opening time of the touch pad 10 when the touch pad 10 is activated as a SP, is separately provided. Further, units for adjusting the opening times of the touch pads 10 when the touch pads 10 of all the rows such as S2 or S3 are activated as SPs, are separately provided by row. Such units are performed by a register or a memory unit or a program within the TDI and the detailed method is the same as described above.

According to such an embodiment of the present invention, the time to open the touch pad is variably performed, depending on the location of the touch pad, which is robust to the disturbance or noise and enables accurate touch detection.

Meanwhile, the same opening time can be applied in SPs of R1 and R2 and the same opening time can be applied in SPs of R1, R2 and R3. The number of the touch pads 10 included in a group of opening the SP at the same time can be selected by a designer. Here, the number of the touch pads 10 included in the same group should be adjusted depending on the size of the resistance and the parasitic capacitors.

The TDI 30 has a unit for selecting the number of the touch pads 10 included in the group of performing an SP open operation at the same time. Referring to a case where a register is used for this purpose according to an embodiment of the present invention, if an address 00 of the register is selected, all of rows have the individual SP open time, and if an address 01 of the register is selected, two rows are included in the same group. According to one embodiment, two rows such as R1 and R2 or R3 and R4 are included in the same group. Otherwise, if an address 03 of the register is selected, five rows are assigned in the same group, to activate the rows of R1 to R5 at the same SP open time.

The resistance values of the touch pads 10 to be included in a group that performs the SP open operation at the same time are preferably the same more advantageously. The resistance values of the touch pads 10 to be included in a group that performs the SP open operation at the same time are preferably present within an error range.

The above-described embodiments has been described with respect to the case of rows as an example, but the technical spirit of varying the open time of the SP 10*a* by the touch pads 10 is not limited to the row, but can be applied to the case of columns or selecting the touch pad 10 randomly.

On the other hand, the embodiment on the open time of the NSP 10*b* or SP 10*a* of FIG. 42 or 43 has been described with respect to the case of detecting the touch signal in synchronization with the common voltage, but the open time of the NSP 10*b* or SP 10*a* can be determined in synchronization with a signal that is internally generated in the TDI 30 or an externally given signal from the outside of the TDI 30, instead of being synchronized with the common voltage in the case that the common voltage is not generated in the display device. The signals of the open time or the close time of the NSP 10*b* or SP 10*a* that are given from the inside or outside of the TDI 30, may be a trigger signal or an interrupt that is periodically generated by a timer or a counter.

The ON/OFF point in time of Vg for controlling the charging unit 12 in synchronization with the trigger signal or interrupt, is determined, and the operating points in time of all the signals of FIG. 42 or 43 is also determined in synchronization with the trigger signal or interrupt.

In the touch screen panel 50 according to the embodiment of FIG. 37, it is possible to detect a touch by scanning a group of the touch pads 10 included in rows and a group of the touch pads 10 included in columns.

For example, if all of the touch pads 10 are scanned by rows, the touch pads 10 included in the row R1 are connected to a touch detection circuit from which all touch signals are detected at the same point in time. All the touch pads are sequentially scanned starting at R1 up to R7, and the touch signals for all the touch pads 10 included in the same group at each and every scan are detected.

Otherwise, if all of the touch pads 10 are scanned by columns, scan starts at C1 and ends to C5 in the column direction. A touch is detected at each and every scan by continuously repeating again a process of starting at C1 and ending to C5.

For example, assuming that touch pads are scanned in the row direction, all the touch pads 10 included in the row R1 perform the touch detection operations, when the touch pads of R1 are scanned, and all the touch pads 10 included in the rows R2 to R7 except for the row R1 may be connected to the ground potential.

A touch detection operation is performed a plurality of times in the row R1. Each time a touch is detected, the value is stored in a line memory unit corresponding to R1. After undergoing filtering by using a plurality of pieces of data stored in the line memory unit, it is determined whether or nor a touch operation occurs, or a contact area is calculated. After completion of the row R1, the same process is repeated for the row R2 as well. After completion of the row R7, ADC values extracted from the respective rows and touch data such as area values are stored in a frame memory unit. The CPU 40 or the signal processor 35 calculates the touch areas or extracts the touch coordinates on the basis of the data stored in the frame memory unit.

The touch coordinate can be defined as the center of gravity of an area that is formed of an area or areas of one or a plurality of touch pads 10, in which a touch unit such as a finger 25 is in opposition to one or a plurality of touch pads 10. Therefore, if a touch coordinate is calculated by considering only the ADC value or the area extracted from a single touch pad 10, the center of the touch pad is extracted as the touch coordinate. Since information about many locations is actually present in the inside of the touch pad 10, it is impossible to extract a precise position with only a single touch pad 10.

In order to detect a variety of locations within the touch pad 10, a touch coordinate is to be extracted by a combination of a plurality of touch pads 10, that is, at least two or more touch pads 10. FIGS. 44A and 44B are diagrams illustrating a method of extracting the touch coordinate by a mutual combination or a relationship of the ADC value or the calculated area detected in the touch pad 10, according to an embodiment of the present invention.

Referring to FIG. 44A, a finger 25 has a 50% share of an area in a touch pad 10 ("A") and a touch pad 10 ("B"), respectively. The touch pads A and B have the same area and it is assumed that an area value is 100 (one hundred). The sum of the touch areas by the finger 25 is 100. Among the touch areas, the sharing ratios of the touch pads A and B are 50%, respectively. Therefore, it can be determined that the center of gravity is located at the center of the touch pads A and B.

In addition, referring to FIG. 44B, a sharing ratio of the area in the touch pad 10 ("A") by the finger 25 is 60%, and the sharing ratio of the area of the touch pad 10 ("B") is 40%. A total sharing ratio of the areas of the touch pads A and B is 100%, and the sharing ratio of the area in the touch pad 10 ("A") is 60%. Accordingly, the center of gravity is located at a point of 40% from the left of the touch pad 10 ("A"). This point become the touch coordinate. Thus, it is possible to linearly calculate the touch coordinate depending upon a fine difference in the area by correlation of mutually adjacent touch pads 10.

In FIGS. 44A and 44B, a method of obtaining the touch coordinate for the finger 25 that moves in the horizontal direction has been described as an example in the case of the touch pads 10 adjacent in the horizontal direction, but it is possible to extract the touch coordinate two-dimensionally, in the case that the touch pads 10 are located in the horizontal and vertical directions, and the finger 25 touches all the touch pads 10 in the horizontal and vertical directions.

Since it is possible to extract an area in the present invention, the touch coordinate is extracted as the area. Preferably, the touch coordinate is calculated by correlation of the areas calculated in the respective touch pads 10.

Using the above-mentioned coordinate detection area configuration, according to an embodiment of the present invention a touch detection means is a higher resolution than the resolution of the touch pad touch detection is possible.

By a configuration of detecting the touch coordinate by using the above-described area, a touch detection device according to an embodiment of the present invention, can perform touch detection with much higher resolution than that of the touch pads.

The TDI 30 used in the touch screen panel 50 of the present invention can be configured to detect the touch signal of the touch pads 10 of 100 or 500, or more than 1000. Should touch signals are detected or sensed from one thousand of touch pads 10, one thousand of pins of the TDI 30 are mapped with one thousand of touch pads 10 on a one-to-one mapping basis. Otherwise, a multiplexer is provided in the outside of the TDI and one thousand of touch pads 10 are connected with the multiplexer. Thereafter, if the output of the multiplexer is set a small amount, the number of pins is reduced in the TDI but the separate multiplexer should be added, to thus require an additional process and cause cost rises.

In order to manufacture the touch screen panel 50 that will be used in a small-sized display device by using the TDI 30 that is capable of detecting the touch signal from one thousand of touch pads 10, only a portion of the touch detection function about a thousand of touch pads should be used.

For this purpose, in an embodiment of a touch screen panel 50 configured to have rows and columns as shown in FIGS. 37 and 46, a unit for setting an operating area of each of the touch pads 10 included in the row and column directions is required.

For example, FIGS. 37 and 46 illustrate a touch screen panel 50 that is formed by 7×5 (row×column). If the number of the touch pads 10 is formed by 5×3 (row×column), only five groups of seven groups of touch pads 10 should be selected in the row direction, and only three groups of five groups of touch pads 10 should be selected in the column direction.

A unit capable of selecting a group of touch pads in the row direction and a group of touch pads in the column direction is provided in the inside of the TDI, so as to perform a touch detection operation. Registers will be described as follows as an embodiment of the unit.

First, two types of registers such as a register for selecting a group in the row direction and another register for selecting a group in the column direction are required as the registers. In addition, two types of registers are required as the register for selecting a group in the row direction, in which each of the two types of registers should include a unit for setting start and end points of the group that performs the touch detection. For example, it is assumed that there are two registers called REG1 and REG2 to set up a group in the row direction. If REG1 is a register to set a touch detection starting point in the row direction, and REG2 is a register for determining an end point, an operation for the touch detection is performed from the row R3 of FIG. 37 by the row R3 that is written in or selected from REG1, but R1 and R2 do not operate. In addition, an operation for the touch detection is performed only until the row R7 by the row R7 that is written in or selected from REG2, but R8 or R9 that will be performed later does not the touch detection operation. The same method as the case of the row is applied to the case of the column, and it is possible to select three groups in the column direction in various forms from C2 to C4, or from C1 to C3, by two registers capable of setting start and end points.

The operation that detects a touch in only a portion of the touch pad from the entire touch pads 10 that is capable of being detected by the TDI 30 may be performed in two types of methods.

According to the first method, only touch pads 10 required to operate the touch detection connected to the touch detection circuit of FIG. 11, and the touch pads 10 excluded from the operation of the touch detection are not connected to the touch detection circuit of FIG. 11.

According to the second method, all of the touch pads that are capable of being detected in the TDI 30 are connected to the touch detection circuit for detecting a touch, but data of a needed area is extracted from the memory unit in which the resulting value is included and is used for calculation of the touch coordinate.

Alternatively, these two methods are mutually combined to then be used. Referring to FIG. 37, for example, only R3 and R7 operate in the row direction, and R1 and R2 do not perform the touch detection. All of C1 to C5 operate in the column direction and only data of C1 to C3 stored in the memory unit is used, but data of C4 and C5 is discarded. Otherwise, a touch is detected by using the touch detection circuit only in the columns of C1 to C3, but C4 and C5 do not detect a touch. Meanwhile, a touch is detected for every row of R1 to R7, but only areas of R3 to R7 are referred to from the memory unit in which the detected data is stored.

As mentioned earlier, the touch pad 10 is also used for the purpose of detecting a touch, but is also used for detection purpose of the common voltage.

Figure 45:
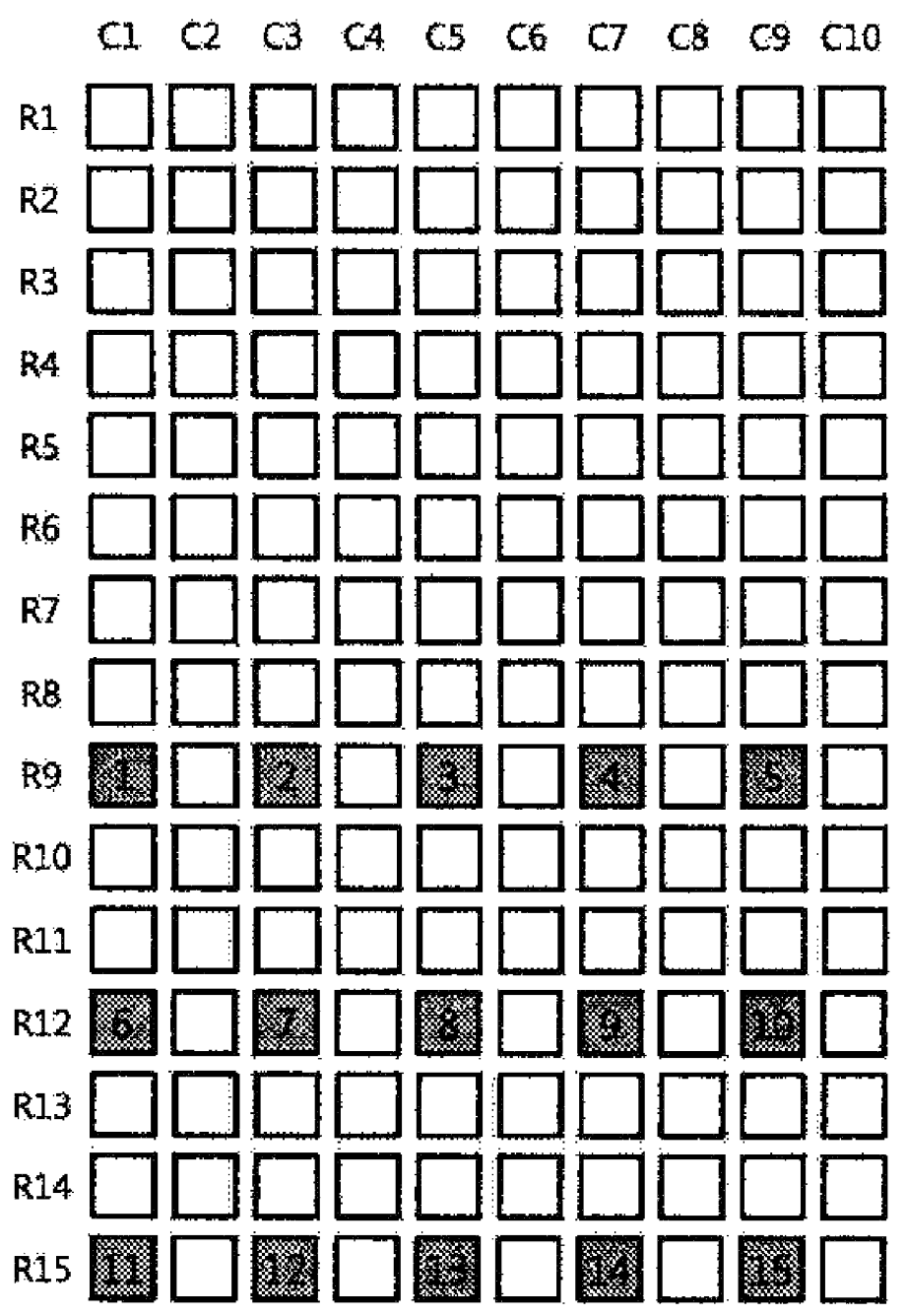

A method of detecting a touch signal and a common voltage by touch pads 10 according to an embodiment of the present invention will be described as follows with reference to FIG. 45. Referring to FIG. 45, a group of fifteen touch pads 10 in the row direction and a group of ten touch pads 10 in the column direction exist, to thus configure a touch screen panel 50 with one hundred fifty (150) of touch pads 10. A common voltage is used in a display device 200. In the case of the common voltage alternating in a line inversion manner, or the common voltage including noise, the reason why a touch signal should be detected in synchronism with the common voltage, which will be the same as the above-described reason.

In order to detect the common voltage, a unit for forming is needed as in FIG. 17 or 19. In the present invention, such a unit for forming Cvcom is not separately provided but the touch pad 10 is used.

Referring to FIGS. 12 and 13, the touch capacitance Ct and the common electrode capacitance Cvcom are simultaneously formed in a single touch pad 10.

That is, when the finger 10 is located on the upper surface of a single touch pad 10, a body 11 is grounded and the touch capacitor Ct whose one side is connected to the point P of FIG. 11 and the common electrode capacitor Cvcom whose one side is connected to the point P of FIG. 11 and whose other side has a potential of the common electrode located on the bottom of the touch capacitor Ct, are simultaneously formed. This means that the common electrode capacitor Cvcom is formed in the touch pad 10, and means that the common voltage can be detected without using a separate common voltage detecting unit.

Since the touch pad 10 can detect the touch and the common voltage simultaneously, it is also possible to detect the touch signal and the common voltage in the touch detection circuit of FIG. 11 with a single touch pad 10.

However, cross-talk can occur due to the timing difference of detecting a touch signal and the common voltage in a single circuit, and the driving voltage Vdrv or the common voltage for detection of a touch signal may cause distortion by the mutual influence. Accordingly, it is preferable to separate the touch pad 10 for detection of the touch and the touch pad 10 for detection of the common voltage.

Also, referring to FIG. 17 or 19, since it is preferable that Cdrv is not used in order to improve the detection sensitivity of the common voltage, it is preferable to separate the touch detection circuit including Cdrv and the common voltage detection circuit having no Cdrv.

Referring to FIG. 45, there are the touch pads 10 for detection of the common voltage in three groups of the rows, which are R9, R12, and R15. In addition, one group has five touch pads 10 which are configured to detect the common voltage.

Only one of the fifteen touch pads 10 for detecting the common voltage is selectively used for detection of the common voltage. Therefore, a multiplexer or switching unit for connecting one of a plurality of touch pads 10 that are set for detecting the common voltage to the point P (a point P in FIG. 17) of the common voltage detection circuit is needed. However, this is nothing but one embodiment according to FIG. 45 in which a plurality of the touch pads 10 and a plurality of the common voltage detection circuits corresponding to the plurality of the touch pads 10 may also be used.

In FIG. 45, if the touch detection areas are set to 10×5 (row×column), and thus the touch detection areas are set to R1 to R10 and C1 to C5, only the touch pads 10 for detecting the common voltage included in the touch detection areas are used for detection of the common voltage. In addition, the touch pads 10 for detecting the common voltage other than the touch detection areas are not used as the common voltage detection purposes. Likewise, the touch pads 10 for detecting the common voltage are set in a plurality of rows and columns. Positions at which the touch pads 10 for detecting the common voltage are detected may vary depending upon changes of the setting of the touch area of the TDI 30.

Assuming that the entire area in FIG. 45 is the touch detecting area, the common voltage should not be detected only in the touch pad 10 included in one row and at least one should be present in the other row.

This is because, assuming that a touch pad 10 of R9 marked with "5" detects a common voltage first in an embodiment of scanning a touch signal from R1 to R15, since the touch pad 10 of R9 marked with "5" that is being used for detecting the common voltage does not detect the common voltage but has to detect the touch, when R8 has been scanned and then R9 detects a touch, another touch pad should detect the common voltage. Since a touch pad for detecting a common voltage should not be present in R9, one touch pad should be selected from R12 or R15. Assuming that a touch pad 10 of R15 marked with "13" plays such a role, the touch pad 10 of R15 marked with "13" detects a common voltage at the time of scanning R9, and the touch pad for detecting the common voltage should be switched to another touch pad for detecting the common voltage of R9 or R12, before scanning R15 after having scanned R9.

As described above, according to a scan order for the touch detection, a touch pad for detecting a common voltage is changed and thus it is possible to detect a common voltage in real-time by using the touch pad.

In the case that the touch pad 10 is an on-cell touch cell included in a display device shown in the embodiment of FIG. 13, the touch pad 10 may be used as a back ground in a LCD display device of a transverse electric field mode, as described above. In this case, the touch pad detects the common voltage continuously, to thus cause a malfunction of the image quality of the display device. That is, in the case that a touch pad 10 of R9 marked with "5" of FIG. 45 detects the common voltage continuously, and entrusts a function of detecting the common voltage to another touch pad that is located in another row in only a sequence at which the touch pad 10 of R9 marked with "5" detects a touch, a time sharing ratio for common voltage detection of the touch pad 10 of R9 marked with "5" becomes higher than that of another touch pad 10 for common voltage detection. In order to detect the common voltage in the embodiment of FIG. 18, since Vpre_com that is the charging voltage is applied to the touch pad 10 for common voltage detection for a considerable period, this Vpre_com voltage generates an electric field with respect to a voltage formed in a common electrode or a drain electrode 255 of the LCD located on the bottom of the common voltage detecting touch pad 10, to thereby cause the liquid crystal located on the bottom of the common voltage detecting touch pad 10 to perform an operation due to the electric field. In the case that the liquid crystal reacts with the electric field, the liquid crystal is changed into black or gray as a whole, to thus cause a poor image quality.

For measures to solve this problem, the touch pads 10 for detecting the common voltage are used in rotation.

For example, assuming that the touch pad of R9 marked with "1" of FIG. 45 is used when the first common voltage is detected, the touch pad of R9 marked with "2" is used to detect the second common voltage. Then, the touch pad of R9 marked with "3" is used to detect the next common voltage. As such, the touch pads 10 for detecting the common voltage should be used in rotation. The time width of the common voltage is 100 μs at most, and the liquid crystal does not respond in an amount of time of 100 μs or so. Accordingly, it is possible to solve the poor image quality by the rotation of the common voltage detection touch pads. Such a rotation is possible in a combination of the common voltage detection touch pads 10 included in same row, or even between the common voltage detection touch pads 10 included in respectively different rows or columns.

Thus, in the case that the common electrode detecting touch pads 10 operate in rotation, the row that is detecting the common voltage becomes in a sequence at which the row detects a touch, to thus be changed into a touch detection environment. For this, rotation of the common electrode detecting touch pads 10 included in a row is achieved in the common voltage detecting touch pads 10 included in another row.

So far, the embodiment of sequentially scanning the rows and detecting the touches has been described, but a case of sequentially scanning columns and detecting touches can be equally achieved by using the same rotation technique.

Some mobile phones have function keypads enabling Return to Home of Menu, and an operation such as Backward or Forward of Menu. Referring to FIG. 46 regarding the use of function keypads in a conventional embodiment, a touch screen panel 50 applied to a cellular phone includes touch pads 10 and function keypads 20. These function keypads 20 may be mechanically driven, but recently in some cases the use of the function key using a touch increase.

FIG. 46 includes two function keypads that are provided in a region where the touch pads 10 are mounted, beyond a A/A region of a display device. The two function keypads named "Home Key" and "Back Key" are used in different places from the touch pads 10 that used for touch detection, and thus require different functions from the touch pads 10.

FIG. 47 illustrates an implementation of the function keypads according to an embodiment of the present invention. Referring to FIG. 47, the TDI 30 is divided into an input unit and an output unit. The input unit may receive a signal given from a flexible circuit substrate 96 such as COF or FPC (not shown), may give a signal to COF or FPC (not shown). In addition, the output unit of the TDI is a portion that is connected to the touch screen panel 50, and that makes a signal transfer not possible for another region other than the touch screen panel 50.

Function keypads 20 are included in the output unit of the TDI 30, and are wired in the same manner as the touch pads 10, to thus pass through the upper surface of the A/A of the display device. The function key signal wires 23a to pass between the touch pads 10 are connected with the function keypads 20 in the area of the touch screen panel 50 on the opposite side of the TDI 30. On the other hand, other function key signal wires 23b originate from the output unit of the TDI 30, do not pass through the A/A region of the display device, are wired with the touch screen panel 50 on the opposite side of the TDI 30, through a non-visible region (or a bezel) of the display device (not shown), and are connected with the function keypads 20.

Further, the function keypads 20 may be connected with a protective glass pad, a protective plastic pad, or the like, that is not the touch screen panel 50 through the input unit in the TDI 30. The function keypads perform only ON/OFF functions. Thus, when the touch pads 10 of the present invention are used as the function keypads, only a touch pad 10 is used independently, to detect only an ON/OFF operation. A threshold value (or a threshold voltage) for the ON/OFF detection may be used differently from a threshold value that is applied to the touch pad 10.

It is desirable that the function keypads 20 also perform fac.cal and RTC identically to reduce a detection error. In the case that the function keypads do not exist on the upper surface of the display device, the function keypads are not required to detect a touch signal in synchronization with the common voltage signal.

The function keypads 20 may be also used as the touch pads 10. A unit for determining whether any of the touch pads 10 are used as touch detection pads or function keypads is included in the inside of the TDI 30. In the case of a 7×5 (row×col) structure as shown in FIG. 47, if five function keypads are then absorbed into the touch pads of the rows, a touch screen panel 50 having a 8×5 (row×col) touch resolution is obtained. Such a function is changed by a register or a program included in the TDI 30. Taking a method of modification by the register as an example, a specific bit of the register is set as high or low, which makes a certain touch pad switched to the touch detection touch pad or the function keypad. To this end, a specific area of the touch pad 10 should be determined to allow these two functions in advance.

The function keypads as used herein, can also be used for the touch pads for the touch detection, and thus can also be used for detecting a linear change in position of a touch unit such as a finger 25 in addition to the function keypads that simply detect the ON/OFF. These function keypads are required for a scroll function, for example, these function keypads are attached to one end of a phone and are used for the scrolling function such as pushing a finger up to increase the volume, and pushing the finger down to decrease the volume.

In order to linearly detect coordinates for the linear position changes of the finger 25, such a function cannot be performed by only a single function keypad. As described above, a plurality of function keypads should be adjacent to each other, and the linear coordinate detection can be performed through a mutual relationship between the sharing areas of the plurality of function keypads or a mutual area reference. Such a function does not differ from the case that the touch pad 10 detects a touch coordinate, but differs from only the case that a touch detecting position is not located on the top surface of the A/A region of the display device.

Accordingly, it is possible to use the touch pad according to the present invention for any purpose extracting the linear change in the coordinates as a scroll wheel of the Apple iPod®.

Even when the touch pads 10 are used as the function keypads 20, the function keypads 20 preferably perform all of the features of the opening or closing operation of the NSP 10b or the SP 10a.

As described above, it may be assumed the function keypads 20 are some regions of the touch pads 10. As shown in FIG. 47, five function keypads can be defined as the eighth row. Thus, since a touch screen panel 50 with a resolution of 8×5 can be set, there is no constraint in functions or time settings for the open and close of the NSP or SP. That is, when the first row of FIG. 47 operates as the touch pad 10, all of the touch pads 10 of the touch screen panel 50 including the function keypads 20 are connected to the ground, or can follow the rules of the NSP open in the present invention.

Further, at the moment the function keypads 20 detect the touch signal, it is possible to apply the technical idea regarding NSP open of the present invention to the remaining touch pads 10 except for the function keypads 20. In conclusion, timing about the NSP open or SP open of the function keypads 20 is not set separately, but is conducted in synchronization with the time about the NSP and SP open of the touch pads 10.

When the touch pads 10 of the present invention are used as the function keypads 20, threshold values to determine whether or not a touch occurs should be set separately, and threshold values for the ADC or the area can be set identically or differently from each other.

This is because the function keypads 20 need sensitivity settings separately, since the function keypads 20 are designed to respond to a deep pressure on their purposes.

If the sensitivity of the function keypads is sensitive like normal touch pads, the function keypads may react with even a momentary touch. As being the case, the function keypads do not need high sensitivity. Thus, it is preferable that threshold values to determine whether or not a touch occurs be separately set in the function keypads 20.

Threshold values may be set on the basis of the value of the ADC or the area. Also, in order to perform the touch detection of the function keypads, it is also desirable to separately set a gain of FIG. 29. Thus, this is because the touch sensitivity can be adjusted by separately setting a gain of FIG. 29.

FIG. 48 is a table diagram showing settings of the register applied to the function keypads according to an embodiment of the present invention. Referring to FIG. 48, the register is made of 4 bits and thus can be set in sixteen (16) steps. Also, the threshold values have been set on the basis of a ADC code. If address 00h of the register is selected, the threshold value becomes 50. In the case that the ADC code value detected due to the touch by the function keypads 20 is 50 or more, it is recognized as a touch. If address 09h is selected, only in the case that the ADC code value detected due to the touch by the function keypads 20 is 500 or more, it is recognized as a touch. Thus, by properly adjusting the threshold value, it is possible to adjust the touch sensitivity in the function keypads 20. Such a method can be applied to the touch detection of the touch pads 10 identically.

On the other hand, suppose an application example that the finger 25 completely covers the function keypad, and thus a touch is detected but touch sensitivity should be low. In this case, as shown in the equation of FIG. 29, it can be solved by lowering a gain or adjusting a threshold value on the touch detection. Otherwise, the sensitivity of the function keypad may be adjusted by the shape of the function keypad.

By the above-described configuration, according to an embodiment of the present invention, an input method that uses the function keypads having the same structure as the touch pads but differing from that of the touch pads can be provided to users, by adjusting the touch detection threshold values and the amplifier gains of the function keypads.

FIG. 49 is a diagram showing a method of adjusting the sensitivity with the shape of the function keypads according an embodiment of the present invention. Referring to FIG. 49, a touch detection pattern in the inside of the function keypads 20 is formed of a net or mesh structure. An area sharing ratio of the touch detection pattern is determined depending on the width of the pattern. An example of the net or mesh structure has been described with reference to FIG. 49, but the touch detection pattern is not limited to the shape. However, the touch detection pattern may occupy a portion of the pattern of the function keypads or may cover the whole shape of the function keypads. According to the advantage of such a pattern, even if the gain or the threshold value is set high, it is possible to perform the touch detection only when the touch unit contacts the function keypads 20 as widely as possible. Accordingly, an operation by an unwanted touch that may occur when the touch unit contacts a part of the function keypads 20 unconsciously can be prevented.

By the above-described configuration, according to an embodiment of the present invention, the structure of the touch pad 10 is partially modified, and thus an input function as the function keypads different from the touch pads can be provided for users.

In order to extract the touch coordinate from the touch pads 10, it is necessary to make a correlation rule with the neighboring touch pads 10. According to the correlation rule, when the finger 25 touches a plurality of touch pads 10, an area of the finger 25 between the finger 25 and the plurality of touch pads 10 contacting the finger 25, and the center of gravity of the area formed by the plurality of touch pads 10 are obtained. The obtained point becomes a touch coordinate. However, since there is no neighboring touch pads 10 in the edge portion of the touch screen panel 50 that is the last part of the touch pads 10, it is not easy to obtain the center of gravity completely.

FIG. 50 is a diagram showing a conventional configuration of an edge part of a touch screen panel 50. Referring to FIG. 50, touch pads 10 are located in the A/A of a conventional display device. The reason is that as described above, the conventional detection method has a wide left and right bezel width due to the touch screen panel 50, and thus a configuration of the touch pads 10 exceeding the A/A of the display device further widens the left and right bezel width due to the touch screen panel 50, to thereby cause poorer marketability. Due to this, since there are not the touch pads 10 attached to the edge portions of the touch pads 10, blind zones for detection may occur.

FIG. 51 is a diagram illustrating a configuration of an edge portion of a touch screen panel according to an exemplary embodiment of the present invention, to solve these problems.

In the case of the touch screen panel 50 of the present invention, since sensor signal wires 22 are disposed between the touch pads 10, that is, in the A/A on the screen of the display device, the sensor signal wires 22 that are wired on the left and right bezel of the touch screen panel 50 are minimized.

Thus, even though the touch pads 50 are mounted in excess of the A/A of the display screen, an increase in the width of the bezel of the touch screen panel 50 is not induced. If the touch pads 50 are extensively mounted in the outside of the A/A of the display device as shown in FIG. 51, the blind zones for detection are pushed out of the A/A of the display device, and thus no blind zones occur in the A/A.

According to the present invention, a touch coordinates is recognized and a contact area is recognized between the touch unit such as the finger and the touch pads 10. Referring to FIG. 14, according to the present invention, since an opposite area of the touch pads 10 with respect to the finger 25 can be calculated, a total area of the finger 25 contacting the touch screen panel 50 is calculated by summing all the contacting areas of the plurality of touch pads 10. In addition, it is possible to obtain the touch coordinate by obtaining the center of gravity of the area. Thus, the touch coordinate is displayed on the two-dimensional x-axis and y-axis and the area information is then displayed together with the touch coordinate, which enables the touch to be displayed three-dimensionally.

When an area change rate per hour of the finger 25 contacting the touch screen panel 50 is calculated, it is also possible to detect a force or pressure applied by the finger 25. In order to perform these operations, according to the present invention, when the touch coordinates are sent to a CPU of a set, the time information and the area information are transmitted together. The CPU of the set computes the force or pressure of the touch unit on the basis of the time information and the area information. Otherwise, the CPU 40 and a signal processor 35 in the inside of the TDI calculates the force or pressure applied by the touch unit, and transfers the calculated result to the CPU of the set.

Such area detection can be used for a variety of uses. For example, in the case of writing letters, the letters become thicker or narrower in proportion to an area of a writing instrument contacting the touch screen panel 50. When a conductive brush is used to draw a picture, it is possible to draw the same picture as an actual object. In addition, some applications may perform a multi-layer command. In order to operate an MP3 player in a mobile phone, the following two layer command steps are generally used: 1) a first step of selecting a MP3 player among a number of applications; and 2) a second step of touching play buttons to hear music songs. In this case, according to a multi-layer structure command of the present invention using the area, if the MP3 player is slightly tapped, the contact area is smaller and the player is selected, and if the MP3 player is strongly tapped, the contact area is wider, and the player is selected and played. Otherwise, in the case of keyboard applications, the size of the sound may vary differently depending on the intensity of hitting the keyboard.

On the other hand, a plurality of the TDIs 30 may be used in a single touch screen panel 50. In the case that the touch screen panel 50 is wide, the touch pads 10 are placed on the touch screen panel 50 with a signal TDI 30, and thus the area of the touch pad 10 is widened. Accordingly, detection resolution for detecting the touch coordinate may decrease. As a result, it is preferable that a plurality of TDIs 30 should be used to get a small area of the touch pads 10.

In order to use a touch screen panel 50 with a plurality of TDIs 30, the touch pads 10 formed on the touch screen panel 50 includes the touch pads 10 in the row direction and the touch pads 10 in the column direction that are formed in the same line or with the same thickness.

FIG. 52 is a diagram illustrating a plurality of TDIs 30 used in an embodiment of the present invention. Referring to FIG. 52, a plurality of TDIs 30 are used in a touch screen panel 50 in which and the touch pads 10 are patterned in an identical interval. Communication cables and signal wires 29 are present between a plurality of TDIs 30 so that communications and necessary signals are transmitted between the TDIs. A plurality of signal wires are used as the communication cables and signal wires 29. These are I2C or SPI signal wires or a USB signal wires for serial communications which are a plurality of synchronization signals to be described later. A master function is assigned to one of the plurality of TDIs 30, and a slave function is assigned to the other of the plurality of TDIs 30. A unit for designating the master function and the slave function is included in the inside of the TDI.

The TDI 30 that is used as a master sends control signals to the TDI 30 that is used as a slave through the communication cables and signal wires 29, and controls the slave function. Further, although not shown, the CPU 40 other than the TDI 30 is present separately from the TDI 30 and controls a plurality of TDIs 30 via the communication cables and signal wires 29. In this case, each of TDIs 30 is assigned with an ID (Identification) to discriminate one of the TDIs 30 from the others. The TDI 30 has a hardware pin or software configuration for setting the ID. Taking the hardware configuration as an example, a plurality of ID pins are connected to a high or low signal.

With this configuration, in order to prevent malfunctions due to contact of a conductive body such as droplets, the touch pads 10 which are controlled by the two TDIs 30 in the touch screen panel 50 should operate as if they are controlled by a single TDI 30. For example, assuming that the row is scanned, in the case of starting scanning from R1, and ending scanning to R7 via R2 and R3, the master TDI 30 or the external CPU sends a frame sync signal via the signal wires or communication cables 24. R1 on the left side of FIG. 52 and R1 on the right side of FIG. 52 start scanning at an identical point in time by the frame synchronizing signal. After the completion of a scan of R1, the master TDI or the external CPU gives a prompting signal to start scanning of R2. In synchronism with the prompting signal, a scan of R2 is simultaneously carried out. Likewise, since a scan start point in time of a frame and a scan start point in time of each row are synchronized by a signal applied by the master TDI or the external CPU, scanning may appear to operate by a single TDI. Thus, malfunction due to a conductive material such as water droplets is prevented. In addition, since opening of the NSP or the SP operates in synchronism with a plurality of TDIs 30, it is possible to implement in the same manner as a single TDI 30.

As described above, when a plurality of TDIs are activated on a master-slave basis, and the scan and the pad opening are synchronized, it is possible to provide a touch screen function of a big screen.

Meanwhile, in the case of actually using the touch screen panel 50 in the present invention, the electrostatic discharge (ESD) is often introduced into the electrostatic touch pads 10. If the ESD is applied to the touch pad 10, the potential of the point P in FIG. 11 may be changed, and thus a case of recognizing the potential changes as a touch wrongly may occur.

Referring to FIGS. 12 and 13, the touch pads 10 according to the present invention are located on the bottom of a protective layer 24 such as glass. Therefore, the static electricity may be applied to the protective layer 24 and may be introduced into a joint between the protective layer 24 and the touch pads 10. Thus, in the configuration of FIGS. 12 and 13, the static electricity may be introduced from the edge portion of the touch screen panel 50. Accordingly, if a unit for absorbing static electricity is provided in the edge portion of the touch screen panel 50, the static electricity will not penetrate into the interior of the touch screen panel 50.

FIG. 53 is a diagram illustrating a configuration for discharging the static electricity according to an exemplary embodiment of the present invention. Referring to FIG. 53, ESD absorption wires 27 are provided in the outer parts of the touch screen panel 50. The ESD absorption wires 27 are connected to the ground or a DC voltage source having a constant potential on a flexible circuit substrate 96 such as COF or FPC, or connected to the TDI 30 so as to be connected to the ground or a DC voltage source having a predetermined level in the TDI. In addition, it is not desirable that the ESD absorption wires 27 forms a closed-loop. This is because call reception sensitivity of cell phones can be affected by effect of the antenna. Thus, the ESD absorption wires 27 originate from at least two points and are not interconnected. In addition, in order to minimize the ESD path as shown in the circular portion of FIG. 53, it is preferable that the ESD absorption wires overlap in the closest distance.

Since the ESD absorption wires 27 are connected to GND or a predetermined DC level, ESD introduced from the edge portion of the touch screen panel 50 is absorbed by the ESD absorption wires 27, and discharged to the outside of the touch screen panel so that the touch pads 10 are securely protected by ESD.

FIGS. 54 and 55 are a cross-sectional view and an exploded perspective view of a display device with a built-in touch-screen panel, respectively. Referring to FIGS. 54 and 55, the touch screen panel and the display device with the built-in touch-screen panel according to the present invention will be described below.

As shown in FIG. 54, a touch screen panel according to the present invention may be patterned on the upper surface of a color filter 215 of a display device 200. A touch-screen panel according to the present invention may be patterned on the bottom surface of a TFT substrate, but such a relevant description has been omitted in the specification. A common electrode 220 is formed on the lower surface of the color filter 215 of a conventional LCD display device. As another example, in a transverse electric field mode such as that of FIG. 34, the common electrode 220 is formed on the TFT substrate 205. In the example of FIG. 34 or 54, as shown, the touch pads 10 are patterned on the upper surface of the color filter 215.

A patterning process may be performed in a process of manufacturing a color filter 215, or performed after the TFT substrate 205 and the color filter substrate 215 have been incorporated with each other. Recently, in order to reduce the thickness of the display device, a sliming process is in progress often for the purpose of reducing the thickness after combining the two substrates. Accordingly, the patterning process of the touch pads 10 should proceed after completion of the slimming process, so that the touch pads 10 are not lost.

Meanwhile, a protective panel 52 such as reinforced glass may be mounted on the upper surface of the touch pads 10, in order to protect the touch pads 10. In the embodiment of FIG. 54, the protective panel 52 is attached on the upper surface of the color filter 215 by means of a transparent adhesive material such as a UV-curable resin 98, or attached to the upper surface of the edge portion of the protective panel by DAT (Double Adhesive Tape).

The touch screen panel formed in the display device such as LCD according to the present invention detects a common voltage and detects a touch signal in synchronism with the common voltage, in the case that the display device operates by the alternating common voltage in the same manner as the line inversion driving method of the LCD. In addition, in the case of the transverse electric field mode or the dot inversion driving method, driving noise may be generated in the liquid crystal driving process. When the driving noise affects the touch signal, it is preferable to detect the driving noise and detect the touch signal in synchronization with the detected driving noise.

Although it has not been shown in FIG. 54 or 55, a polarizing plate is attached to the upper surface of the touch pads 10 according to the present invention.

In the illustrated example, a drive IC 60 for displaying images on a LCD is mounted in the form of a COG pattern on the TFT substrate 205. A TDI 30 that is a touch drive IC for controlling a touch signal is mounted in the form of a COG or COF pattern on the color filter 215. FPCs 96 and 97 such as FPC or COF are withdrawn from the drive ICs 30 and 60, respectively. Further, the touch drive IC 30 and the LCD drive IC 60 may be integrated into a single IC, in the embodiment of FIG. 55.

Meanwhile, according to the present invention, a plurality of touches can be detected. Referring to FIG. 25, the touch pads 10 according to the present invention have an independent coordinates at each independent location. Accordingly, each touch pad 10 can detect a plurality of touch signals for the plurality of touch inputs. Assuming that a palm (not shown) covers thirty-five (35) touch pads 10 on the upper surfaces of the 35 touch pads 10 shown in FIG. 25, it is possible to detect that the 35 touch pads 10 have been touched.

In the case that the area of the touch pad of the present invention 10 is small, the touch unit such as the finger 25 opposite to the touch pads 10, will face typically a plurality of touch pads 10. Therefore, since a plurality of touch pads 10 are in contact with a touch unit, it is necessary to detect a single coordinate from a group consisting of a plurality of touch pads 10. The touch coordinate becomes the center of gravity of the group that has been touched.

FIG. 56 is a diagram illustrating a configuration of determining a touch group according to an embodiment of the present invention. Referring to FIG. 56, a "finger A" of FIG. 56 has touched ten (10) touch pads 10, in which relative values of the areas extracted due to the touch of the finger are marked on the respective touch pads 10. The next area to the areas marked with "9" and "7" along the second row of the ten (10) touch pads 10 becomes an area of zero (0). Thus, it can be seen that a touch has occurred only until the touch pad marked with "7" and the subsequent touch pads are not touched. A boundary portion of the touch becomes between the touch pads 10 marked with "7" and "0."

Thus, when a touch occurs, a touch area is extracted and when a touch does not occur, a touch area is not detected. It is possible to identify the boundary portion between a case when a touch occurs and another case when a touch does not occur. It is possible to distinguish regions where a touch has occurred by a finger from the other regions by a combination of the boundary portions. Through a process of grouping the areas of the touch pads 10 included in the touch regions as a group where a touch has occurred by a finger, a plurality of touch pads 10 can be recognized as if it were a touch pad. The center of gravity of a group becomes a touch coordinate of the group.

In FIG. 56, a "finger B" group is a separate group and does not have a mutual interconnection with the "finger A" group. Through grouping of the "finger B" group, it is possible to extract a touch coordinate that is the center of gravity of the "finger B" group. It is also possible to extract touch coordinates the "finger A" group and the "finger B" group. Thus, the present invention enables multi touch detection that detects a plurality of touches.

As described above, a display device with a built-in touch screen panel according to the present invention has advantages that has a simple process, an improved yield, a thin thickness, and an enhanced transmittance, with no films, in comparison with the conventional case that touch pads 10 are formed on film or glass and then the film or glass is attached on a display device. In addition, when an LCD process suitable for mass production is used, and then a touch screen panel according to the present invention is fabricated on the upper surface of an LCD, it is possible to produce products at a low manufacturing cost and high yield.

However, the present invention is not limited to the above embodiments, and it is possible for one who has an ordinary skill in the art to make various substitutions, modifications and variations without departing off the spirit of the invention defined by the claims.

[Description of reference numerals]

| | |
|---|---|
| 10: touch pads | 10a: sensing pads (SP) |
| 10b: non-sensing pad (NSP) | 11: space filler portion |
| 12: charging unit | 12-1: output unit of charging unit |
| 12-2: input unit of charging unit | 14: touch detector |
| 15: common voltage detector | 16: switching unit |
| 18: amplifier | 18a: differential amplifier |
| 19: comparator | 20: function keypads |
| 22: sensor signal wires | 23: function keypad signal wires |
| 25: finger | 26: conductor |
| 27: ESD absorption wires | 29: communication cables and signal wires |
| 30: touch drive IC | 31: driver |
| 33: timing controller | 35: signal processor |
| 40: CPU | 46: communication unit |
| 47: power supply | 50: touch screen panel |
| 52: protective panel | 57: adhesive material |

[Description of reference numerals]

| | |
|---|---|
| 58: air gap or contact member | 59: connectors |
| 60: drive ICs | 90: active region |
| 92: invisible region | 96: FTC |
| 98: UV-curing resin | 200: display device |
| 205: TFT substrate | 210: liquid crystal layer |
| 215: color filter | 217: background |
| 220: common electrode | 230: sealants |
| 242: gate lines | 244: data lines |
| 246: common electrode lines | 248: pixel electrode lines |
| 250: TFT | 251: gate electrode |
| 253: source electrode | 255: drain electrode |
| 257: semiconductor layer | 270: dots |

The invention claimed is:

1. A touch detection apparatus installed in a display device, the touch detection apparatus comprising:
a plurality of touch pads configured to form a touch capacitance by approaching a touch input device to the display device;
a plurality of sensor signal lines connected to the plurality of touch pads, respectively;
a touch drive IC (TDI) receiving a plurality of touch signals from the plurality of touch pads through the plurality of sensor signal lines, respectively;
a driving capacitor, wherein one portion of the driving capacitor is connected to the touch pads and the other portion of the driving capacitor is applied with a driving voltage for touch detection; and
a driving voltage generator configured to generate the driving voltage,
wherein the plurality of the touch pads are arranged in a dot matrix within a display region of the display device,
wherein a line width of a sensor signal line as well as a line length of the sensor signal line is getting greater as a distance between a corresponding touch pad and the TDI is increased, and
wherein the TDI detects a touch signal using a driving back phenomenon when the touch capacitance is added.

2. The touch detection apparatus of claim 1, wherein the driving voltage generator is included in the TDI.

3. The touch detection apparatus of claim 2, wherein a touch pad is connected to a touch detector of the TDI.

4. The touch detection apparatus of claim 3, further comprising a charging device for applying a precharge voltage, wherein the charging device is connected to the touch pad.

5. The touch detection apparatus of claim 4, wherein the charging device is a switching device and an output unit of the switching device is in a high impedance state at the time of the touch detection.

6. The touch detection apparatus of claim 2, wherein the TDI comprises a touch detector that detects the touch signal when a predetermined period lapses after the driving voltage is applied.

7. The touch detection apparatus of claim 2, wherein a voltage detected by a touch detector of the TDI at the non-touch time is determined by the following <Equation 1>, when the touch capacitance is added, the voltage detected by the touch detector is determined by the following <Equation 2>, and the driving back is generated by a difference between the <Equation 1> and the <Equation 2>, $$\Delta Vsensor = Vpre \pm (Vh - Vl)\frac{Cdrv}{Cdrv + Cvcom + Cp} \quad \langle\text{Equation 1}\rangle$$

$$\Delta Vsensor = Vpre \pm (Vh - Vl)\frac{Cdrv}{Cdrv + Cvcom + Cp + Ct}, \quad \langle\text{Equation 2}\rangle$$

wherein, in the Equation 1 and Equation 2, ΔVsensor represents the voltage detected by the touch detector, Vh represents a HIGH level voltage applied to the driving capacitor, Vl represents a LOW level voltage applied to the driving capacitor, Cdrv represents a driving capacitance of the display device, Cvcom represents a common electrode capacitance of the display device, Cp represents a parasitic capacitance of the display device, and Ct represents the touch capacitance.

8. The touch detection apparatus of claim 1, wherein as a distance between a touch pad and the TDI is increased, a separate distance between a corresponding sensor signal line and a next sensor signal line adjacent thereto is also increased.

9. The touch detection apparatus of claim 8, wherein the increased separate distance between the sensor signal line and the next sensor signal line adjacent thereto is full of a space filling element.

10. The touch detection apparatus of claim 1, further comprising a common electrode capacitor, wherein the common electrode capacitor is formed between the touch pads and a common electrode of the display device.

11. The touch detection apparatus of claim 1, wherein a sensor signal line is positioned at left and right sides of a corresponding touch pad.

12. The touch detection apparatus of claim 1, wherein touch pads which do not perform touch detection are in a floating state.

13. The touch detection apparatus of claim 12, wherein the touch pads which do not perform the touch detection are entered into the floating state before a charging device of a touch detector of the TDI is turned on.

14. The touch detection apparatus of claim 1, wherein, in a region where the sensor signal lines are not formed, a space between the touch pads is narrower than the size of a pixel of the display device.

15. The touch detection apparatus of claim 1, wherein a space between the sensor signal lines is narrower than the size of a pixel of the display device.

* * * * *